United States Patent
Yasui et al.

(10) Patent No.: US 7,350,433 B2
(45) Date of Patent: *Apr. 1, 2008

(54) TRANSMISSION CONTROL SYSTEM

(75) Inventors: Yuji Yasui, Wako (JP); Kanako Shimojo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

This patent is subject to a terminal disclaimer.

(21) Appl. No.: 11/012,310

(22) Filed: Dec. 16, 2004

(65) Prior Publication Data

US 2005/0132832 A1 Jun. 23, 2005

(30) Foreign Application Priority Data

Dec. 17, 2003 (JP) ............................. 2003-419799

(51) Int. Cl.
*F16H 59/00* (2006.01)
*F16H 61/00* (2006.01)
*F16H 63/00* (2006.01)

(52) U.S. Cl. .................... 74/335; 74/339; 192/53.3; 192/84.6

(58) Field of Classification Search ................ 74/335, 74/339; 192/52.1, 53.3, 84.6; 701/67
See application file for complete search history.

(56) References Cited

U.S. PATENT DOCUMENTS 6,393,928 B1 * 5/2002 Watanabe ................ 74/336 R
6,578,442 B2 * 6/2003 Aoyama et al. ............. 74/335
6,992,453 B2 * 1/2006 Yasui et al. ................ 318/560
7,071,638 B2 * 7/2006 Yasui et al. ................ 318/135
7,120,530 B2 * 10/2006 Yasui et al. .................. 701/51
2005/0078516 A1 * 4/2005 Yasui et al. ............ 365/185.14

FOREIGN PATENT DOCUMENTS

JP   2003-015703   1/2003
JP   2004-211717   7/2004

* cited by examiner

*Primary Examiner*—David D. Le
(74) *Attorney, Agent, or Firm*—Arent Fox LLP

(57) ABSTRACT

A transmission control system for maintaining good positioning performance even if a dynamic characteristic of a transmission is out of a predicted range. A sliding mode controller provided in a shift controller has two degrees of freedom and can independently specify a follow-up characteristic of an actual shift arm position to follow a target position in a shifting direction and a disturbance suppressing characteristic respectively. The sliding mode controller determines a control input to be supplied to a shift motor of a shifting device. A sliding mode controller provided in a selection controller has two degrees of freedom and can independently specify a follow-up characteristic of an actual shift arm position to follow a target position in a selecting direction and a disturbance suppressing characteristic, respectively. This sliding mode controller determines a control input to be supplied to a selection motor of a selecting device.

8 Claims, 29 Drawing Sheets

FIG. 3
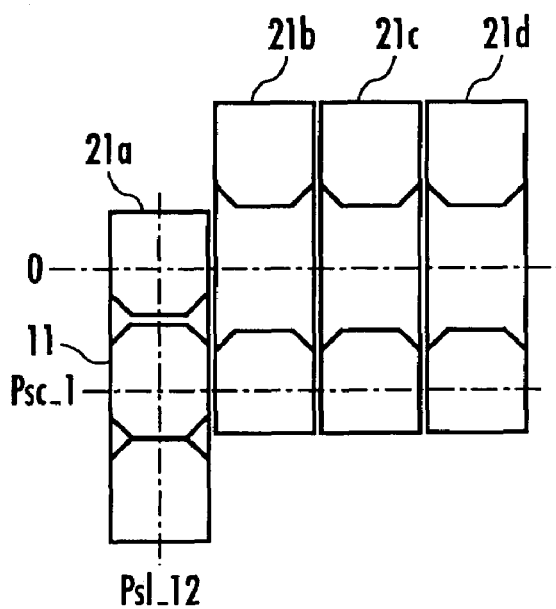
(a) 2ND GEAR IN ENGAGEMENT
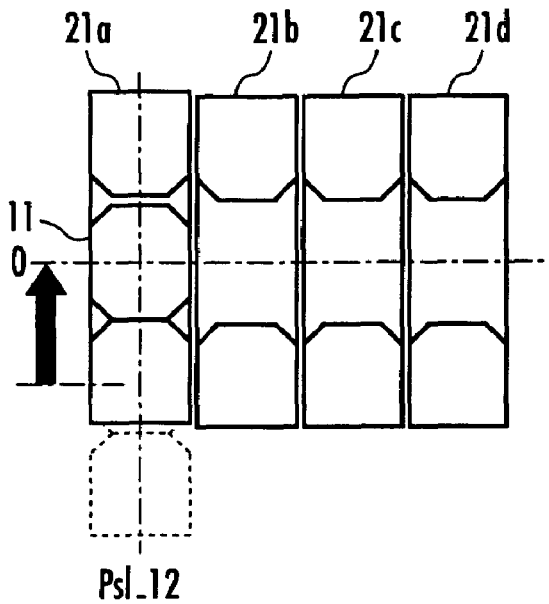
(b) DISENGAGING 2ND GEAR
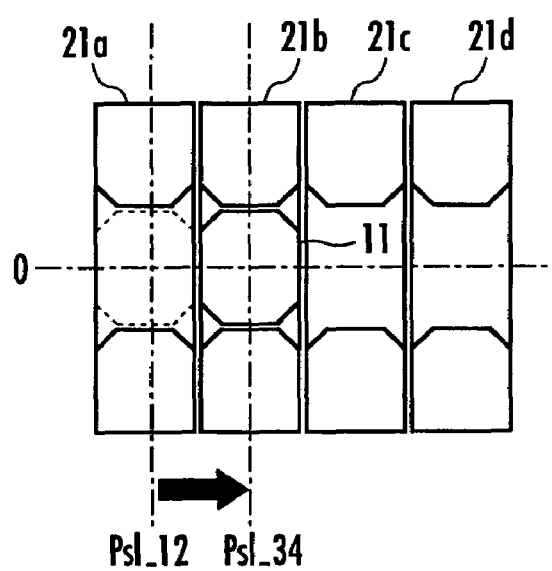
(c) SELECTING 3RD GEAR
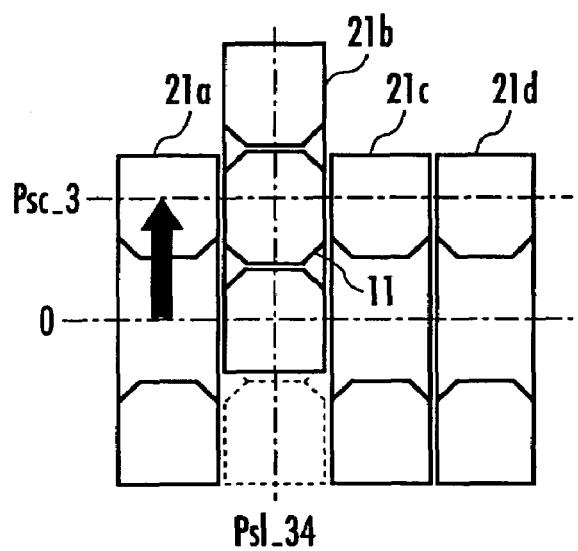
(d) SHIFTING TO 3RD GEAR FIG. 14
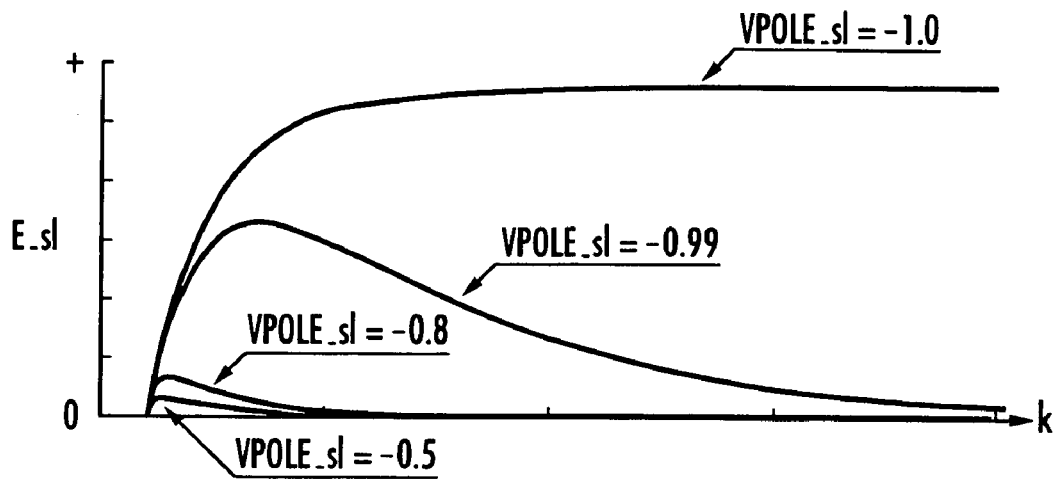
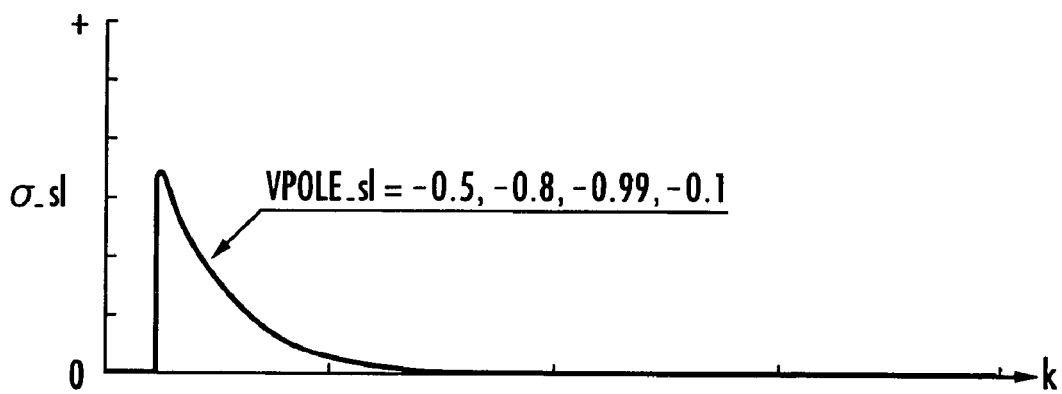
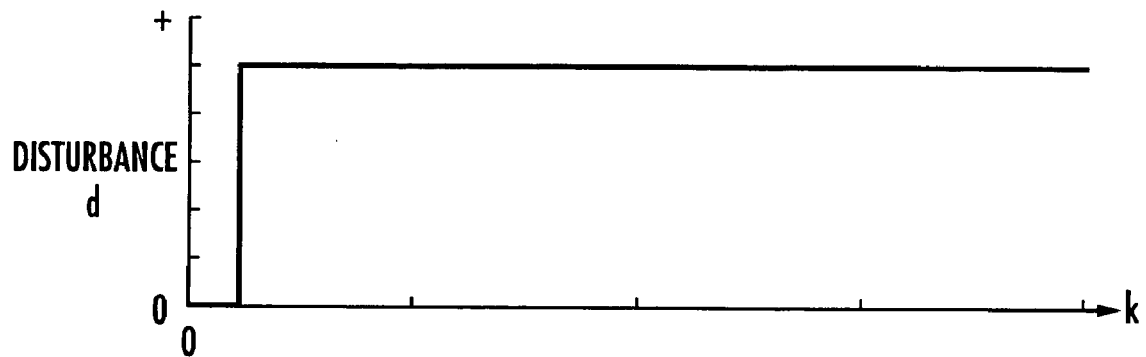

TRANSMISSION CONTROL SYSTEM

BACKGROUND OF THE INVENTION

1. Field of the Invention

The present invention relates to a transmission control system that controls operations of actuators for moving a shift arm of a transmission so as to position the shift arm at a predetermined target position.

2. Description of the Related Art

As a transmission mounted in a vehicle, there has been known, for example, an automatic/manual transmission (AMT) that includes actuators, such as motors, to perform a selecting operation and a shifting operation of a manual transmission (MT) that transmits motive power between an input shaft and an output shaft of a vehicle when a driver manually carries out the selecting and shifting operations.

The present inventors have proposed a control system for performing a shifting operation of an automatic/manual transmission by adopting response specifying control in the previous application, namely, Japanese Laid-Open Patent Publication No. 2004-211717. In the control system, a coupling sleeve that integrally rotates with an input shaft is moved into contact with a synchronized gear through the intermediary of a synchronizer ring, and the coupling sleeve and the synchronized gear are rotationally synchronized to perform the shifting operation.

The response specifying control is conducted by determining a manipulated variable for driving actuators so as to converge the value of a switching function to zero. The switching function is defined by a linear function based on the difference between a target position and an actual position of a coupling sleeve. A computing coefficient of the linear function is set to lower disturbance suppressing capability level so as to produce a compliance property, which is resiliency of rubber or the like, thereby damping contact impacts when the coupling sleeve comes into contact with the synchronizer ring.

There has been also proposed a control system featuring improved stability of sliding mode control by limiting a model parameter identification range when identifying a model parameter in a model equation of a control object that changes due to deterioration with age or disturbance, thus restraining the occurrence of drift of a model parameter (refer to, for example, Japanese Unexamined Patent Application Publication No. 2003-15703).

An automatic/manual transmission control system calculates a target value Psl_cmd of a position Psl in the selecting direction and a target value Psc_cmd of a position Psc in the shifting direction of the shift arm involved in the selecting operation and the shifting operation in response to a speed change command to conduct positioning control by a selection controller that controls the operation of a selection actuator such that Psl agrees with Psl_cmd. Further, the positioning control is carried out by a shift controller that controls the operation of a shift actuator such that Psc agrees with Psc_cmd.

In a conventional automatic/manual transmission control unit, the response specifying control has been used to control the shift actuator by a shift controller. FIGS. 28A and 28B illustrates displacements of the shift arm when the shifting operation of the transmission is performed by the conventional shift controller. The axes of ordinates in the upper graphs indicate target position Psc_cmd and actual position Psc of the shift arm in the shifting direction, while the axes of ordinates in the lower graphs indicate control input Vsc to be supplied to the shifting actuator. The axes of abscissas indicate time t.

FIG. 28A shows a case where the dynamic characteristic of a transmission is within a standard range predicted beforehand when the shift controller was designed. FIG. 28B shows a case where the transmission has a low friction and a low reactive force at rotational synchronization, the dynamic characteristic of the transmission being out of the standard range. Referring to FIG. 28A, $x_{10}$ denotes a target position Psc_cmd, $y_{10}$ denotes an actual position Psc, and $z_{10}$ denotes a control input Vsc. Referring to FIG. 28B, $x_{11}$ denotes a target position Psc_cmd, $y_{11}$ denotes an actual position Psc, and $z_{11}$ denotes a control input.

FIG. 28A indicates that the actual position Psc ($y_{10}$) stably converges to the target position Psc_cmd ($x_{10}$) even if the target position Psc_cmd ($x_{10}$) suddenly increases at $t_{102}$ and $t_{103}$. In contrast, FIG. 28B indicates that when a sudden increase takes place in the target position Psc_cmd ($x_{11}$) at $t_{112}$ with a resultant increase in the control input Vsc ($z_{11}$), an undue pushing force causes a coupling sleeve to be pushed into a synchronizer ring because of the low friction. This inconveniently produces an inertial force change shock attributable to a sudden rotational synchronization.

Furthermore, when the target position Psc_cmd ($x_{11}$) is changed to Psc_end at $t_{113}$, the control input Vsc ($z_{11}$) rapidly increases, causing the actual position Psc ($y_{11}$) to overshoot the target position Psc_end. This in turn causes the coupling sleeve to collide with a stopper, inconveniently producing a colliding noise, which is uncomfortable to a driver.

A problem also arises when the response specifying control is used to control a selection actuator by a selection controller. FIG. 29 shows a displacement of the shift arm when the shifting operation of a transmission is performed by a conventional selection controller. The axis of ordinates indicates target position Psl_cmd of the shift arm in the selecting direction and actual position Psl, while the axis of abscissas indicates time t.

Referring to FIG. 29, $x_{12}$ denotes a target position Psl_cmd of the shift arm in the selecting direction, $y_{12}$ denotes an actual position Psl of the shift arm when the dynamic characteristic of the transmission remains within the aforesaid standard range, $z_{12}$ denotes the actual position Psl when the transmission has a dynamic characteristic that is out of the standard range and has a low friction, and $u_{12}$ denotes the actual position Psl of the shift arm when the transmission has a dynamic characteristic that is out of the standard range and has a high friction.

In the case of $y_{12}$ when the dynamic characteristic remains within the standard range, when the target position Psl_cmd ($x_{12}$) changes from Psl_cmd50 to Psl_cmd51 at $t_{120}$, the actual position Psl quickly converges to the new target position Psl_cmd51. In the case of $Z_{12}$ with the low friction, the actual position Psc overshoots the target position Psl_cmd51, and the overshoot causes a vibration, inconveniently prolonging the time of convergence to the target position Psl_cmd51. In the case of $u_{12}$ with the high friction, the moving speed of the shift arm decrease, also inconveniently prolonging the time of convergence to the target position Psl_cmd51.

SUMMARY OF THE INVENTION

Accordingly, it is an object of the present invention to provide a transmission control system that is capable of solving the problems described above and maintaining good positioning performance even if a dynamic characteristic of a transmission is out of a predicted range.

The present invention has been made to fulfill the aforementioned object and it is relates to an improvement in a transmission control system provided with a positioning controller for positioning a shift arm at a predetermined target position by controlling the operation of an actuator connected to a shift arm that is provided in a transmission to perform a selecting operation and a shifting operation and selectively engaged with a shift piece secured to each of a plurality of speed shift forks by the selecting operation to displace the shift fork corresponding to the selectively engaged shift piece from a neutral position so as to establish a predetermined speed by the shifting operation.

The positioning controller uses a controller having two degrees of freedom that is capable of independently specifying a follow-up characteristic of an actual position of the shift arm to follow the target position and a disturbance suppressing characteristic.

With this arrangement, the positioning controller formed of the controller having the two degrees of freedom makes it possible to set the disturbance suppressing characteristic at a high level after specifying a desired specification for the characteristic of the shift arm to follow the target position. Hence, even if the dynamic characteristic of the transmission is out of a predicted range, the behaviors of the shift arm when the target position is changed or a disturbance occurs can be stably controlled by the positioning controller.

The follow-up characteristic of the actual position of the shift arm to follow the target position in the positioning controller is based on overdamping responses.

Thus, overdamping responses applied to the follow-up characteristic of the actual position of the shift arm to follow the target position restrains the chance of the actual position of the shift arm overshooting the target position. This makes it possible to prevent the time required by the actual position of the shift arm to converge to the target position from being prolonged due to the overshoot and a vibration of the shift arm that may be caused by the overshoot.

The positioning controller carries out positioning of the shift arm by using response specifying control.

With this arrangement, the follow-up characteristic of the actual position of the shift arm to follow the target position and the disturbance suppressing characteristic can be easily specified by carrying out positioning control of the positioning controller, which is a controller having two degrees of freedom, by adopting response specifying control.

The transmission control system further includes a computing coefficient changer for changing a computing coefficient of a switching function that determines a disturbance suppressing characteristic in the response specifying control according to the actual position of the shift arm in the processing for positioning the shift arm by the positioning controller.

With this arrangement, the permissible width of the difference between a target position and an actual position of the shift arm can be changed by changing the computing coefficient of the switching function by the computing coefficient changer. Thus, if the shift arm is mechanically interfered with, the shift arm can be moved to the target position while avoiding the interference by changing the computing coefficient according to the actual position or the target position of the shift arm to increase the permissible width when performing the selecting operation and the shifting operation.

Furthermore, the actuator is a selection actuator for moving the shift arm in a selecting direction, and the positioning controller controls the operation of the selection actuator to position the shift arm at a target position set on the basis of each speed.

With this arrangement, when the shift arm is moved in the selecting operation to position it at the target position, the follow-up characteristic of the actual position of the shift arm to follow the target position and the disturbance suppressing characteristic can be independently specified. This makes it possible to stabilize the behaviors of the shift arm in making the shift arm follow the target position even if the dynamic characteristic of the selecting mechanism of the transmission is out of the range that is predicted when the positioning controller is designed.

Furthermore, the shift fork is connected to a first engaging member connected to an input shaft or an output shaft of the transmission, the actuator is a shift actuator that moves the shift arm so as to move the first engaging member in the shifting direction through the intermediary of the shift fork engaged with the shift arm, and the positioning controller controls the operation of the shift actuator to move the first engaging member in the shifting direction so as to engage the first engaging member with a second engaging member connected to the input shaft or the output shaft, whichever has not been connected to the first engaging member, thereby establishing a speed in a shifting operation.

With this arrangement, when the shift arm is moved in the shifting operation to engage the first engaging member with the second engaging member, the follow-up characteristic of the actual position of the shift arm to follow the target position and the disturbance suppressing characteristic can be independently specified. This makes it possible to stabilize the behaviors of the shift arm when engaging the first engaging member and the second engaging member even if the dynamic characteristic of the shifting mechanism of the transmission is out of the range that is predicted when the positioning controller is designed.

The transmission control system further includes a synchronizing member that is provided between the first engaging member and the second engaging member such that it may be rotated relative to the first engaging member and the second engaging member and movable in the shifting direction, and comes in contact with the first engaging member and the second engaging member to synchronize the rotational speeds of the first engaging member and the second engaging member by a frictional force in the shifting operation. The positioning controller changes a target position of the shift arm in the shifting direction at a predetermined timing to engage the first engaging member and the second engaging member in the shifting operation.

With this arrangement, in the shifting operation, the positioning controller changes the target position when, for example, the first engaging member comes in contact with the synchronizing member and the rotational synchronization with the second engaging member is begun, or the shifting operation is terminated after the engagement between the first engaging member and the second engaging member is completed. When the target position is changed, the follow-up characteristic of the actual position of the shift arm to follow the target position in the positioning controller can be independently set so as to restrain the actual position of the shift arm in the shifting direction from overshooting the target position or vibrations from being produced. This makes it possible to restrain unstable behaviors of the shift arm, which are attributable to differences in the dynamic characteristic of the transmission, when the target position is changed, thus allowing a stable shifting operation to be achieved.

BRIEF DESCRIPTION OF THE DRAWINGS

FIGS. 3A, 3B, 3C and 3D are operation explanatory diagrams of the transmission shown in FIG. 1;

FIG. 14 presents diagrams illustrating changes in a disturbance suppressing capability that take place when response specifying parameters are changed;

DESCRIPTION OF THE PREFERRED EMBODIMENTS

Figure 1:
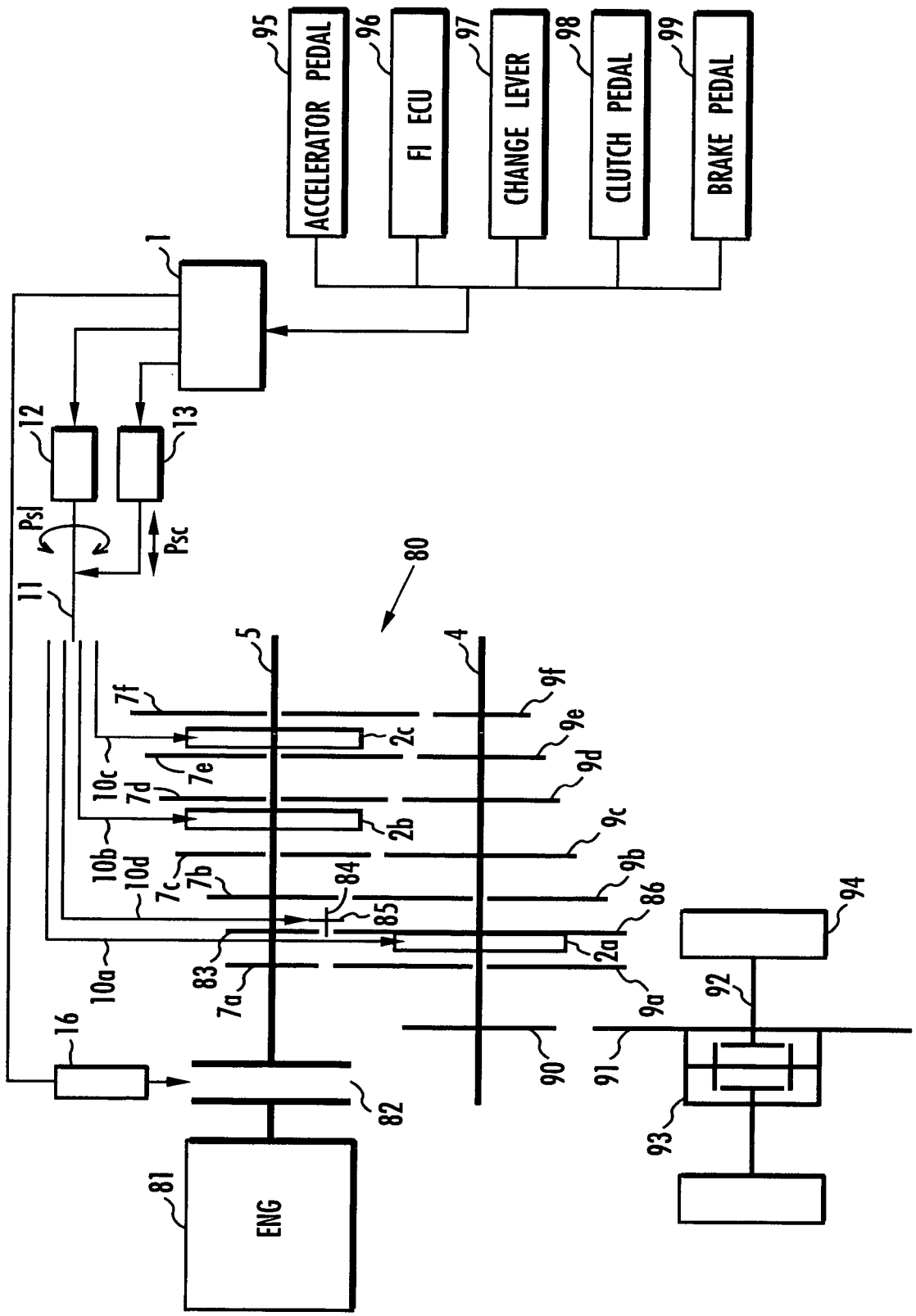
FIG. 1 is a block diagram of a transmission.
Figure 2:
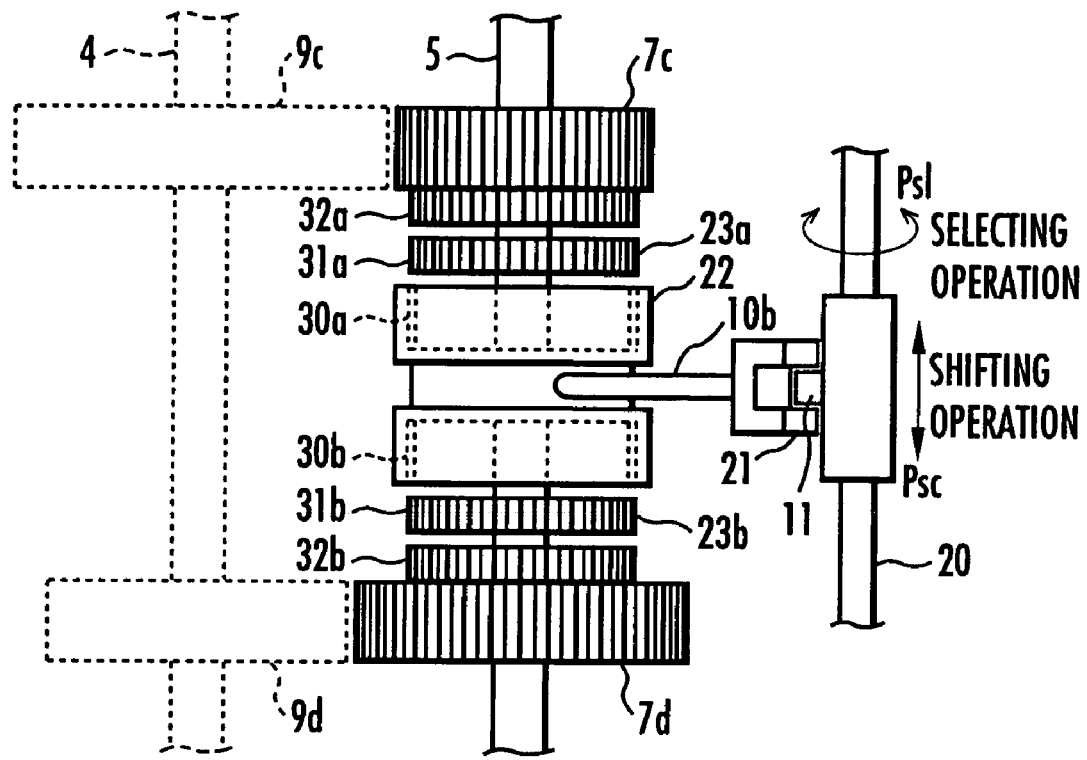
FIGS. 2A and 2B are detailed diagrams of a shifting/selecting mechanism of the transmission shown in FIG. 1.
Figure 2:
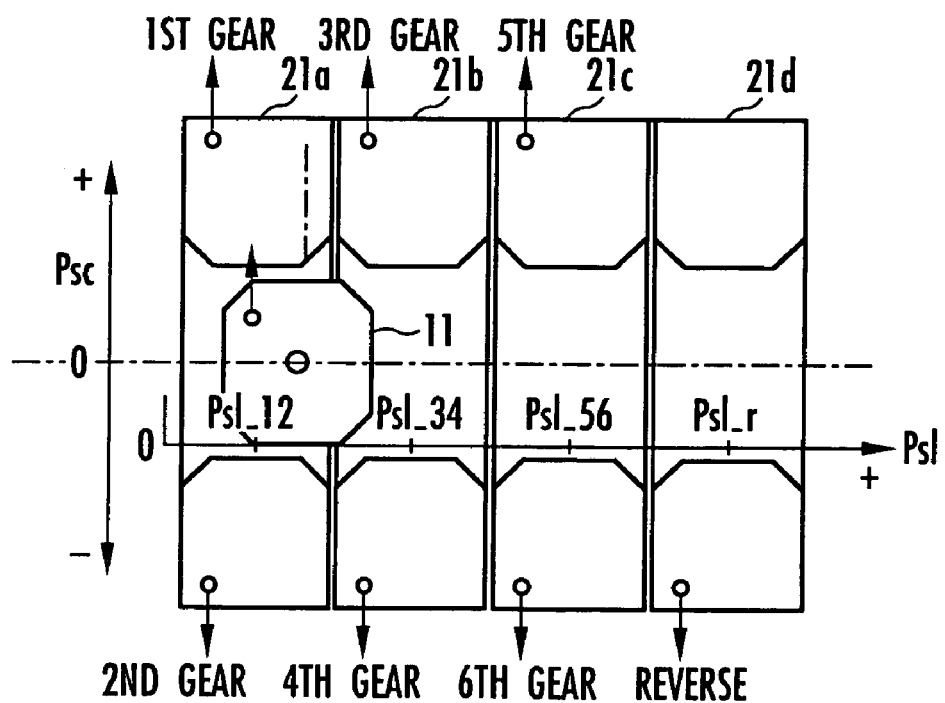
Figure 4:
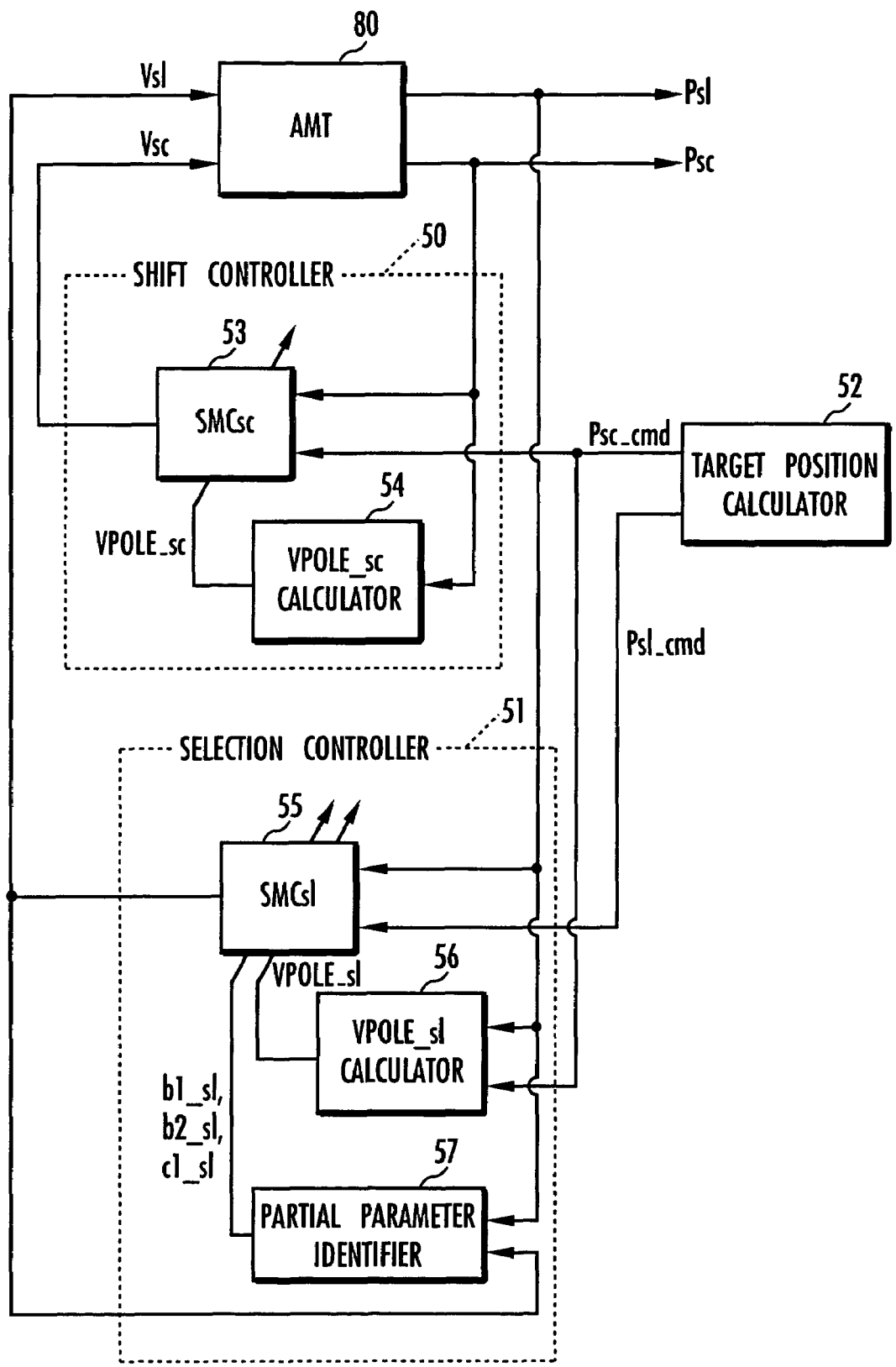
FIG. 4 is a block diagram of a control unit shown in FIG. 1.
Figure 5:
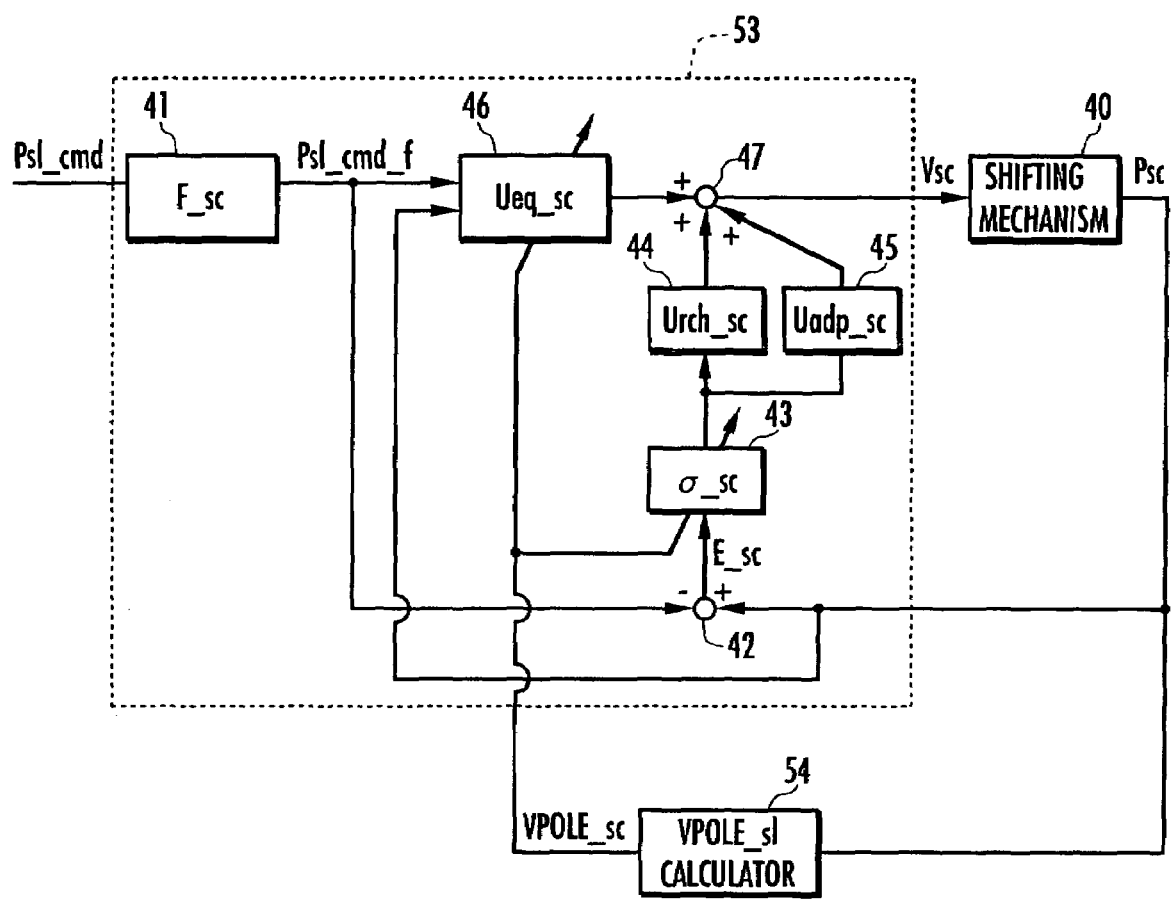
FIG. 5 is a block diagram showing a shift controller shown in FIG. 4.
Figure 6:
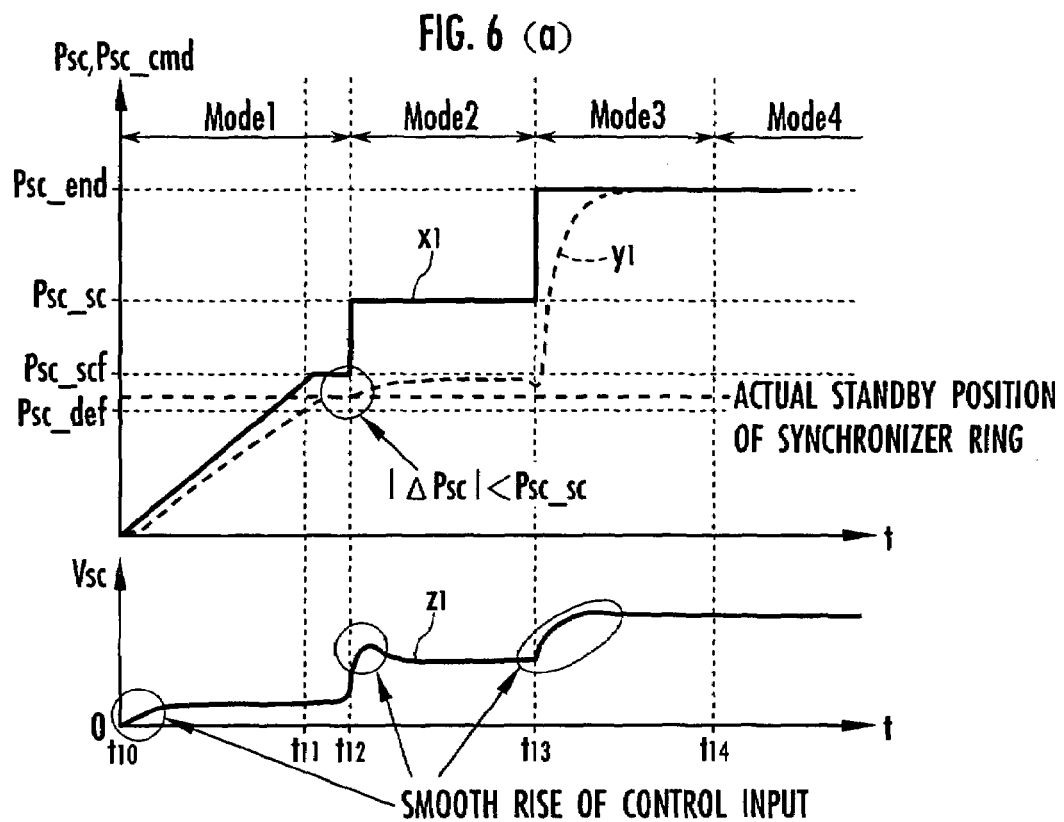
FIGS. 6A and 6B are graphs illustrating behaviors of the shift arm converging to a target position in a shifting operation.
Figure 6:
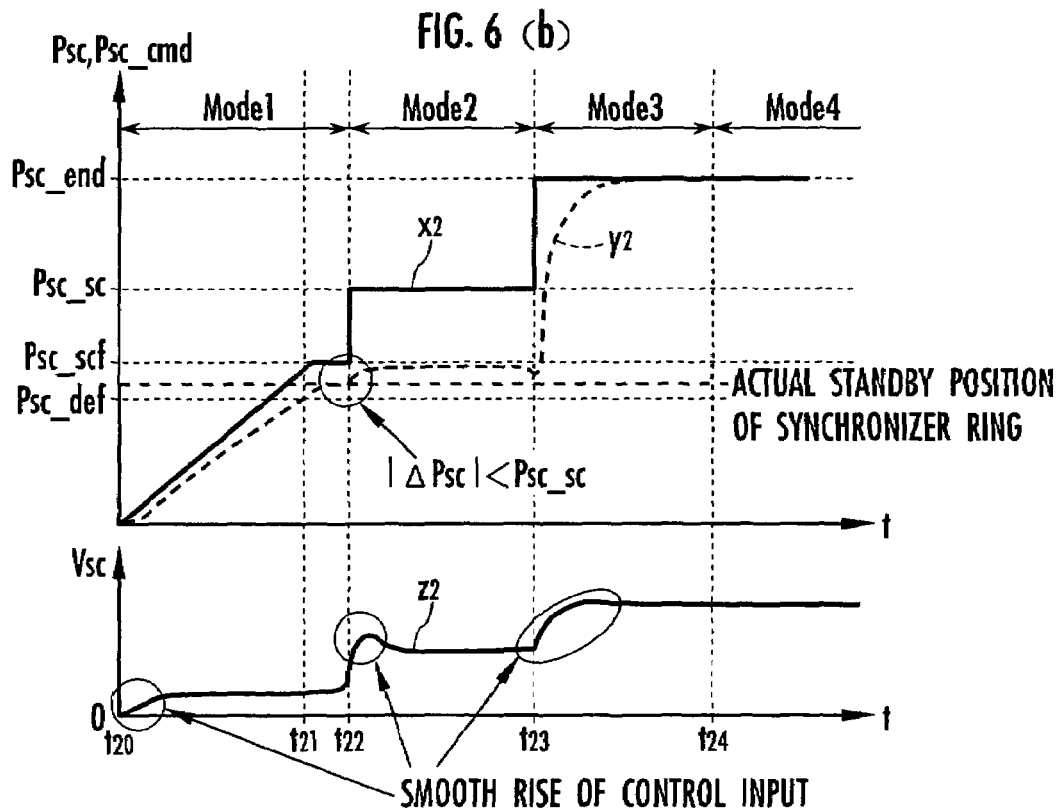
Figure 7:
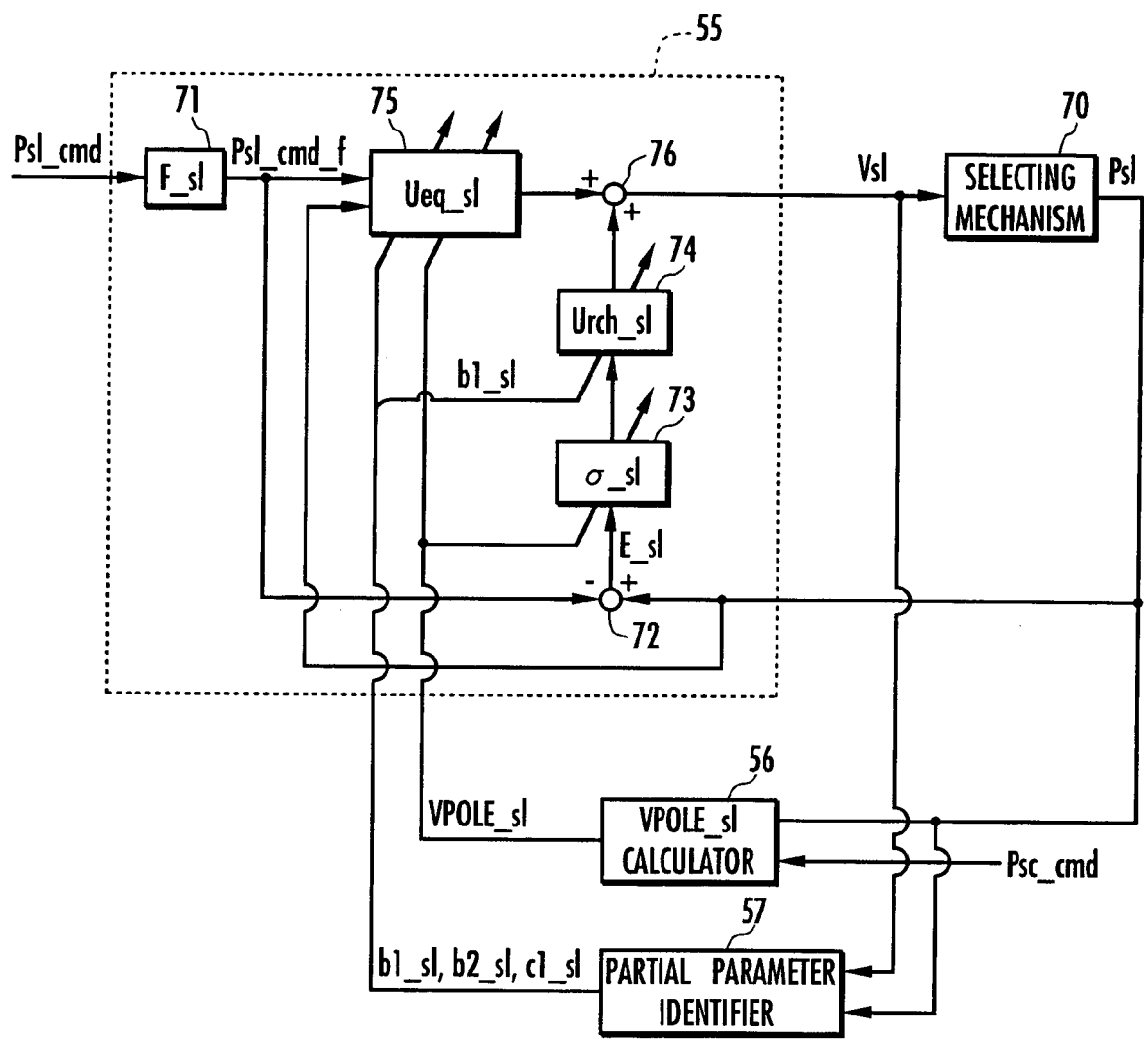
FIG. 7 is a block diagram showing a selection controller shown in FIG. 4.
Figure 8:
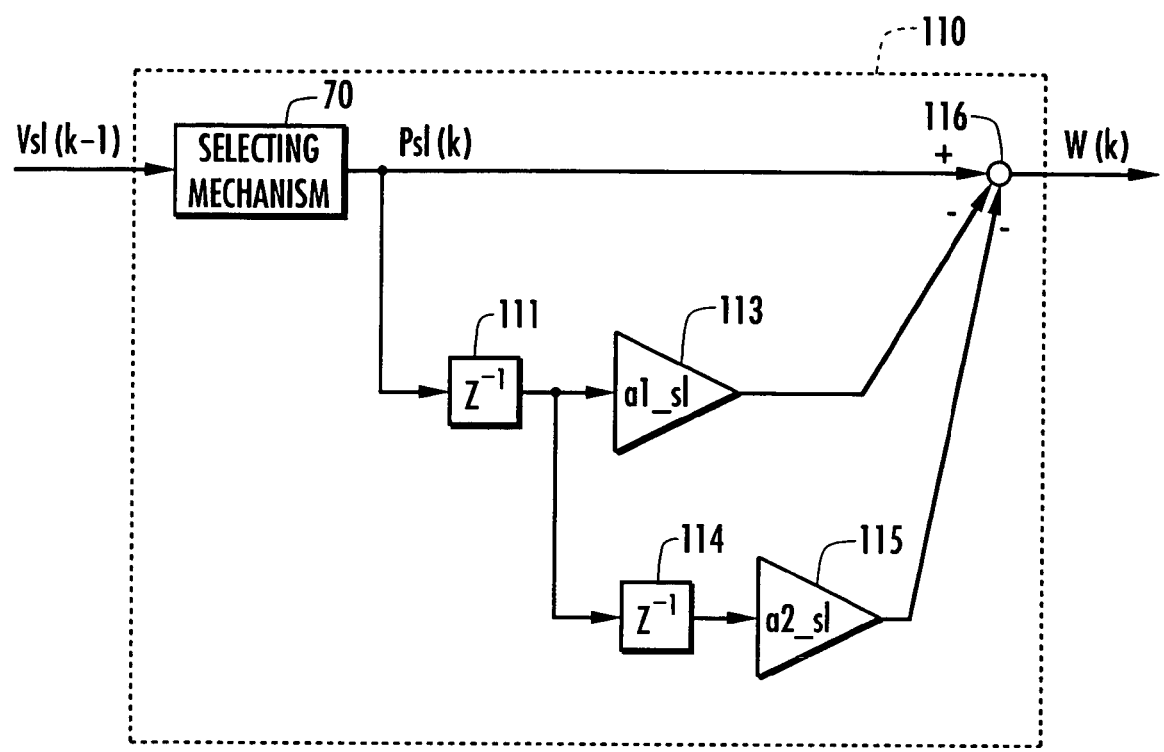
FIG. 8 is a block diagram of a virtual plant related to a processing method for identifying model parameters.
Figure 9:
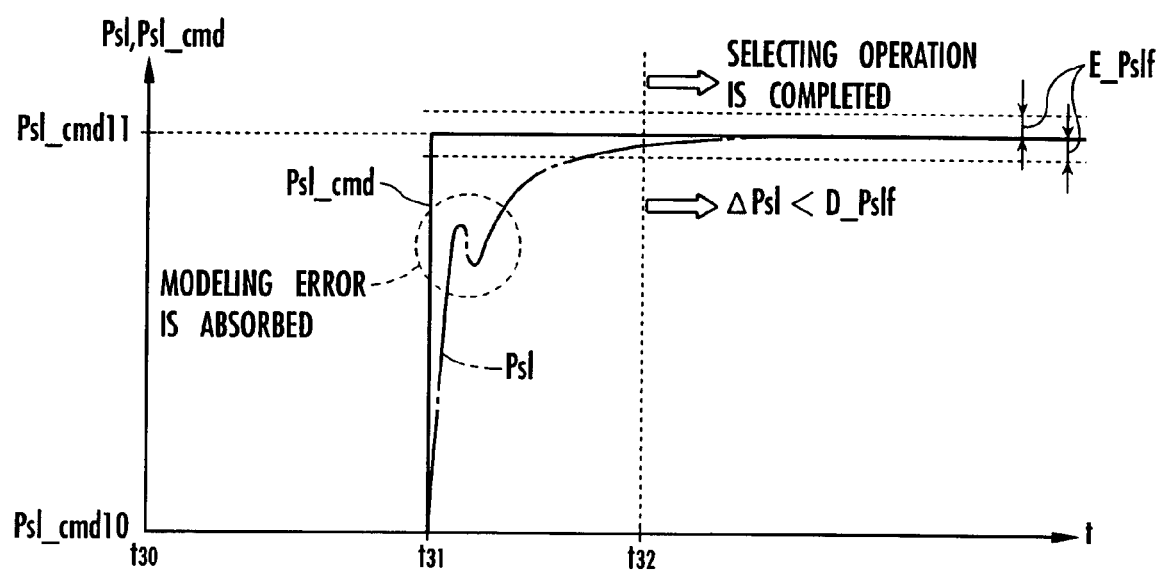
FIG. 9 is a graph illustrating a behavior of the shift arm converging to a target position in a selecting operation.
Figure 10:
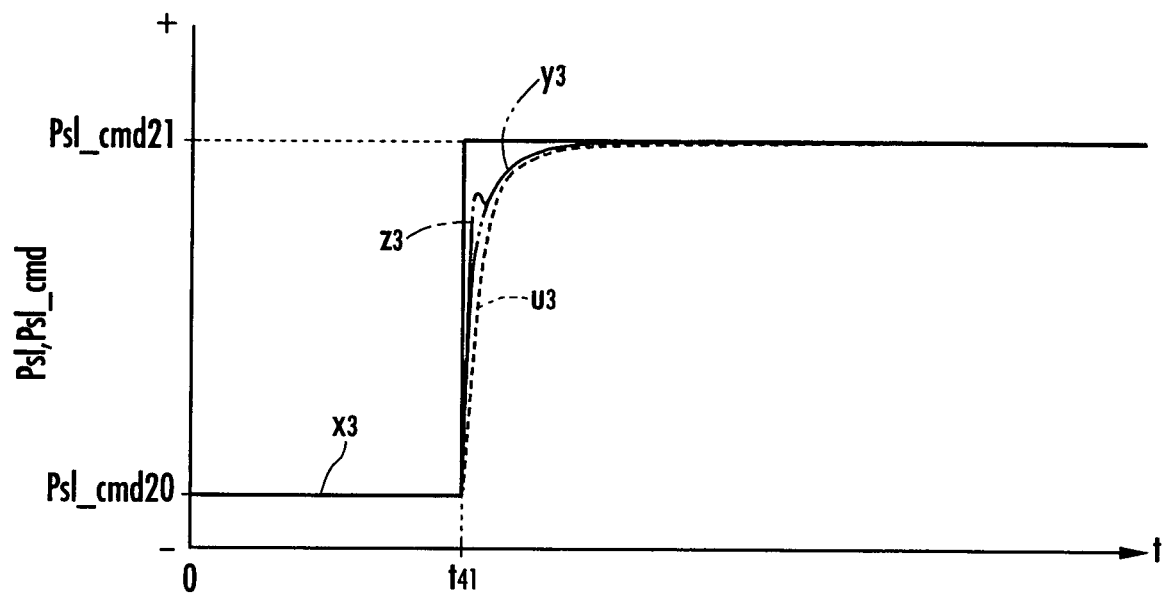
FIG. 10 is a graph illustrating a behavior of the shift arm converting to a target position in the selecting operation in the case of a transmission having a different dynamic characteristic.
Figure 11:
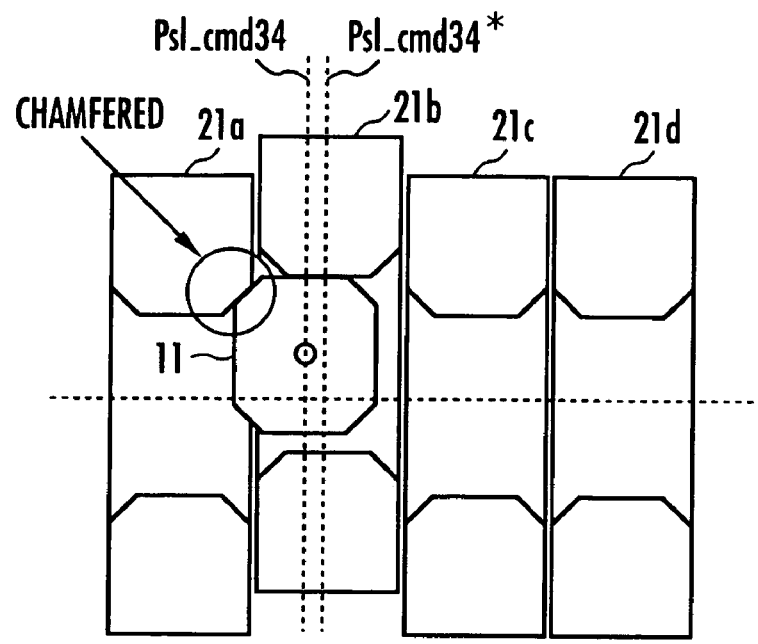
FIGS. 11A and 11B are explanatory diagrams illustrating a shifting operation in a manual transmission.
Figure 11:
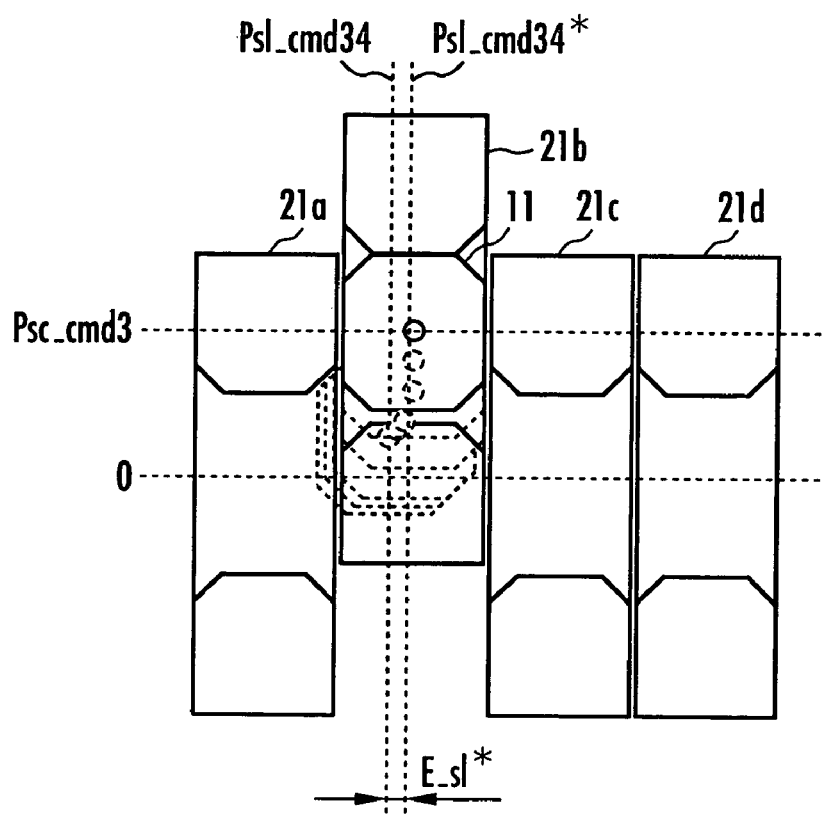
Figure 12:
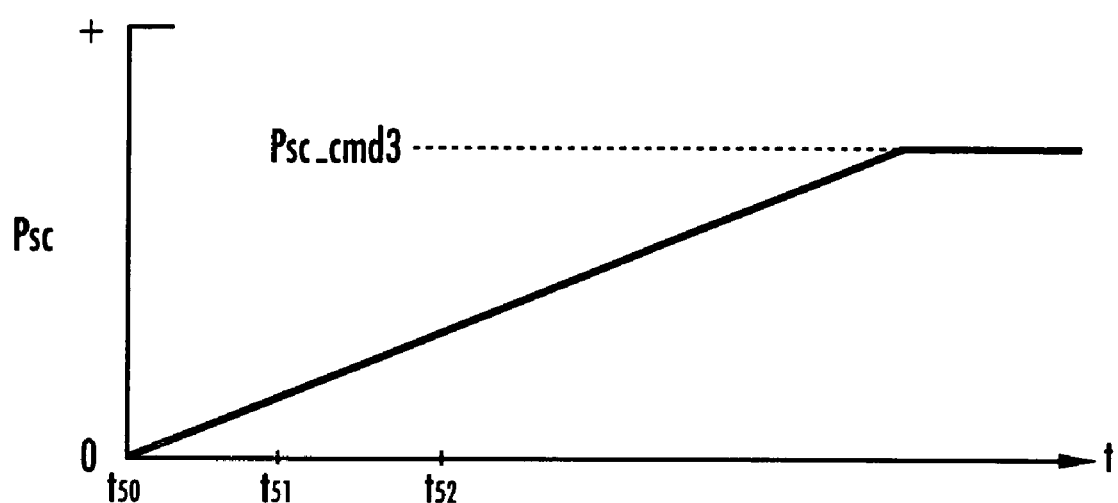
FIGS. 12A and 12B are graphs illustrating displacements of the shift arm in the shifting operation in the manual transmission.
Figure 12:
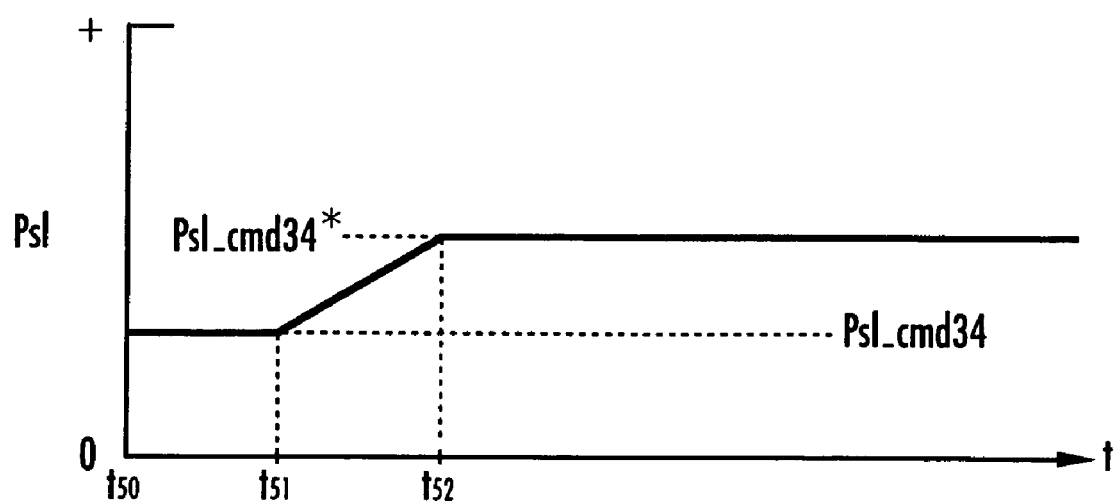
Figure 13:
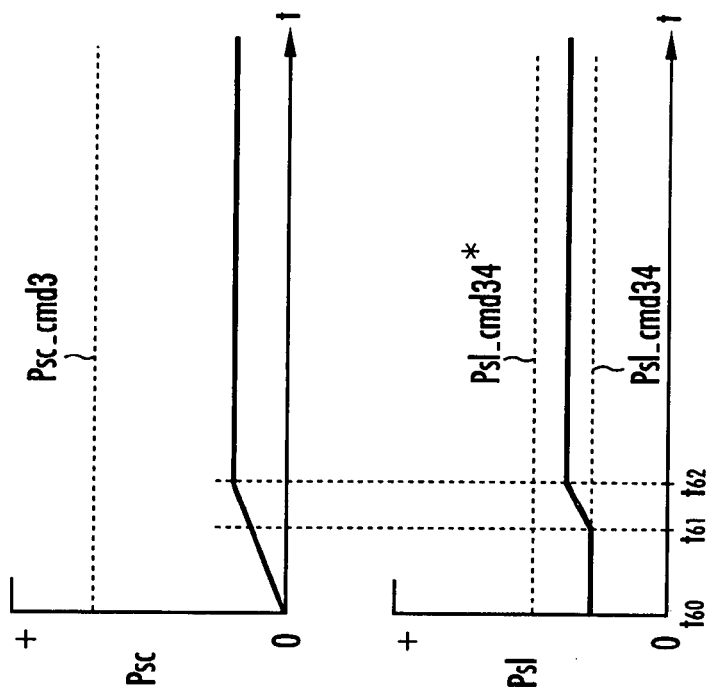
FIGS. 13A and 13B are explanatory diagrams of a shifting operation in an automatic/manual transmission.
Figure 13:
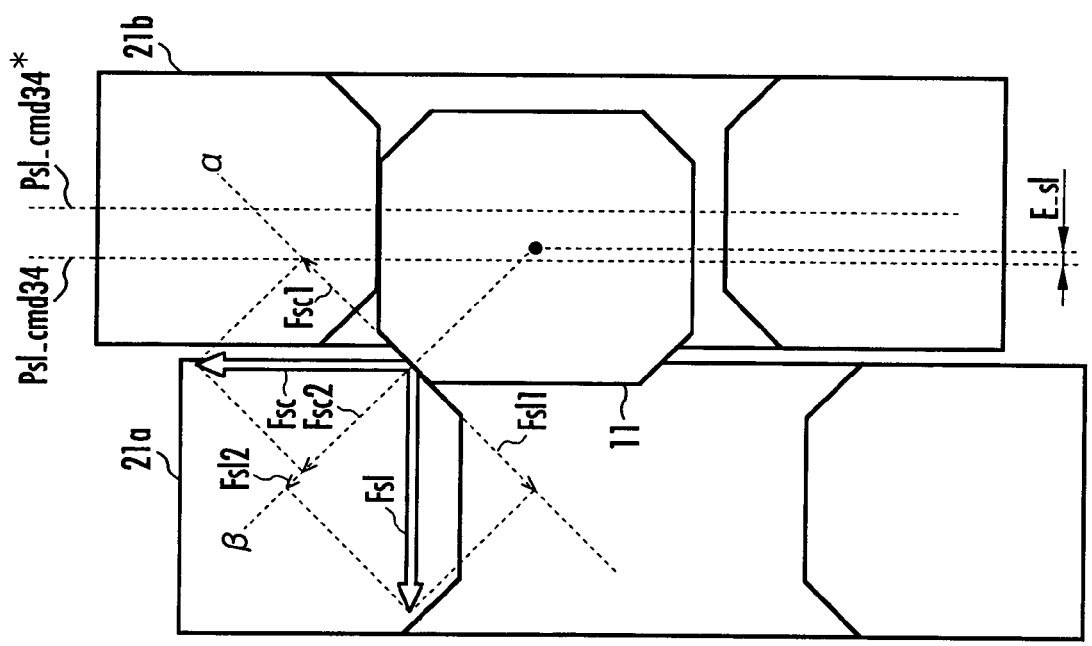
Figure 15:
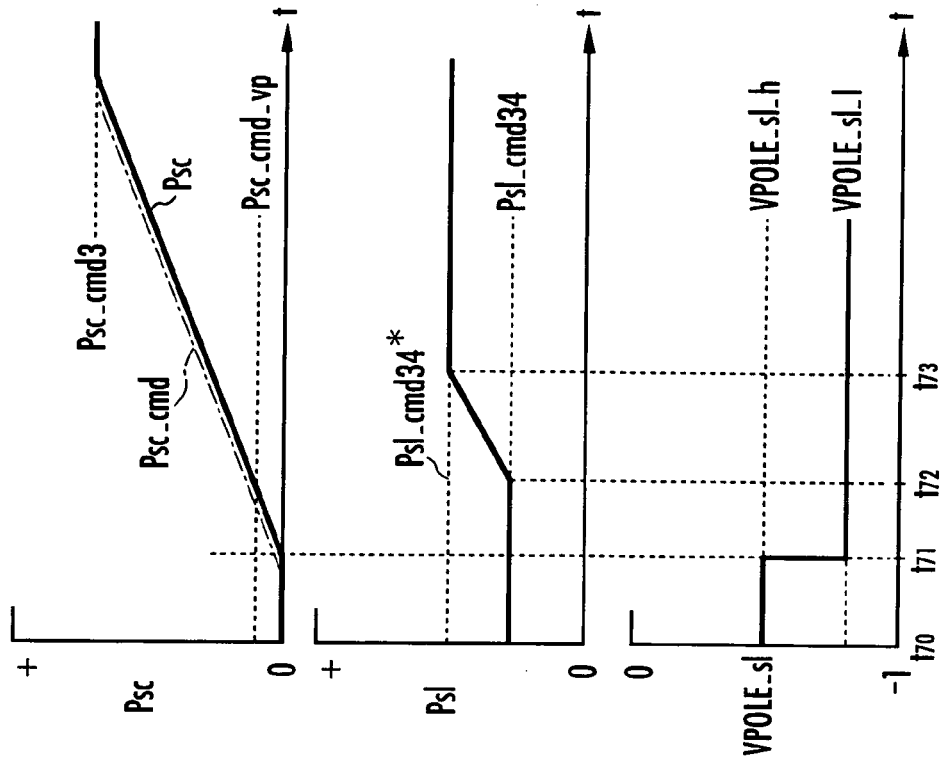
FIGS. 15A and 15B are explanatory diagrams illustrating the shifting operation when a response specifying parameter is changed in the automatic/manual transmission.
Figure 15:
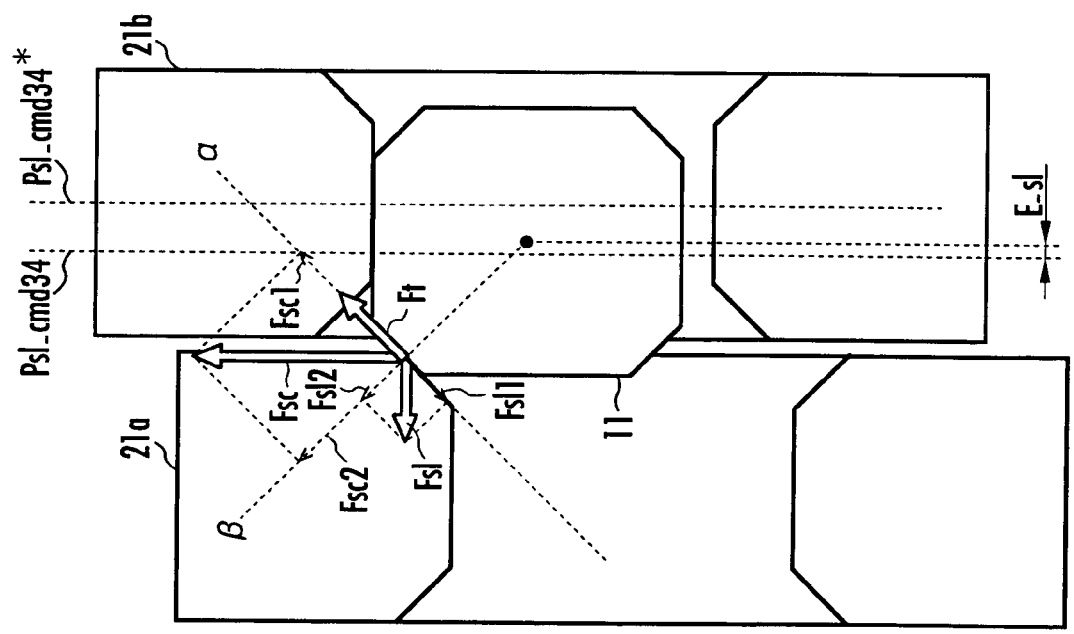
Figure 16:
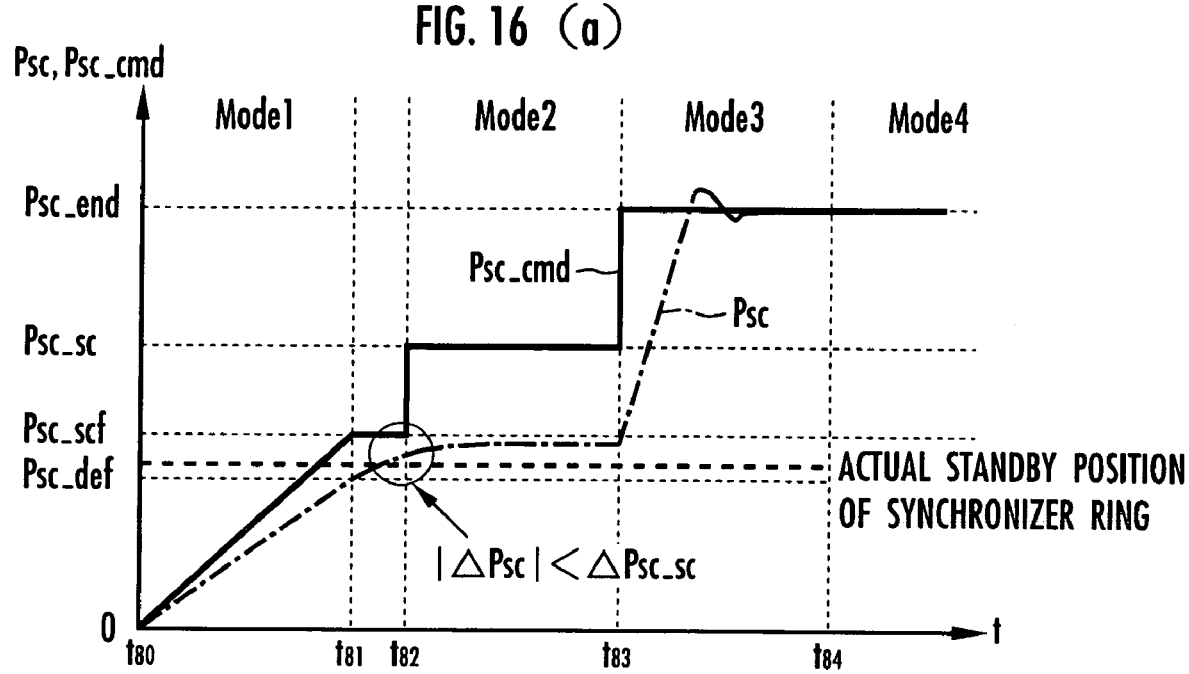
FIGS. 16A and 16B are graphs illustrating displacements of the shift arm in the shifting operation and set response specifying parameters.
Figure 16:
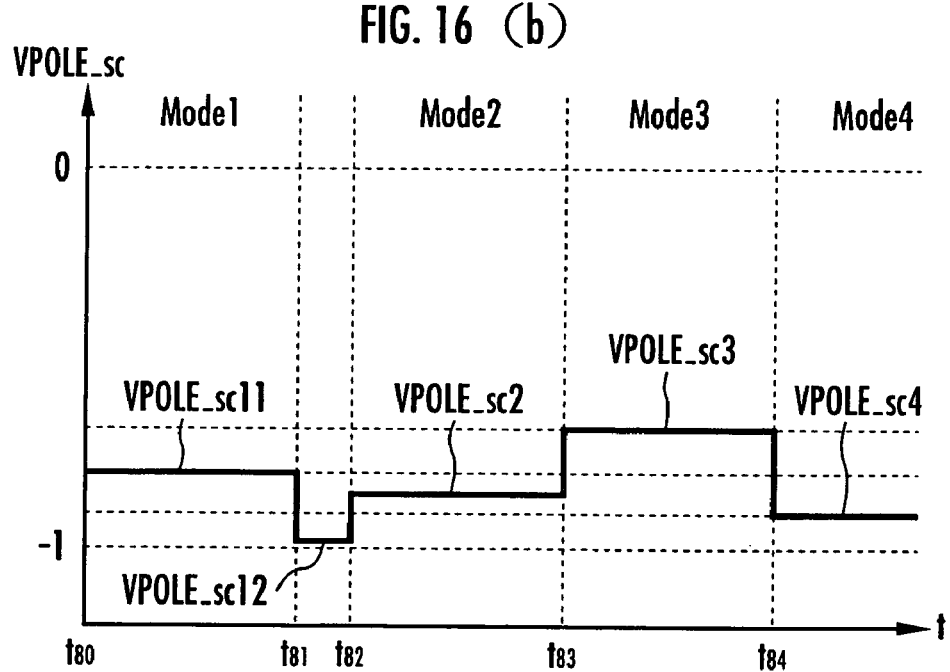
Figure 17:
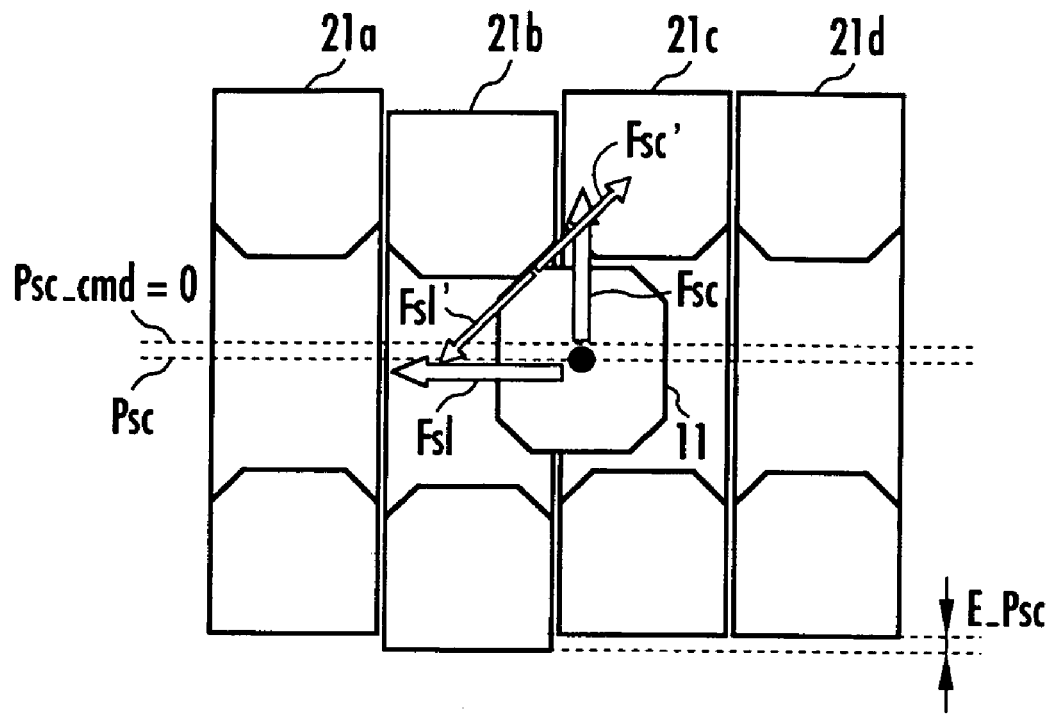
FIGS. 17A and 17B are explanatory diagrams of a selecting operation in the automatic/manual transmission.
Figure 17:
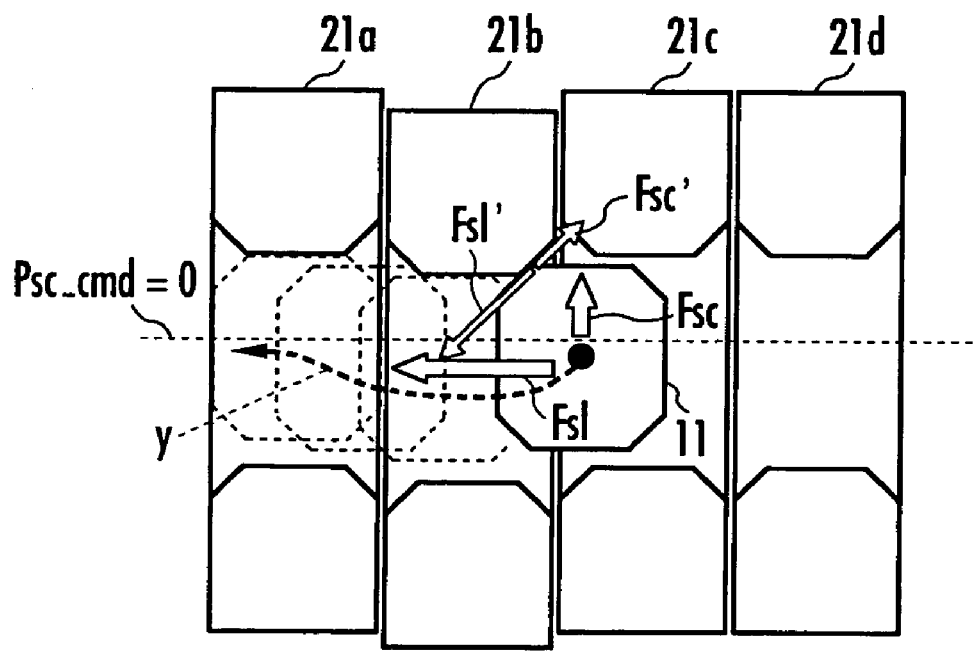

An embodiment in accordance with the present invention will be described with reference to FIG. 1 through FIG. 24. FIG. 1 is a block diagram of a transmission; FIGS. 2A and 2B are detailed diagrams of a shifting/selector of the transmission; FIGS. 3A, 3B, 3C and 3D are operation explanatory diagrams of the transmission; FIG. 4 is a block diagram of a control unit shown in FIG. 1; FIG. 5 is a block diagram of a shift controller shown in FIG. 4; FIGS. 6A and 6B are graphs illustrating behaviors of a shift arm converging to a target position in a shifting operation; FIG. 7 is a block diagram of a selection controller shown in FIG. 4; FIG. 8 is a block diagram of a virtual plant related to a processing method for identifying model parameters; FIG. 9 is a graph illustrating a behavior of the shift arm converging to a target position in a selecting operation; FIG. 10 is a graph illustrating a behavior of the shift arm converging to a target position in the selecting operation in the case of a transmission with a different dynamic characteristic; FIGS. 11A and 11B are explanatory diagrams of a shifting operation of a manual transmission; FIGS. 12A and 12B are graphs illustrating displacements of the shift arm in the shifting operation in the manual transmission; FIGS. 13A and 13B are explanatory diagrams of a shifting operation in an automatic/manual transmission; FIG. 14 shows graphs illustrating changes in a disturbance suppressing capability that take place when response specifying parameters are changed; FIGS. 15A and 15B are explanatory diagrams illustrating the shifting operation when response specifying parameters are changed in the automatic/manual transmission; FIGS. 16A and 16B are graphs illustrating displacements of the shift arm in the shifting operation and set response specifying parameters; and FIGS. 17A and 17B are explanatory diagrams of a selecting operation in the automatic/manual transmission.

Figure 18:
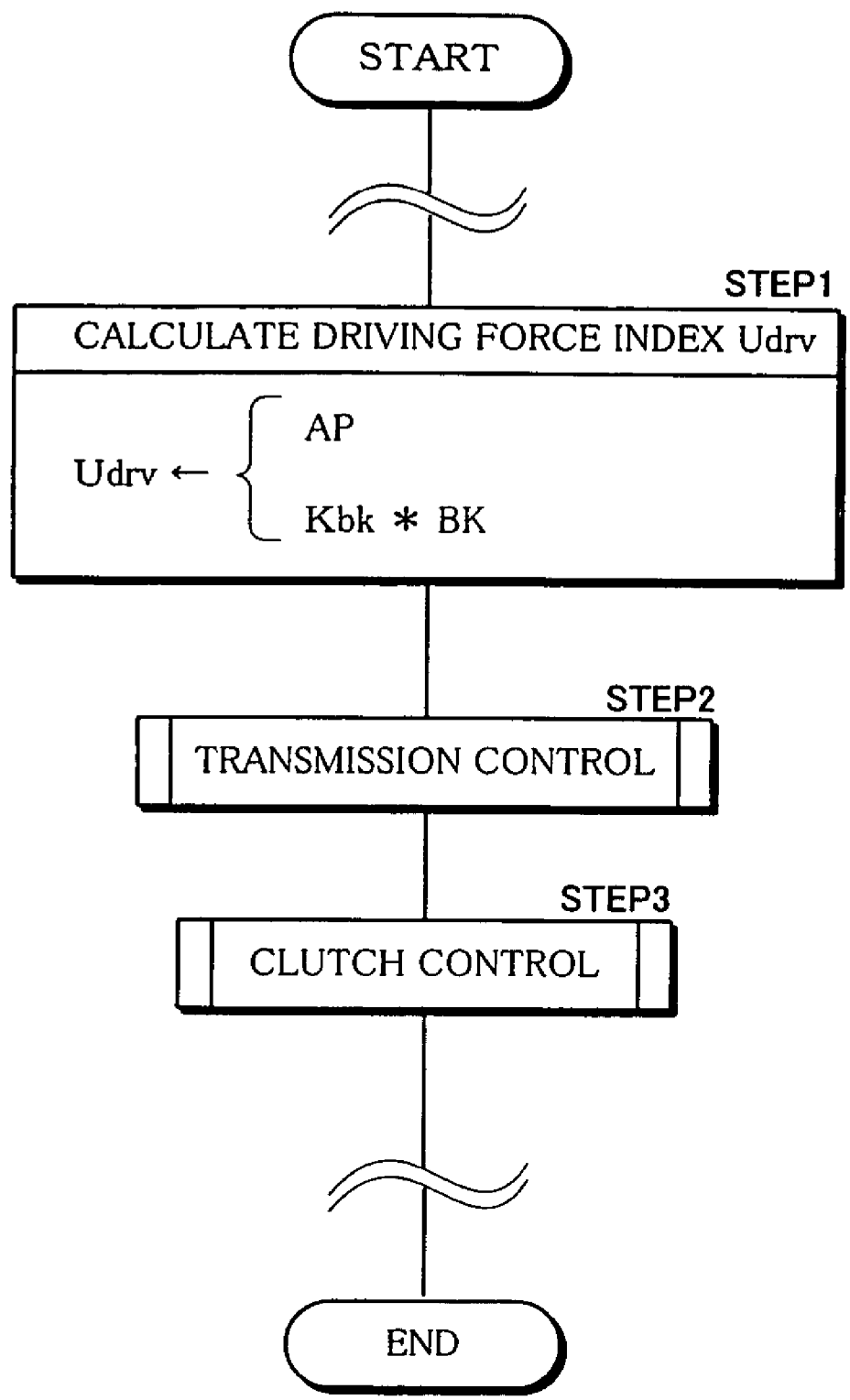
FIG. 18 shows a main flowchart of an operation performed by a control unit.
Figure 19:
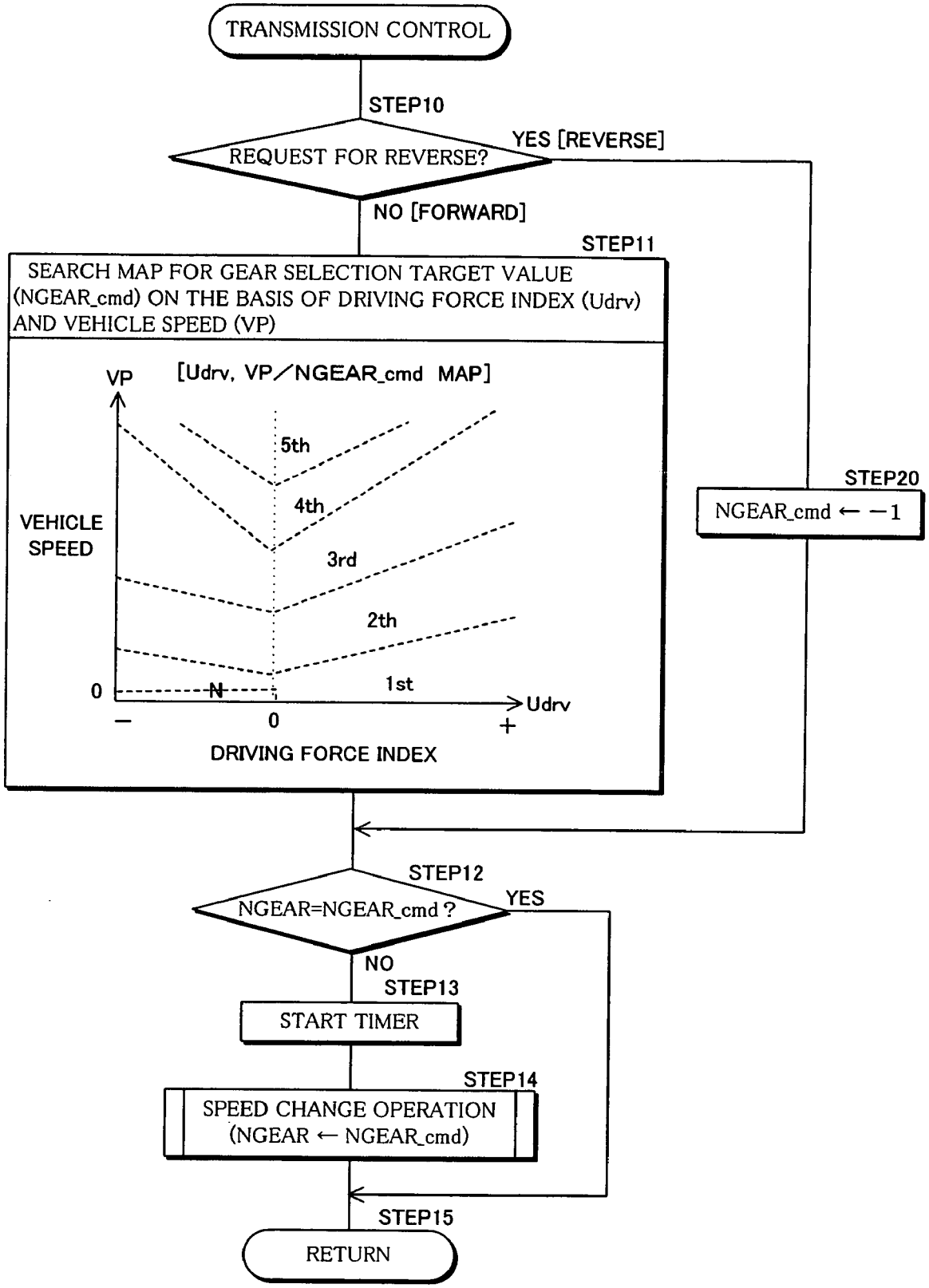
FIG. 19 shows a flowchart of transmission control.
Figure 20:
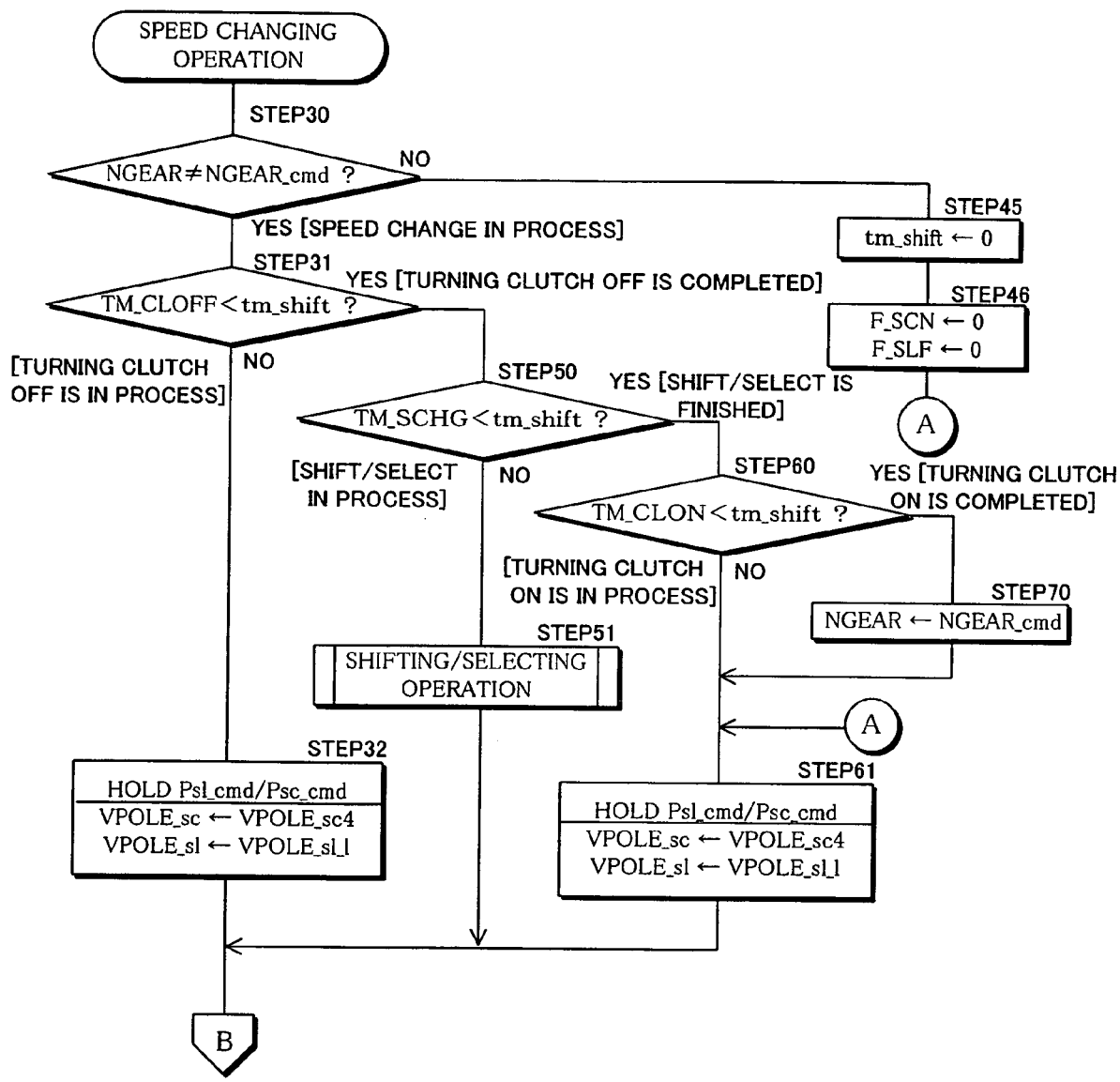
FIG. 20 shows a flowchart of a speed changing operation.
Figure 21:
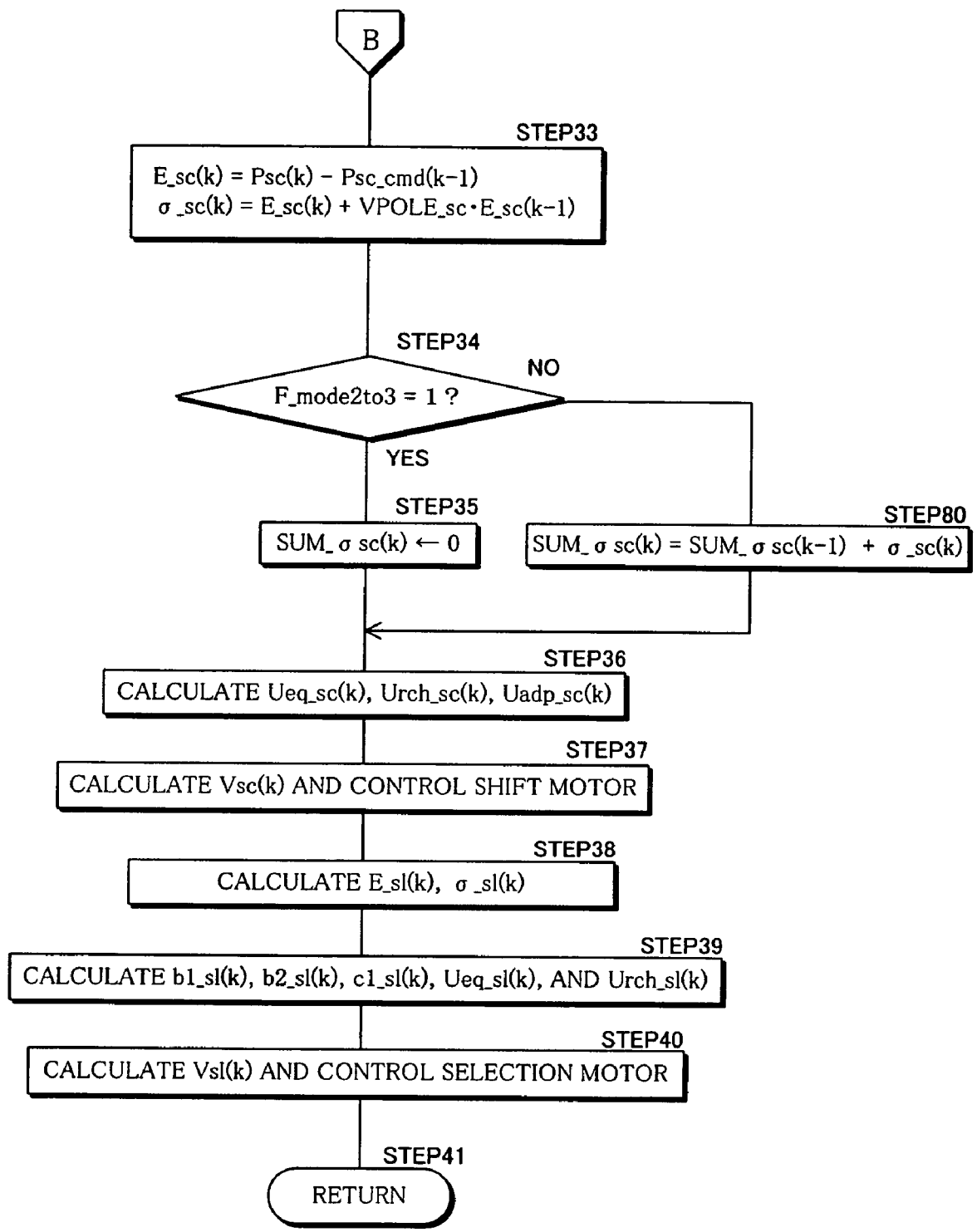
FIG. 21 shows a flowchart of the speed changing operation.
Figure 22:
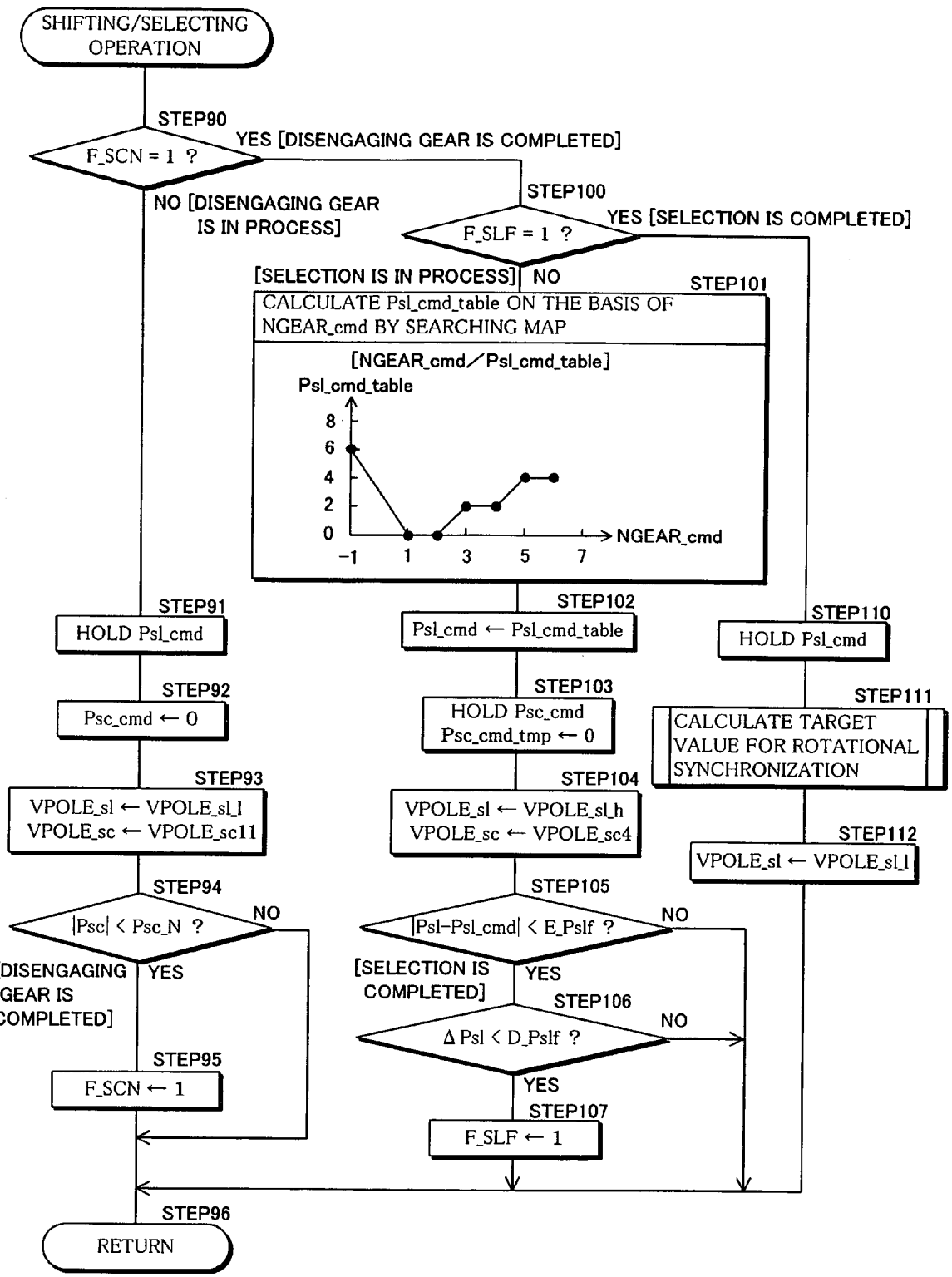
FIG. 22 shows a flowchart of shifting/selecting operations.
Figure 23:
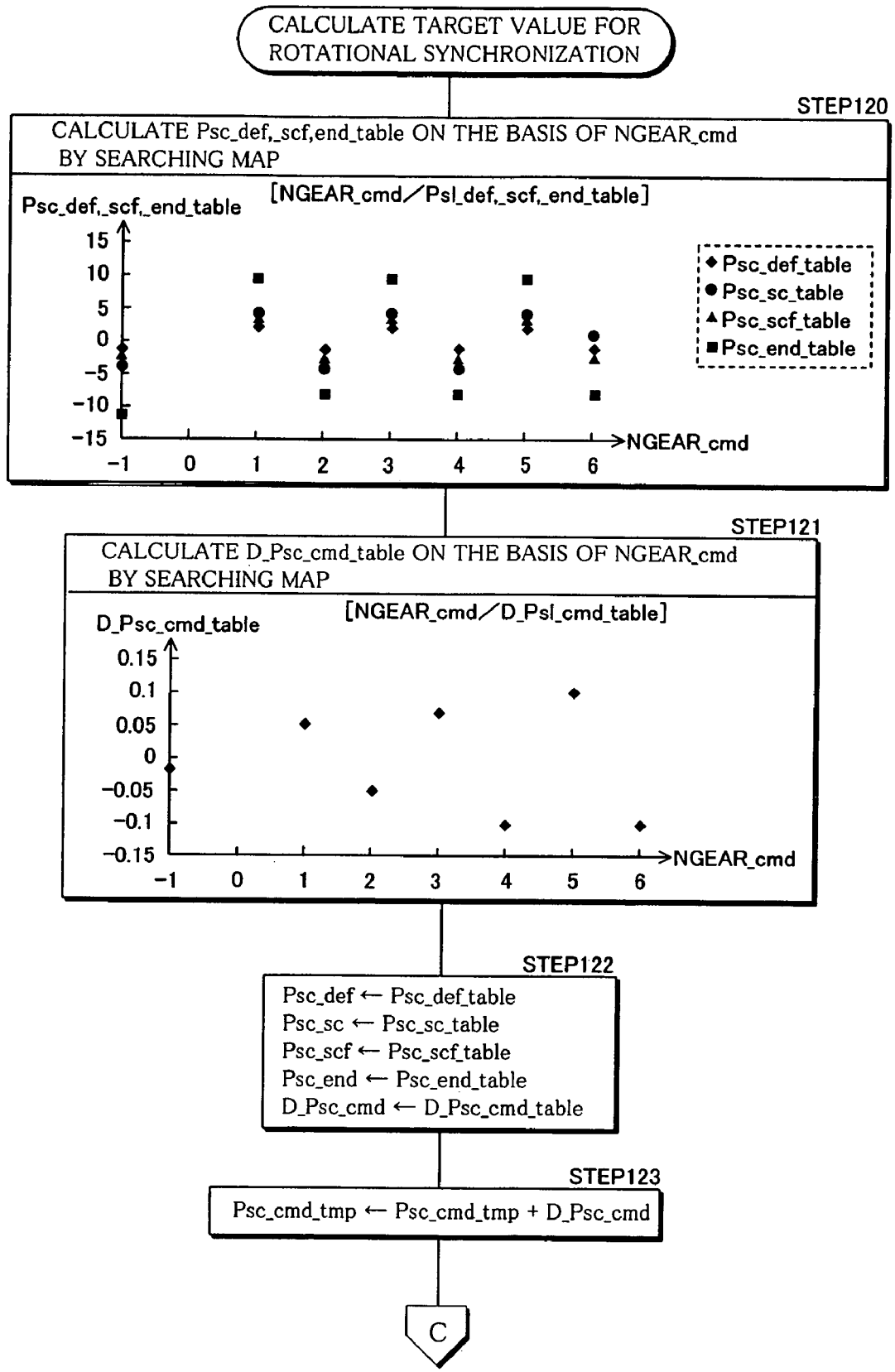
FIG. 23 shows a flowchart of an operation for calculating a target value for rotational synchronization.
Figure 24:
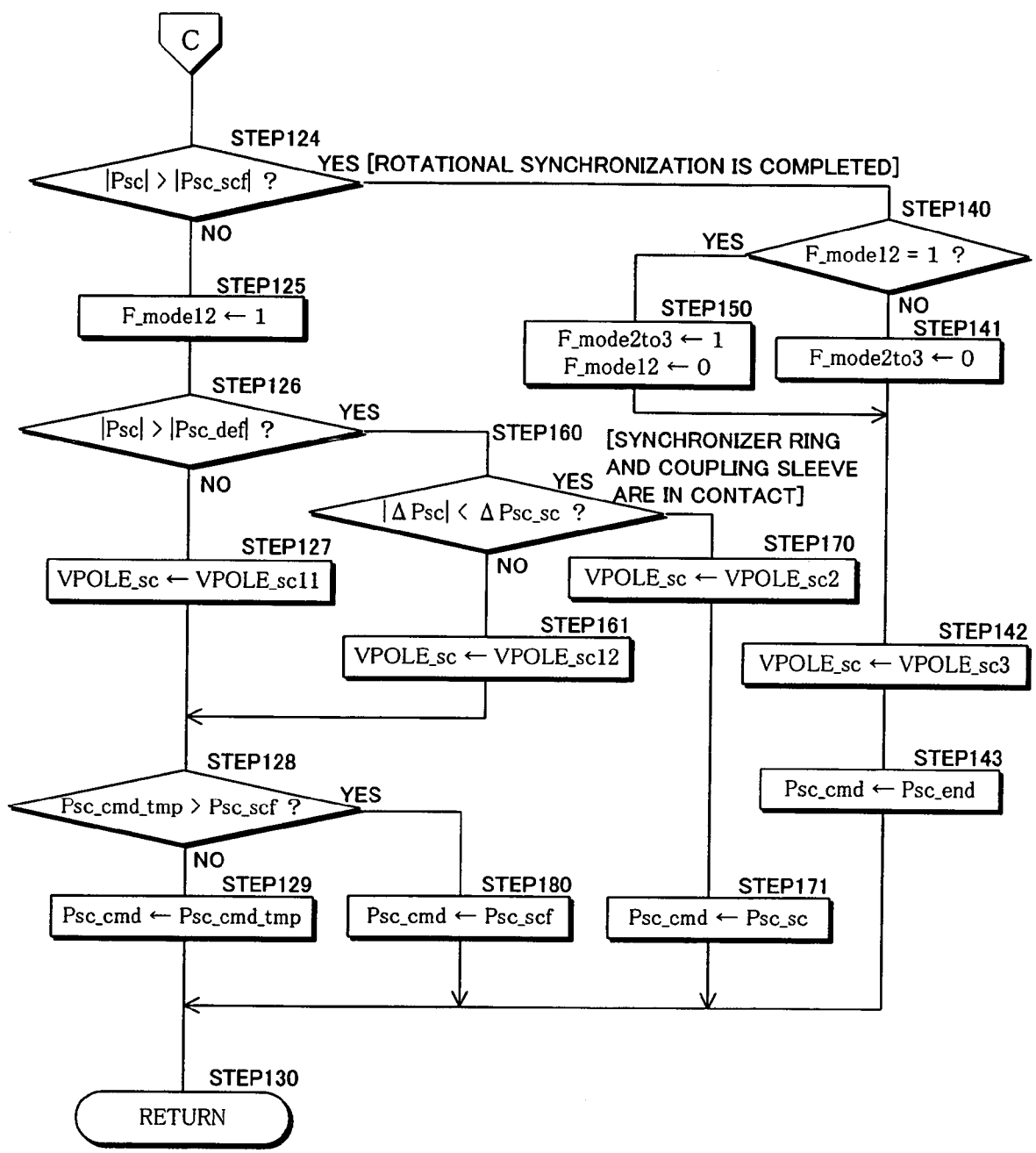
FIG. 24 shows another flowchart of the operation for calculating the target value for the rotational synchronization.
Figure 25:
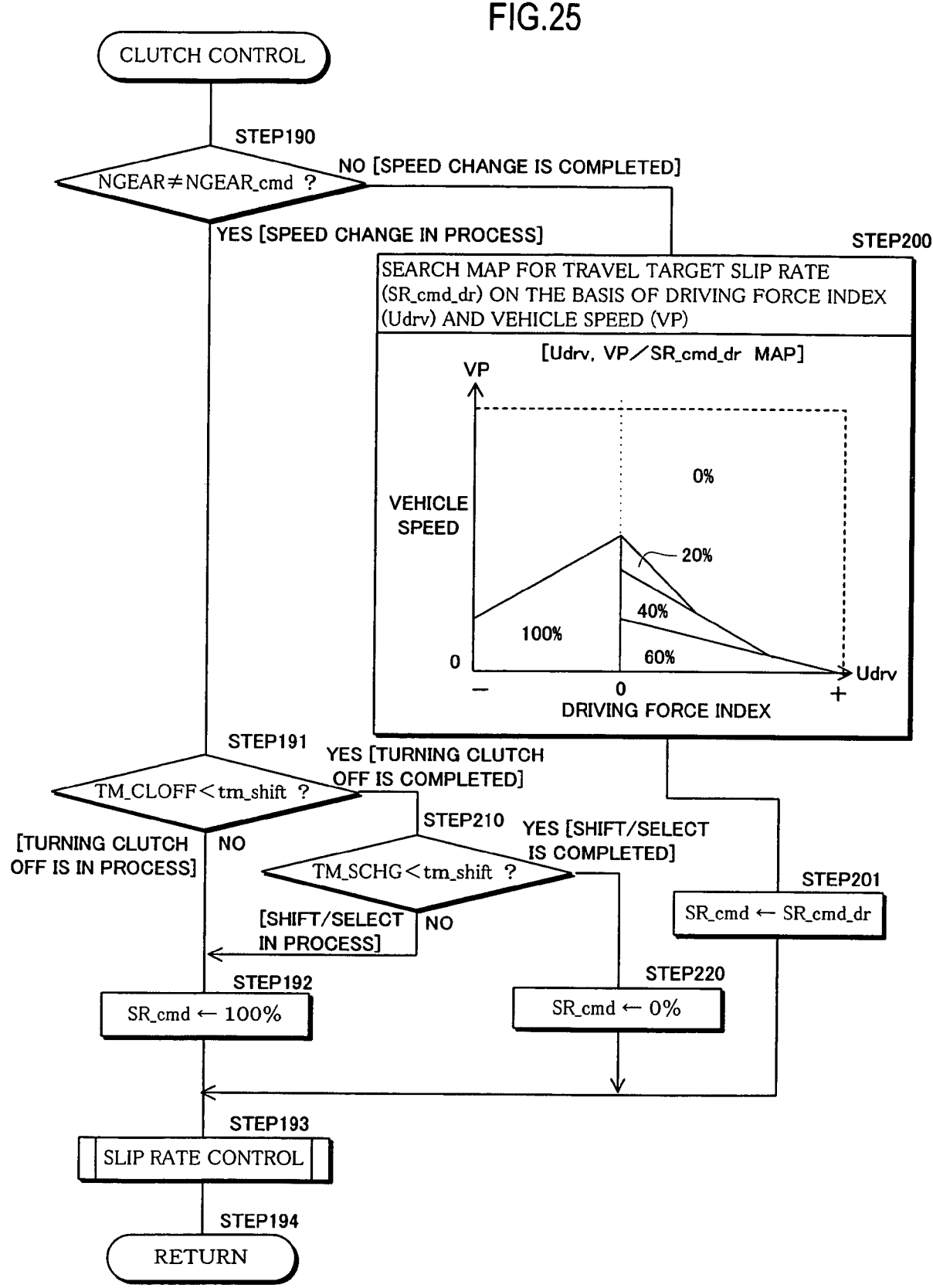
FIG. 25 shows a flowchart of clutch control.
Figure 26:
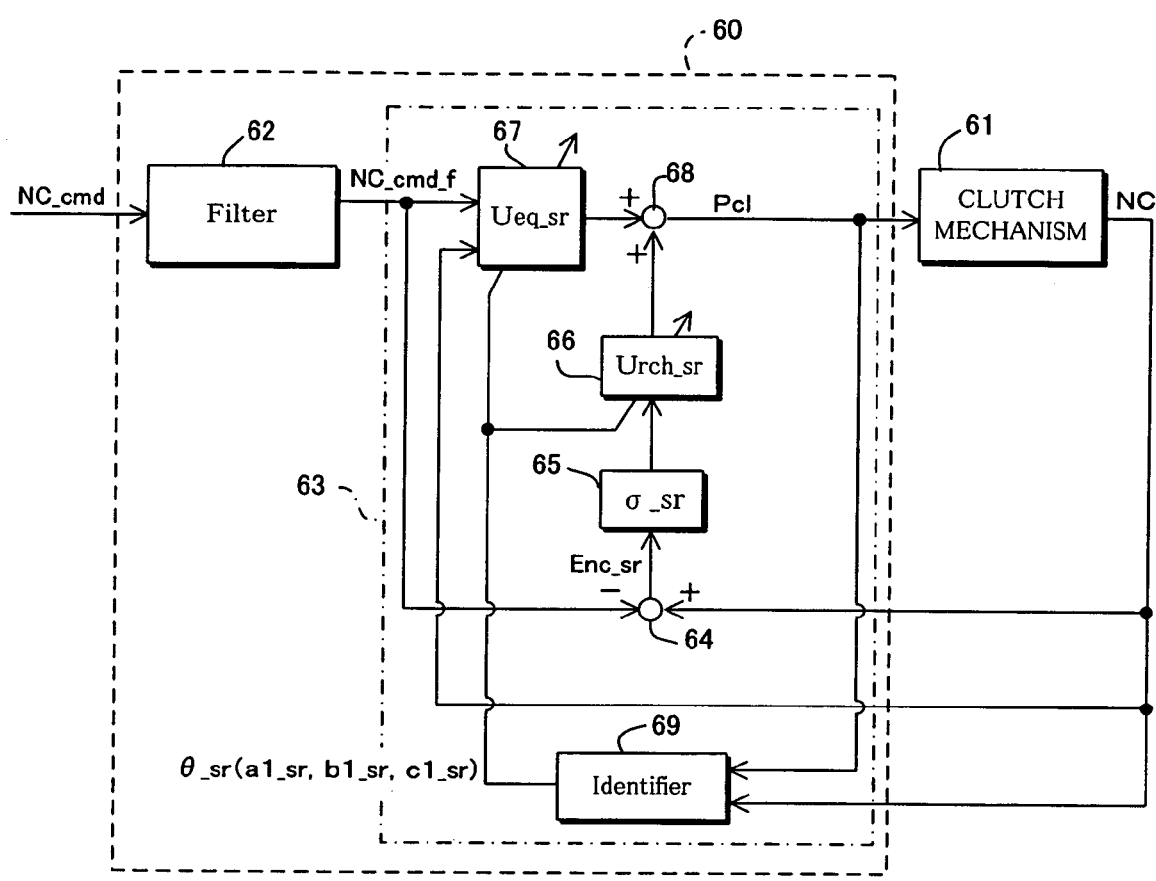
FIG. 26 is a block diagram of a clutch slip rate controller.
Figure 27:
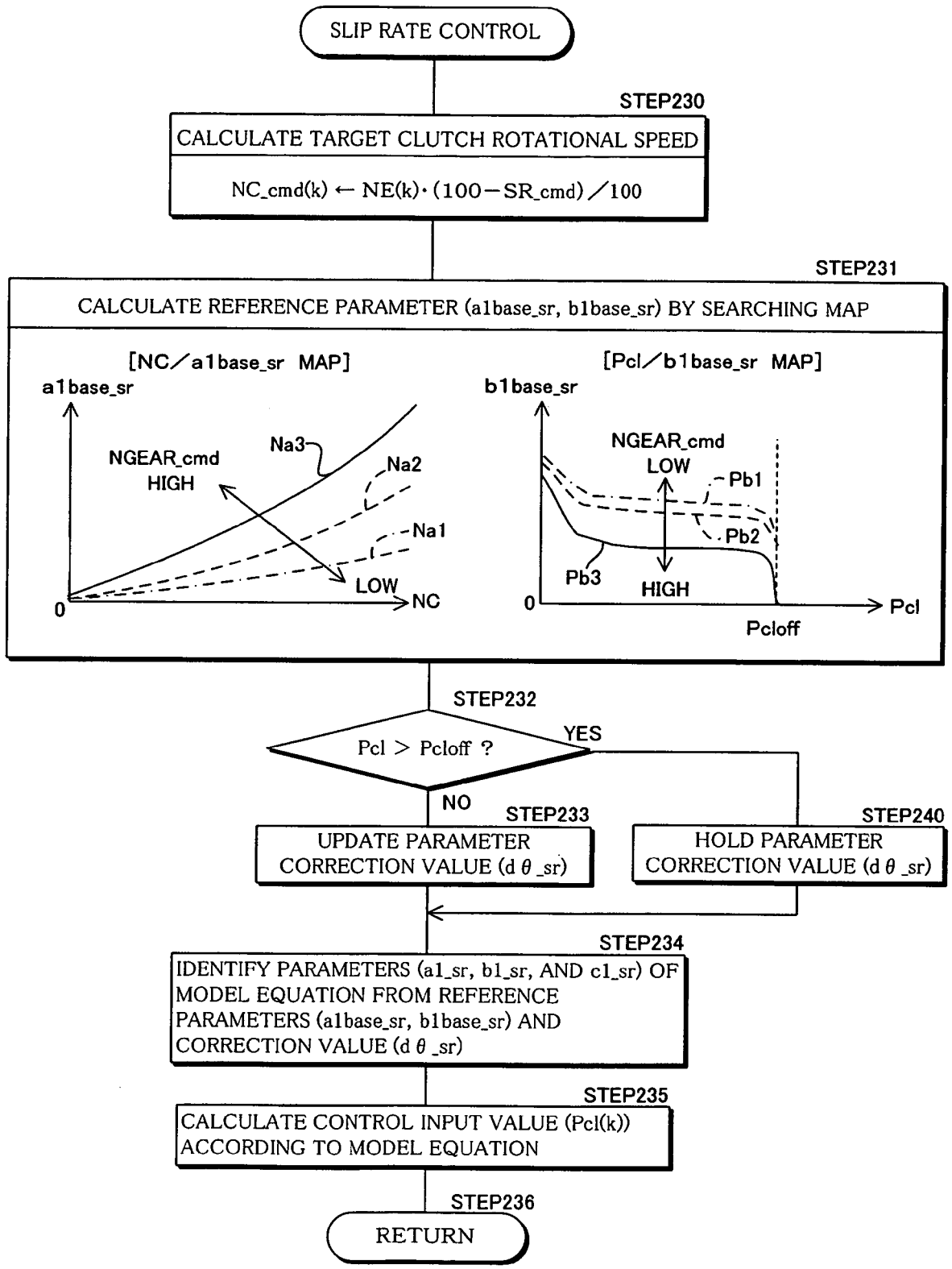
FIG. 27 is a flowchart of slip rate control.
Figure 28:
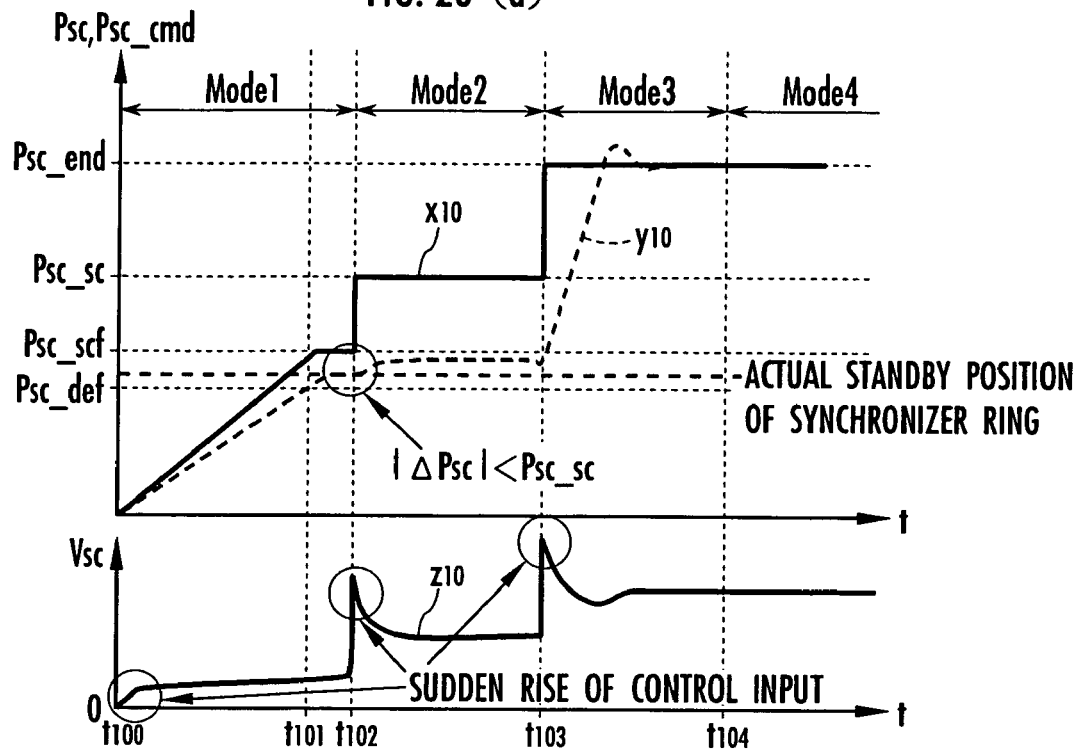
FIGS. 28A and 28B are graphs illustrating behaviors of a shift arm converging to a target position in a shifting operation performed by a conventional control unit.
Figure 28:
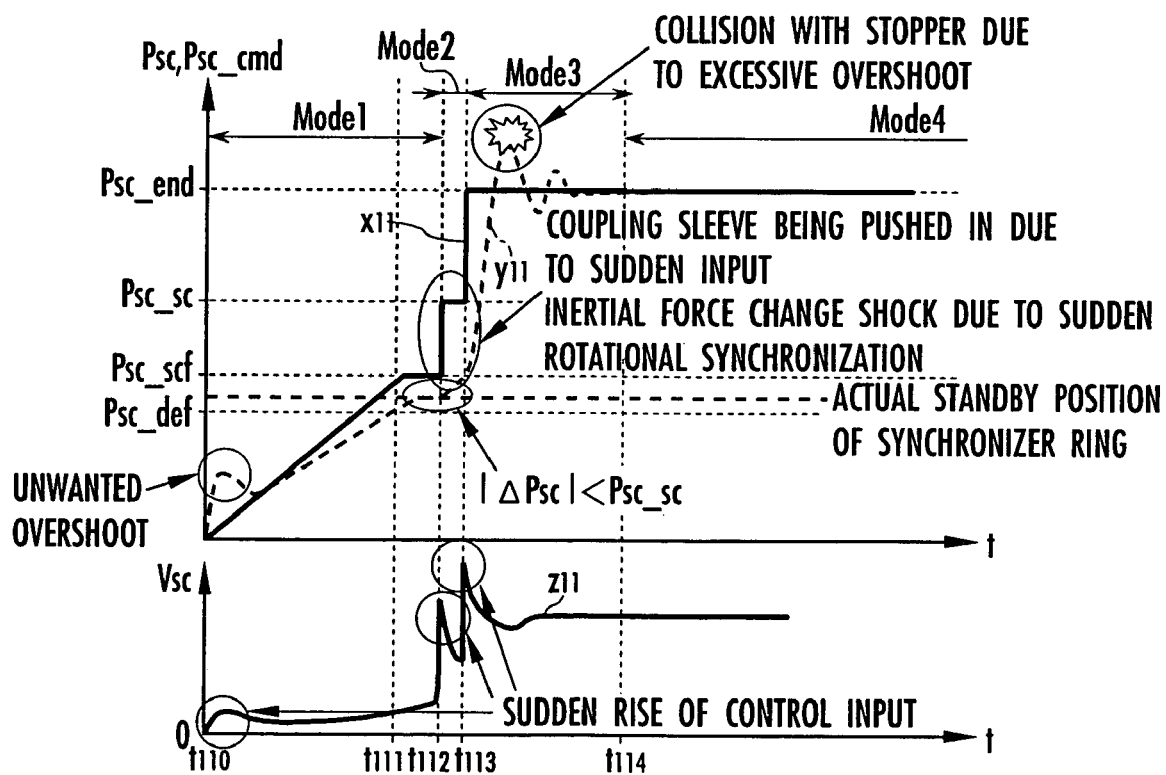
Figure 29:
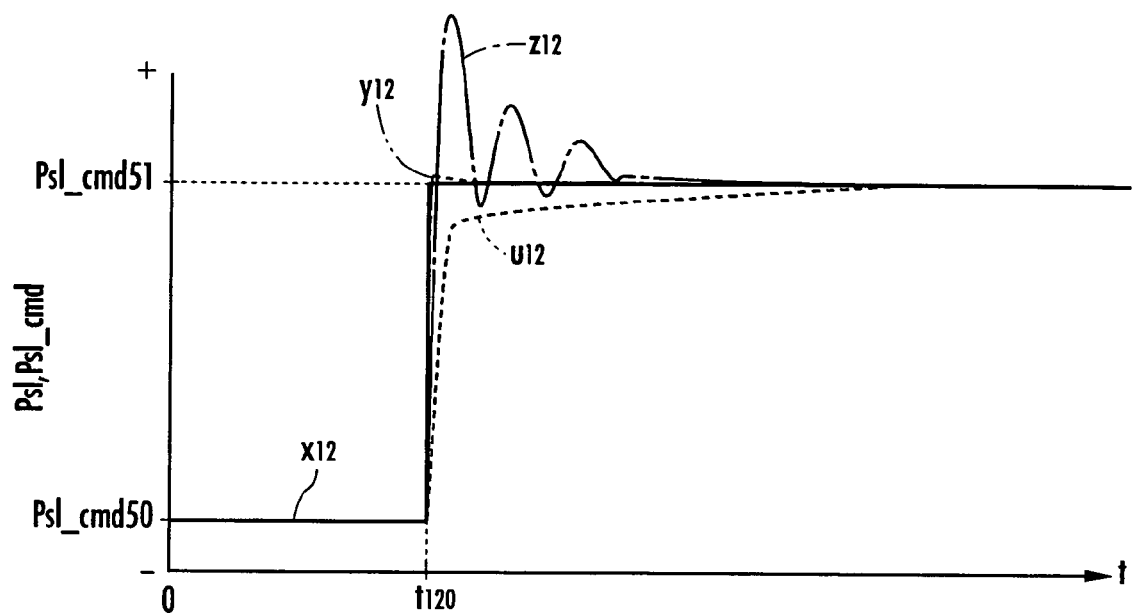
FIG. 29 is a graph illustrating behaviors of a shift arm converging to a target position in a selecting operation performed by the conventional control unit.

FIG. 18 shows a main flowchart of a control unit; FIG. 19 shows a flowchart of transmission control; FIGS. 20 and 21 show flowcharts of a speed changing operation; FIG. 22 shows a flowchart of shifting/selecting operations; FIGS. 23 and 24 show flowcharts of an operation for calculating a target value in a rotational synchronizing operation; FIG. 25 shows a flowchart of clutch control; FIG. 26 is a block diagram of a clutch slip rate controller; and FIG. 27 is a flowchart of slip rate control.

Referring to FIG. 1, a transmission 80 is mounted in a vehicle to transmit outputs of an engine 81 through the intermediary of a clutch assembly 82 and a connecting gear 90. The connecting gear 90 meshes with a gear 91 of a differential 93 so as to transmit outputs of the engine 81 to drive wheels 94 through the intermediary of a drive shaft 92.

The operation of the transmission 80 is controlled by a control unit 1 (corresponding to a control unit of the transmission in accordance with the present invention), which is an electronic unit composed primarily of a microcomputer and memories. The control unit 1 drives a selection motor 12 (corresponding to a selection actuator in the present invention), a shift motor 13, and a clutch actuator 16 according to the states of an accelerator pedal 95, a fuel supply control unit 96, a change lever 97, a clutch pedal 98, and a brake pedal 99 so as to control the speed changing operation of the transmission 80.

The transmission 80 has an input shaft 5, an output shaft 4, pairs of first through sixth forward gears 7a through 7f and 9a through 9f, and a reverse gear shaft 84 and reverse gear trains 83, 85 and 86. The input shaft 5, the output shaft 4, and the reverse gear shaft 84 are disposed to be parallel to each other.

The pairs of first to sixth forward gears 7a through 7f and 9a through 9f are set to different gear ratios from each other. The first forward gear 7a on an input side and the second forward gear 7b on the input side are provided integrally with the input shaft 5. The corresponding first forward gear 9a on an output side and a second forward gear 9b on the output side are composed of idle gears that are rotative with respect to the output shaft 4. A first/second gear synchronizer 2a switches between two modes, namely, a mode in which the first forward gear 9a on the output side and the second forward gear 9b on the output side are selectively connected to the output shaft 4 (new speed established mode) and a mode in which both gears 9a and 9b are disengaged from the output shaft 4 (neutral mode).

A third forward gear 7c on the input side and a fourth forward gear 7d on the input side are composed of idle gears rotative with respect to the input shaft 5. The corresponding third forward gear 9c on an output side and a fourth forward gear 9d on the output side are formed integrally with the output shaft 4. A third/fourth gear synchronizer 2b switches between two modes, namely, a mode in which the third forward gear 7c on the input side and the fourth forward gear 7d on the input side are selectively connected to the input shaft 5 (new speed established mode) and a mode in which both gears 7c and 7d are disengaged from the input shaft 5 (neutral mode).

Similarly, a fifth forward gear 7e on the input side and a sixth forward gear 7f on the input side are composed of idle gears rotative with respect to the input shaft 5. The corresponding fifth forward gear 9e on the output side and a sixth forward gear 7f on the output side are formed integrally with the output shaft 4. A fifth/sixth gear synchronizer 2c switches between two modes, namely, a mode in which the fifth forward gear 7e on the input side and the sixth forward gear 7f on the input side are selectively connected to the input shaft 5 (new speed established mode) and a mode in which both gears 7e and 7f are disengaged from the input shaft 5 (neutral mode).

The reverse gear trains 83, 85 and 86 are formed of a first reverse gear 85 mounted on a reverse gear shaft 84, a second reverse gear 83 provided integrally with the input shaft 5, and a third reverse gear 86 formed integrally with the first/second gear synchronizer 2a of the output shaft 4. The first reverse gear 85 is attached to the reverse gear shaft 84 by spline fitting. Thus, the first reverse gear 85 rotates integrally with the reverse gear shaft 84 and also freely slides in the axial direction of the reverse gear shaft 84 between a position where it meshes with both the second reverse gear 83 and the third reverse gear 86 and a position where its engagement with those gears is cleared (neutral position).

Furthermore, shift forks 10a, 10b, 10c, and 10d are connected to the synchronizers 2a, 2b, and 2c and the first reverse gear 85, respectively, and a shift piece (see FIG. 2) provided on a distal end of each shift fork is selectively engaged with a shift arm 11. The shift arm 11 is rotated by the selection motor 12, and the shift forks are provided substantially linearly in parallel in an arcuate direction (a selecting direction) in which the shift arm 11 is rotated. The shift arm 11 is selectively positioned at positions where it engages with any one of the shift pieces.

The shift arm 11 is moved in an axial direction parallel to the input shaft 5 (a shifting direction) by the shift motor 13, the shift arm 11 being in engagement with one of the shift pieces. The shift arm 11 is positioned at the neutral position and a position where each speed is established (a shift position).

FIG. 2A shows a construction of the synchronizer 2b shown in FIG. 1. The synchronizer 2c has the same construction as that of the synchronizer 2b. The synchronizer 2a is the same as the synchronizers 2b and 2c in basic construction and operation except that it is mounted on the output shaft 4.

The synchronizer 2b has a coupling sleeve 22 (corresponding to a first engaging member in the present invention) that integrally rotates with the input shaft 5, a synchronizer ring 23a (corresponding to a synchronizing member in the present invention) that is provided rotatively on the input shaft 5 between the coupling sleeve 22 and the third forward gear 7c (corresponding to a second engaging member in the present invention) on the input side and installed movably in the axial direction (corresponding to a shifting direction) of the input shaft 5, a synchronizer ring 23b (corresponding to a synchronizing member in the present invention) that is provided rotatively on the input shaft 5 between the coupling sleeve 22 and the fourth forward gear 7d (corresponding to a second engaging member in the present invention) on the input side and installed movably in the axial direction of the input shaft 5, and a shift fork 10b connected to the coupling sleeve 22.

A shift piece 21 fixed on a distal end of the shift fork 10b engages the shift arm 11 fixed on a shift/select shaft 20. The shift/select shaft 20 rotates as the selection motor 12 is actuated to perform the selecting operation, and moves in the axial direction as the shift motor 13 is actuated to perform the shifting operation. Performing the shifting operation with the shift arm 11 being engaged with the shift piece 21 by the selecting operation causes the coupling sleeve 22 to be displaced from the neutral position toward the third forward gear 7c on the input side when the third gear is selected, or toward the fourth forward gear 7d on the input side when the fourth gear is selected.

Both ends of the coupling sleeve 22 are hollow, splines 30a and 30b being formed on the inner peripheral surfaces of the hollow portions. The outer peripheral surface of the synchronizer ring 23a has a spline 31a engageable with a spline 30a of the coupling sleeve 22. The outer peripheral surface of the third forward gear 7c on the input side that opposes the synchronizer ring 23a also has a spline 32a engageable with the spline 30a of the coupling sleeve 22.

Similarly, the outer peripheral surface of the synchronizer ring 23b has a spline 31b engageable with the spline 30b of the coupling sleeve 22. The outer peripheral surface of the fourth forward gear 7d on the input side that opposes the synchronizer ring 23b also has a spline 32b engageable with the spline 30b of the coupling sleeve 22.

When the coupling sleeve 22, which has rotated together with the input shaft 5, is moved toward the third forward gear 7c on the input side by the shift fork 10b, the coupling sleeve 22 comes in contact with the synchronizer ring 23a, and then the synchronizer ring 23a is also brought into contact with the third forward gear 7c on the input side. At this time, the frictional force produced by the contact synchronizes the rotational speeds of the coupling sleeve 22 and the third forward gear 7c on the input side through the intermediary of the synchronizer ring 23a.

With the rotational speeds of the coupling sleeve 22 and the third forward gear 7c on the input side synchronized, the coupling sleeve 22 is further moved toward the third forward gear 7c on the input side to cause the spline 30a formed on the coupling sleeve 22 to pass by the spline 31a formed on the synchronizer ring 23a and then to engage the spline 32a formed on the third forward gear 7c on the input side. This sets an established new speed state in which motive power is transmitted between the input shaft 5 and the output shaft 4.

Similarly, moving the coupling sleeve 22, which has rotated together with the input shaft 5, toward the fourth forward gear 7d on the input side by the shift fork 10b synchronizes the rotational speeds of the coupling sleeve 22 and the fourth forward gear 7d on the input side through the intermediary of the synchronizer ring 23b. Then, the spline 30b formed on the coupling sleeve 22 passes by the spline 31b formed on the synchronizer ring 23b and engages the spline 32b formed on the fourth forward gear 7d on the input side.

FIG. 2B shows linearly disposed shift pieces 21a, 21b, 21c and 21d observed from the shift arm 11. In the selecting operation, the shift arm 11 is moved in a direction Psl, which is the selecting direction, shown in FIG. 2B. The shift arm 11 is positioned at a 1st/2nd gear select position Psl_12, a 3rd/4th gear select position Psl_34, a 5th/6th gear select position Psl_56, or a reverse select position Psl_r, and then engaged with the shift piece 21a, 21b, 21c or 21d. In the shifting operation, the shift arm 11 is moved in a direction Psc, which is the shifting direction in FIG. 2B, to establish a new speed (one of the first to sixth speeds or reverse).

FIGS. 3A through 3D illustrate the operation of the shift arm 11 when a state wherein the second speed has been established is replaced by the third speed. Positioning of the shift arm 11 is carried out in the order of FIG. 3A, FIG. 3B, FIG. 3C, and FIG. 3D. FIG. 3A illustrates a state wherein the second speed has been established, the shift arm 11 being engaged with the shift piece 21a. The position Psl of the shift arm 11 in the selecting direction is set at the 1st/2nd gear select position Psl_12, while the position P_sc of the shift arm 11 in the shifting direction is set at the 1st speed shift position Psc_1.

In the step illustrated in FIG. 3B, the position Psc of the shift arm 11 in the shifting direction is set at the neutral position 0 to enable the selecting operation. In the step illustrated in FIG. 3C, the shift arm 11 is set at a 3rd/4th gear select position Psc_34 by the selecting operation. This causes the shift arm 11 to engage the shift piece 21b. In the step illustrated in FIG. 3D, the shift arm 11 is moved from the neutral position to a third speed shift position Psc_3 by the shifting operation so as to establish the third speed.

Referring to FIG. 4, the control unit 1 has a target position calculator 52 for setting a target position Psc_cmd of the shift arm 11 in the shifting direction and a target position Psl_cmd of the shift arm 11 in the selecting direction, and a shift controller 50 (corresponding to a positioning controller in the present invention) that controls a voltage Vsc to be applied to the shift motor 13 such that an actual position Psc of the shift arm 11 in the shifting direction agrees with the target position Psc_cmd. The control unit 1 further includes a selection controller 51 (corresponding to another positioning controller in the present invention) that controls a voltage Vsl to be applied to the selection motor 12 such that an actual position Psl of the shift arm 11 in the selecting direction agrees with the target position Psl_cmd.

The shift controller 50 has a sliding mode controller 53 that employs sliding mode control to determine the voltage Vsc to be applied to the shift motor 13, and a VPOLE_sc calculator 54 that sets a response specifying parameter VPOLE_sc in the sliding mode controller 53.

Referring to FIG. 5, the sliding mode controller 53 incorporated in the shift controller 50 includes a target value filter 41 that carries out filtering computation according to an equation (1) shown below on a target position Psc_cmd of the shift arm 11 in the shifting direction so as to obtain a filtering target value Psc_cmd_f.

$$Psc\_cmd\_f(k) = -VPOLE\_f\_sc \cdot Psc\_cmd\_f(k) + (1 + VPOLE\_f\_sc) \cdot Psc\_cmd(k) \quad (1)$$

where VPOLE_f_sc: Target value filter coefficient; and Psc_cmd_f(k): Filtering target value in a k-th control cycle.

The sliding mode controller 53 has a subtracter 42 that uses the following equation (2) to model the construction of a shifting mechanism 40 for positioning the shift arm 11 in the shifting direction in the transmission 80, and calculates a difference E_sc between a filtering target value Psc_cmd_f (k) and a position Psc(k) of the shift arm 11 in the shifting direction, and a switching function value calculator 43 that calculates a value of a switching function σ_sc.

$$Psc(k+1) = a1\_sc \cdot Psc(k) + a2\_sc \cdot Psc(k-1) + b1\_sc \cdot Vsc(k) + b2\_sc \cdot Vsc(k-1) \quad (2)$$

where a1_sc, a2_sc, b1_sc, b2_sc: Model parameters

The sliding mode controller 53 further includes a reaching law input calculator 44 that calculates a reaching law input Urch_sc, an adaptation law input calculator 45 calculating an adaptation law input Uadp_sc, an equivalent control input calculator 46 that calculates an equivalent control input Ueq_sr, and an adder 47 that adds the equivalent control input Ueq_sr, the reaching law input Urch_sr, and the adaptation law input Uadp_sc so as to obtain a control value Vsl of the voltage to be applied to the shift motor 13.

The switching function value calculator 43 calculates a switching function value σ_sc(k) according to the following equation (4) from a difference E_sc(k) calculated by the subtracter 42 according to the following equation (3).

$$E\_sc(k) = Psc(k) - Psc\_cmd\_f(k-1) \quad (3)$$

where E_sc(k): Difference between a filtering target value Psc_cmd_f(k−1) and an actual position Psc(k) of the shift arm in the shifting direction in a k-th control cycle.

$$\sigma\_sc(k) = E\_sc(k) + VPOLE\_sc \cdot E\_sc(k-1) \quad (4)$$

where σ_sc(k): Switching function value in a k-th control cycle; and VPOLE_sc: Switching function setting parameter (−1<VPOLE_sc<0).

The adaptation law input calculator 45 calculates a switching function integral value SUM_σsc(k) according to the following equation (5), and calculates an adaptation law input Uadp_sc(k) according to the following equation (6). The adaptation law input Uadp_sc(k) is used to absorb a modeling error or disturbance to place a difference state amount (E_sc(k), E_sc(k−1)) on a switching straight line (σ_sc(k)=0).

$$SUM\_\sigma sc(k) = SUM\_\sigma sc(k-1) + \sigma\_sc(k) \quad (5)$$

where SUM_σsc(k): Switching function integral value in a k-th control cycle.

$$Uadp\_sc(k) = -\frac{Kadp\_sc}{b1\_sc} \cdot SUM\_\sigma sc(k) \quad (6)$$

where Uadp_sc(k): Adaptation law input in a k-th control cycle; and Kadp_sc: Feedback gain.

The reaching law input calculator 44 calculates the reaching law input Urch_sc(k) according to the following equation (7). The reaching law input Urch_sc(k) is used to place the difference state amount ($E\_sc(k)$, $E\_sc(k-1)$) on a switching straight line ($\sigma\_sc(k)=0$).

$$\text{Urch\_sc}(k) = -\frac{\text{Krch\_sc}}{b1\_sc} \cdot \sigma\_sc(k) \quad (7)$$

where $\text{Urch\_sc}(k)$: Reaching law input in a k-th control cycle; and $\text{Krch\_sc}$: Feedback gain.

The equivalent control input calculator 46 calculates an equivalent control input $\text{Ueq\_sc}(k)$ according to the following equation (8). Equation (8) is used to calculate, as an equivalent control input $\text{Ueq\_sc}(k)$, a control input $V_{sc}(k)$ to be supplied to the shift motor 13 obtained by substituting the above equations (4), (3) and (2) therein with $\sigma\_sc(k+1)=\sigma\_sc(k)$. The equivalent control input $\text{Ueq\_sc}(k)$ is an input for restraining the difference state amount ($E\_sc(k)$, $E\_sc(k-1)$) on a switching straight line ($\sigma\_sc(k)=0$).

$$\text{Ueq\_sc}(k) = \frac{1}{b1\_sc}\{(1 + \text{VPOLE\_sc} - a1\_sc) \cdot Psc(k) + \\ (\text{VPOLE\_sc} - a2\_sc) \cdot Psc(k-1) - b2\_sc \cdot \\ Vsc(k-1) + Psc\_cmd\_f(k) + (\text{VPOLE\_sc} - 1) \cdot \\ Psc\_cmd\_f(k-1) - \text{VPOLE\_sc} \cdot \\ Psc\_cmd\_f(k-2)\} \quad (8)$$

where $\text{Ueq\_sc}(k)$: Equivalent control input in a k-th control cycle.

The adder 47 calculates a control input $V_{sc}(k)$ to be supplied to the shift motor 13 according to the following equation (9).

$$Vsc(k) = Ueq\_sc(k) + Urch\_sc(k) + Uadp\_sc(k) \quad (9)$$

The sliding mode controller 53 having the construction explained above has 2 degrees of freedom that makes it possible to independently set the characteristic of the shift arm 11 to follow the target position Psc_cmd in the shifting direction and a behavior for converging a difference between a target position Psc_cmd and an actual position Psc, the difference being due to a disturbance. More specifically, the characteristic of the shift arm 11 to follow the target position Psc_cmd in the shifting direction can be set by changing the target value filter VPOLE_f_sc. Furthermore, the behavior for converging the difference between the target position Psc_cmd and the actual position Psc caused by a disturbance can be set by changing the switching function setting parameter VPOLE_sc.

Referring to FIG. 2A, the shift controller 50 performs the shifting operation of the shift arm 11 according to the following steps Mode1 through Mode4. The following will describe a case where the third speed is established by the synchronizer 2b shown in FIG. 1; however, the same applies to cases where other speeds are established.

(1) Mode1 (Target Value Follow-up & Compliance Mode)

The shift controller 50 sets Mode1 from the moment the shifting operation is begun from the neutral position until the actual position Psc of the shift arm 11 reaches a standby position Psc_def of a synchronizer ring 23a (Psc<Psc_def).

(2) Mode2 (Rotational Synchronization Control Mode)

The shift controller 50 applies an appropriate pressing force to the synchronizer ring 23a after conditions Psc_def≦Psc≦Psc_scf (assumed position of contact between the coupling sleeve 22 and the synchronizer ring 23a) and ΔPsc<ΔPsc_sc (ΔPsc_sc: Determination value for the contact between the coupling sleeve 22 and the synchronizer ring 23a) are satisfied. This synchronizes the rotational speeds of the coupling sleeve 22 and the third forward gear 7c on the input side.

(3) Mode3 (Static Mode)

When a condition of Psc_scf<Psc is satisfied, the target value Psc_cmd is set to a shift completion target value Psc_end, and the switching function integral value SUM_σsc related to the above equation (5) is reset to prevent Psc from overshooting Psc_cmd (if an overshoot happens, then a noise from a collision against a stopper member (not shown) is produced). This causes the coupling sleeve 22 to pass by the synchronizer ring 23a and to engage the third forward gear 7c on the input side.

(4) Mode4 (Hold Mode)

After completion of the shifting operation and during the selecting operation, the disturbance repressing capability level in the shift controller 50 is lowered to save power by decreasing electric power supplied to the shift motor 13.

FIG. 6A and FIG. 6B are graphs showing displacements of the shift arm 11 when the shifting operation is performed by the sliding mode controller 53 having two degrees of freedom shown in FIG. 5. The axes of ordinates of the upper graphs shown in FIGS. 6A and 6B are set to the target position Psc_cmd and the actual position Psc of the shift arm 11 in the shifting direction, while the axes of ordinates of the lower graphs are set to the control input Vsc to be supplied to the shift motor 13. The axes of abscissas are set to time t.

The graphs of FIG. 6A illustrate the displacements of the shift arm 11 when the shifting operation is performed in the shifting mechanism 40 having a dynamic characteristic within a range assumed beforehand when designing the sliding mode controller 53. In FIG. 6A, $x_1$ denotes the target position Psc_cmd, $y_1$ denotes the actual position Psc, and $z_1$ denotes the control input Vsc. The graph of FIG. 6B illustrates the shifting operation performed in the shifting mechanism 40 having a low-friction dynamic characteristic that deviates from the aforementioned range, $x_2$ denoting the target position Psc_cmd, $y_2$ denoting the actual position Psc, and $z_2$ denoting the control input Vsc.

In the sliding mode controller 53 having two degrees of freedom, the follow-up characteristic of the actual position of the shift arm 11 to follow the target value Psc_cmd can be independently set by changing the target value filter coefficient VPOLE_f_sc in the above equation (1). Hence, as shown in FIG. 6A, when Mode1 is switched to Mode2 at $t_{12}$ when the target position Psc_cmd ($x_1$) is changed from Psc_scf to Psc_sc, and when Mode2 is switched to Mode3 at $t_{13}$ when the target position Psc_cmd is changed from Psc_sc to Psc_end, a control input Vsc($z_1$) smoothly rises, making it possible to set overdamping responses that do not cause overshooting of Psc($y_1$) or vibrations.

Moreover, in the sliding mode controller 53 having two degrees of freedom, a disturbance suppressing capability (the convergent behavior for the difference $E\_sc(k)$ in the above equation (3)) can be independently set by changing the switching function setting parameter VPOLE_sc in the above equation (4). For this reason, as shown in FIG. 6B, even if the shifting mechanism 40 provides a low friction, an abrupt change of the position Psc ($y_2$) of the shift arm 11 at rotational synchronization in Mode2 will be suppressed. This makes it possible to prevent the coupling sleeve 22 from being suddenly pushed into a synchronizer ring 23, thereby permitting a stable shifting operation to be accomplished.

A VPOLE_sc calculator 54 changes the switching function parameter VPOLE_sc according to the following equation (10) in the aforesaid Mode1 through Mode4. This switches the disturbance suppressing capability level of the sliding mode controller 53 in each mode during the shifting operation.

$$\text{VPOLE\_sc} = \begin{cases} \text{VPOLE\_sc11}(=-0.8): & \text{Mode1}(|Psc(k)| < |Psc\_def|) \\ \text{VPOLE\_sc12}(=-0.98): & \text{Mode1}(|Psc(k)| \geq |Psc\_def|) \\ \text{VPOLE\_sc2}(=-0.85): & \text{Mode2}(|Psc\_def(k)| \leq |Psc(k)| \leq |Psc\_scf|) \\ \text{VPOLE\_sc3}(=-0.7): & \text{Mode3}(|Psc(k)| > |Psc\_scf|) \\ \text{VPOLE\_sc4}(=-0.9): & \text{Mode4} \end{cases} \quad (10)$$

where Psc_def: Standby position of the synchronizer ring; and Psc_scf: Position of contact between the coupling sleeve and the synchronizer ring.

The target value filter 41 changes the target value filter coefficient VPOLE_f_sc according to the following equation (11) in the Mode1 through Mode4 described above. This switches the follow-up capability level of the sliding mode controller 53 to follow the target value Psc_cmd in each mode during the shifting operation.

$$\text{VPOLE\_f\_sc} = \begin{cases} \text{VPOLE\_f\_sc1}(=-0.8): & \text{Mode1} \\ \text{VPOLE\_f\_sc2}(=-0.98): & \text{Mode2}(|Psc\_def(k)| \leq |Psc(k)| \leq |Psc\_scf|) \\ \text{VPOLE\_f\_sc3}(=-0.85): & \text{Mode3}, \text{Mode4}(|Psc(k)| > |Psc\_scf|) \end{cases} \quad (11)$$

According to the above equation (11), in Mode1 wherein the coupling sleeve 22 moves to the standby position Psc_def of the synchronizer ring 23, the follow-up capability level for the actual position Psc of the shift arm 11 to follow the target value Psc_cmd is set to a high level (VPOLE_f_sc=−0.8). In Mode2 and Mode3 wherein the target value Psc_cmd suddenly increases, the follow-up capability level of the actual position Psc to follow the target value Psc_cmd is set to a low level (VPOLE_f_sc=−0.98, −0.9), thereby restraining the voltage applied to the shift motor 13 from abruptly increasing.

The selection controller 51 shown in FIG. 4 has a sliding mode controller 55 that employs sliding mode control (corresponding to the response specifying control in the present invention) to determine a voltage Vsl to be applied to the selection motor 12, a VPOLE_sl calculator 56 for setting a response specifying parameter VPOLE_sl in the sliding mode controller 55, and a partial parameter identifier 57 for identifying model parameters b1_sl, b2_sl and c1_sl in the sliding mode control.

Referring to FIG. 7, the sliding mode controller 55 of the selection controller 51 models a selector 70 of the transmission 80 that moves the shift arm 11 in the selecting direction according to the following equation (12) representing the position Psl of the shift arm 11 in the selecting direction in terms of a voltage Vsl to be applied to the selection motor 12.

$$Psl(k+1)=a1\_sl \cdot Psl(k)+a2\_sl \cdot Psl(k-1)+b1\_sl \cdot Vsl(k)+b2\_sl \cdot Vsl(k-1)+c1\_sl \quad (12)$$

where Psl(k+1), Psl(k), Psl(k−1): Positions of the shift arm in (k+1)th, k-th, and (k−1)th control cycles, respectively; Vsl(k), Vsl(k−1); Voltages applied to the selection motor in k-th and (k−1)th control cycles; a1_sl, a2_sl; Model parameters, and b1_sl(k), b2_sl(k), and c1_sl(k): Identification values of model parameters in a k-th control cycle.

The partial parameter identifier 57 carries out identification processing only on b1_sl and b2_sl, which are coefficients of a control input component term related to the voltage Vsl to be applied to the selection motor 12 and c1_sl, which is a disturbance component term. These model parameters are closely related to changes in the dynamic characteristic of the selector 70, among model parameters a1_sl, a2_sl, b1_sl, b2_sl, and c1_sl in the above equation (12). b1_sl, b2_sl, and c1_sl correspond to the identification model parameters in the present invention.

When the above equation (12) is processed by delaying one control cycle to gather component terms related to the identification model parameters b1_sl, b2_sl, and c1_sl on the right side, and the remaining component terms on the left side, the following equation (13) is given.

$$Psl(k)-a1\_sl \cdot Psl(k-1)-a2\_sl \cdot Psl(k-2)=b1\_sl(k) \cdot Vsl(k-1)+b2\_sl(k) \cdot Vsl(k-2) \, c1\_sl(k) \quad (13)$$

If the left side of the above equation (13) is defined as W(k), as shown in the following equation (14), while the right side is defined as W_hat(k) as shown in the following equation (14), then W(k) will be a virtual output of a virtual plant 110 shown in FIG. 8. Therefore, W(k) can be considered to denote a model output of the virtual plant 110, and W_hat(k) can be considered to denote a model equation of the virtual plant 110.

$$W(k)=Psl(k)-a1\_sl \cdot Psl(k-1)-a2\_sl \cdot Psl(k-2) \quad (14)$$

where W(k): Model output of the virtual plant in a k-th control cycle.

$$W\_hat(k)=b1\_sl(k) \cdot Vsl(k-1)+b2\_sl(k) \cdot Vsl(k-2)+c1\_sl(k) \quad (15)$$

where W_hat(k): Model equation of the virtual plant in a k-th control cycle

The virtual plant 110 shown in FIG. 8 subtracts a component obtained by delaying Psl(k) one control cycle by a $Z^{-1}$ converter 111 and multiplied by a1_sl using a multiplier 113 and a component obtained by delaying Psl(k) two control cycles by the $Z^{-1}$ converter 111 and a $Z^{-1}$ converter 114 and multiplied by a2_sl using a multiplier 115 from a component of the position Psl(k) of the shift arm 11 by a subtracter 116, and outputs the result as W(k).

The model equation of the virtual plant 110 in the above equation (15) is formed only of the component terms related to the identification model parameters b1_sl(k), b2_sl(k), and c1_sl(k). Hence, the identification model parameters b1_sl(k), b2_sl(k), and c1_sl(k) can be sequentially identified by calculating the model parameters of the virtual plant 110 by using a sequential identification algorithm such that the output W(k) of the virtual plant 110 coincides with the model output W_hat(k).

The partial parameter identifier 57 carries out identification processing on the identification model parameters b1_sl(k), b2_sl(k), and c1_sl(k) according to the following equations (16) to (22). First, $\zeta\_sl(k)$ is defined by the equation (16), and then $\theta\_sl(k)$ is defined by the equation (17). An output using the model parameters that have already been calculated in the preceding control cycle, namely, b1_sl(k−1), b2_sl(k−1), and c1_sl(k−1), are taken as W_hat'(k) as shown in the following equation (18) in place of the model parameters b1_sl(k), b2_sl(k), and c1_sl(k) in the above equation (15).

$$\zeta\_sl^T(k) = [\ Vsl(k-1)\ \ Vsl(k-2)\ \ 1\ ] \quad (16)$$

$$\theta\_sl^T(k) = [\ b1\_sl(k)\ \ b2\_sl(k)\ \ c1\_sl(k)\ ] \quad (17)$$

$$\begin{aligned}W\_hat'(k) &= b1\_sl(k-1) \cdot Vsl(k-1) + b2\_sl(k-1) \cdot \\ &\quad Vsl(k-2) + c1\_sl(k-1) \\ &= \theta\_sl^T(k-1) \cdot \zeta\_sl(k)\end{aligned} \quad (18)$$

A deviation E_id_sl(k) of the model output W_hat'(k) from the output W(k) of the virtual plan 110 is calculated according to the following equation (19) as a modeling error in the above equation (18). Hereinafter, the deviation E_id_sl(k) will be referred to as an identification error E_id_sl(k).

$$E\_id\_sl(k) = W(k) - W\_hat'(k) \quad (19)$$

where E_id_sl(k): Difference between the virtual plant output W(k) and the model output W_hat'(k) in a k-th control cycle.

The partial parameter identifier 57 calculates P_sl, which is a tertiary square matrix, according to the recurrence formula of the following equation (20), and then calculates a tertiary vector KP_sl, which is a gain coefficient vector that defines a scale of change based on the identification error E_id_sl(k) according to the following equation (21).

$$P\_sl(k+1) = \frac{1}{\lambda_1\_sl}\left\{I - \frac{\lambda_2\_sl \cdot P\_sl(k) \cdot \zeta\_sl(k) \cdot \zeta\_sl^T(k)}{\lambda_1\_sl + \lambda_2\_sl \cdot \zeta\_sl^T(k) \cdot P\_sl(k) \cdot \zeta\_sl(k)}\right\} \cdot P\_sl(k) \quad (20)$$

where I: 3×3 unit matrix; and $\lambda_1\_sl, \lambda_2\_sl$: Identification weighting parameters $$KP\_sl(k) = \frac{P\_sl(k) \cdot \zeta\_sl(k)}{1 + \zeta\_sl^T(k) \cdot P\_sl(k) \cdot \zeta\_sl(k)} \quad (21)$$

The meaning of each setting of the identification weighting parameters $\lambda_1\_sl$ and $\lambda_2\_sl$ in the above equation (20) is shown in Table 1 below.

TABLE 1

| Settings of $\lambda_1\_sl$ and $\lambda_2\_sl$ and meanings thereof | |
|---|---|
| $\lambda_1\_sl, \lambda_2\_sl$ | Meaning |
| 1, 0 | Fixed gain |
| 1, 1 | Method of least squares |
| 1, λ | Gradually decreasing gain; λ: Variable |
| λ, 1 | Method of weighted least squares; λ: Variable |

The partial parameter identifier 57 calculates an identification value $\theta\_sl^T(k)=[b1\_sl(k)\ b2\_sl(k)\ c1\_sl(k)]$ of a new model parameter according to the following equation (22).

$$\theta\_sl(k) = \theta\_sl(k-1) + KP\_sl(k) \cdot E\_id\_sl(k) \quad (22)$$

Referring to FIG. 7, the sliding mode controller 55 has a target value filter 71 that calculates a filtering target value Psl_cmd_f by carrying out filtering computation according to the following equation (23) on the target position Psl_cmd in the selecting direction of the shift arm 11.

$$Psl\_cmd\_f(k) = -VPOLE\_f\_sl \cdot Psl\_cmd\_f(k-1) + (1 + VPOLE\_f\_sl) \cdot Psl\_cmd(k) \quad (23)$$

where VPOLE_f_sl: Target value filter coefficient; and Psl_cmd_f(k): Filtering target value in a k-th control cycle.

The sliding mode controller 55 has a subtracter 72 that calculates a difference E_sl between the actual position Psl and the target position Psl_cmd of the shift arm 11 in the selecting direction, a switching function value calculator 73 that calculates a value of a switching function σ_sl, a reaching law input calculator 74 that calculates a reaching law input Urch_sl, an equivalent control input calculator 75 that calculates an equivalent control input Ueq_sl, and an adder 76 that adds the equivalent control input Ueq_sl and the reaching law control input Urch_sl so as to obtain a control value Vsl of the voltage to be applied to the selection motor 12 of the selector 70.

The switching function value calculator 73 calculates a switching function value σ_sl(k) according to the following equation (25) from a difference E_sl(k) calculated by the subtracter 72 according to the following equation (24).

$$E\_sl(k) = Psl(k) - Psl\_cmd\_f(k-1) \quad (24)$$

where E_sl(k): Difference between an actual position and a target position of the shift arm in a k-th control cycle.

$$\sigma\_sl(k) = E\_sl(k) + VPOLE\_sl \cdot E\_sl(k-1) \quad (25)$$

where σ_sl(k): Switching function value in a k-th control cycle; and VPOLE_sl: Switching function setting parameter (−1<VPOLE_sl<0).

The reaching law input calculator 74 calculates the reaching law input Urch_sl(k) according to the following equation (26). The reaching law input Urch_sl(k) is used to place a difference state amount (E_sl(k), E_sl(k−1)) on a switching straight line having the switching function σ_sl set to 0 (σ_sl(k)=0).

$$\text{Urch\_sl}(k) = -\frac{\text{Krch\_sl}}{\text{b1\_sl}(k)} \cdot \sigma\_\text{sl}(k) \quad (26)$$

where Urch_sl(k): Reaching law input in a k-th control cycle; and Krch_sl: Feedback gain.

The equivalent control input calculator 75 calculates an equivalent control input Ueq_sl(k) according to the following equation (27). The equation (27) calculates, as an equivalent control input Ueq_sl(k), the control value Vsl(k) of a voltage to be applied to the selection motor 12 obtained by introducing the above equations (24), (23) and (13), setting σ_sl(k+1)=σ_sl(k).

$$\begin{aligned}\text{Ueq\_sl}(k) = \frac{1}{\text{b1\_sl}(k)}\{&(1+\text{VPOLE\_sl}-\text{a1\_sl})\cdot Psl(k)+ \\ &(\text{VPOLE\_sl}-\text{a2\_sl})\cdot Psl(k-1)-\text{b2\_sl}(k)\cdot \\ &Vsl(k-1)+\text{Psl\_cmd\_f}(k)+(\text{VPOLE\_sl}-1)\cdot \\ &\text{Psl\_cmd\_f}(k-1)-\text{VPOLE\_sl}\cdot\text{Psc\_cmd\_f} \\ &(k-1)-\text{c1\_sl}(k)\} \end{aligned} \quad (27)$$

where Ueq_sl(k): Equivalent control input in a k-th control cycle.

The adder 76 calculates the control value Vsl of a voltage to be applied to the selection motor 12 of the selector 70 according to the following equation (28).

$$Vsl(k)=\text{Ueq\_sl}(k)+\text{Urch\_sl}(k) \quad (28)$$

As described above, the partial parameter identifier 57 carries out identification processing only on b1_sl, b2_sl, and c1_sl, which are closely related to changes in the dynamic characteristics of the selector 70, among model parameters a1_sl, a2_sl, b1_sl, b2_sl, and c1_sl in the above equation (12). The sliding mode controller 55 of the selection controller 51 uses b1_sl(k), b2_sl(k), and c1_sl(k) identified by the partial parameter identifier 57 to calculate the control input Vsl of the voltage to be applied to the selection motor 12.

In this case, the time required for model parameters to converge to optimum values can be reduced by reducing the number of model parameters to be identified. Moreover, the amount of computation is reduced with a resultant shortened computation time, as compared with a case where the identification processing is carried out on all model parameters. This allows a control cycle of the selection controller 51 to be set shorter, permitting improved controllability of the selection controller 51.

FIG. 9 is a graph showing displacement of the shift arm 11 during the selecting operation, the axis of ordinates indicating the actual position Psl and the target position Psl_cmd of the shift arm 11 in the selecting direction, while the axis of abscissas indicating time t. At $t_{31}$ when the target position is changed from Psl_cmd10 to Psl_cmd11 and the selecting operation is begun, a modeling error is quickly absorbed by the identification processing implemented on the model parameters b1_sl(k), b2_sl(k), and c1_sl(k) by the partial parameter identifier 57.

With this arrangement, the position Psl of the shift arm 11 converges to the target position Psl_cmd11 without overshooting the target position Psl_cmd11 or without generating vibrations. Then, the selecting operation is finished in a short time at $t_{32}$ when the conditions for determining that the selecting operation is completed are satisfied, the conditions being (1)ΔPsl (=Psl−Psl_cmd)<D_Pslf (determination value of change rate) and (2)|Psl−Psl_cmd61|<E_Pslf (determination value of difference).

FIG. 10 is a graph illustrating a behavior of the shift arm 11 observed when the selecting operation is performed using a sliding mode controller 55 of two degrees of freedom shown in FIG. 7. The axis of ordinates of the graph shown in FIG. 10 indicates the target position Psl_cmd and the actual position Psl of the shift arm 11, while the axis of abscissas indicates time t. Referring to FIG. 10, $X_3$ denotes the target position Psl_cmd, $y_3$ denotes a displacement of the actual position Psl in a selector having a friction characteristic in a standard range predicted beforehand when designing the sliding mode controller 55, $z_3$ denotes a displacement of the actual position Psl in a selector having a lower friction than the standard range, and $u_3$ denotes a displacement of the actual position Psl in a selector having a higher friction than the standard range.

In the sliding mode controller 55 having two degrees of freedom, the follow-up capability of the shift arm 11 to follow the target value Psl_cmd can be independently set by changing the target value filter coefficient VPOLE_f_sl in the above equation (23). Hence, as shown in FIG. 10, setting can be made such that the control input Vsl smoothly rises even at the low friction $z_3$ when the target position Psl_cmd ($x_3$) is changed from Psl_cmd20 to Psl_cmd21 at $t_{41}$. This makes it possible to set overdamping responses to restrain overshooting the target position Psl_cmd and the vibration of the shift arm 11 caused by the overshoot, thus preventing the time for convergence to the target position Psl_cmd21 from being prolonged.

Moreover, in the sliding mode controller 55 having two degrees of freedom, a disturbance suppressing capability (the convergent behavior for the difference E_sl(k) in the above equation (24)) can be independently set by changing the switching function setting parameter VPOLE_sl in the above equation (25). Hence, setting the disturbance suppressing capability at a high level makes it possible to quickly converge the position Psl of the shift arm 11 to the target position Psl_cmd21 even at the high friction $u_3$, as shown in FIG. 10. Moreover, at the low friction $z_3$ also, the position Psl of the shift arm 11 can be quickly converged to the target position Psl_cmd21 while restraining the occurrence of vibration.

In the transmission 80, there are some cases where a shift occurs between the target value Psl_cmd of each preset speed select position and a target value Psl_cmd* corresponding to a true selected position because of mechanical play, individual variations of parts, or the like. FIGS. 11A and 11B illustrate a case where such a shift takes place at the 3rd/4th gear select position.

Referring to FIG. 11A, a target value Psl_cmd34 of the 3rd/4th gear select position is shifted toward the shift piece 21a relative to a true target value Psl_cmd34\*. Thus, if the shift arm 11 positioned at Psl_cmd34 is shifted from the neutral position to the 3rd speed shift position, then the shift arm 11 and the shift piece 21a interfere with each other, preventing the shifting operation from being accomplished.

The shift arm 11 and all shift pieces 21a through 21d are chamfered. Therefore, in the case of manual transmission (MT) in which the shifting operation and the selecting operation are performed by drivers' operating force rather than an actuator, such as a motor, if the driver feels the interference against the shift arm 11, then the driver slightly weakens his or her holding force in the selecting direction. This causes the shift arm 11 to be shifted toward the true target value Psl_cmd34* along the chamfered portion, as illustrated in FIG. 11B, thus allowing the shifting operation to be accomplished.

FIGS. 12A and 12B are graphs showing a transition of the actual position Psc in the shifting direction and the actual position Psl in the selecting direction of the shift arm 11 during the shifting operation in the MT described above. In the graph of FIG. 12A, the axis of ordinates indicates the actual position Psc in the shifting direction, while the axis of abscissas indicates time t. In the graph of FIG. 12B, the axis of ordinates indicates the actual position Psl in the selecting direction, while the axis of abscissas indicates time t, as in the graph of FIG. 12A.

The shifting operation is begun at $t_{50}$ in the graphs of FIGS. 12A and 12B, and the shift arm 11 starts moving toward a target value Psc_cmd3 indicating the 3rd speed shift position, as shown in FIG. 12A. At $t_{51}$, the shift arm 11 and the shift piece 21a interfere with each other, and the shift arm 11 is shifted to the true target value Psl_cmd34* from the target value Psl_cmd34 of the 3rd/4th gear select position from $t_{51}$ through $t_{52}$, as illustrated in FIG. 12B. This allows the shift arm 11 to move to the target value Psc_cmd3 of the 3rd shift position, as shown in FIG. 12A, while avoiding the interference between the shift arm 11 and the shift piece 21a.

In an automated manual transmission (AMT) according to the present embodiment in which the shifting operation and the selecting operation are performed by a shift motor 13 and a selection motor 12, if an attempt is made to position and hold the shift arm 11 at the target value Psl_cmd34 of the 3rd/4th gear select position, then the shift arm 11 cannot be shifted in the selecting direction when the shift arm 11 and the shift piece 21a interfere with each other. This prevents the shifting operation from being accomplished.

FIG. 13A illustrates a case where the shift arm 11 has been slightly shifted in the selecting direction because of its interference with the shift piece 21a when the shift arm 11 at the target value Psl_cmd34 of the 3rd/4th gear select position in the AMT is moved to the target value Psc_cmd3 of the 3rd speed shift position. In this case, the selection controller 51 determines an output voltage Vsl to be applied to the selection motor 12 such that the position of the shift arm 11 in the selecting direction is set back to Psl_cmd34 by eliminating a difference E_sl. This causes a force Fsl to be produced in the selecting direction.

Here, a component of Fsl in the direction of a tangent α of the chamfered portions of the shift arm 11 and the shift piece 21a is denoted as Fsl1, a component in a direction of a normal line β relative to the tangent α is denoted as Fsl2, a component in the direction of the tangent α of a force Fsc in the shifting direction generated by the shifting operation is denoted as Fsc1, and a component in the direction of the normal line β is denoted as Fsc2. The shifting operation stops at the moment Fsc1 and Fsl1 are balanced.

FIG. 13B shows a displacement of the shift arm 11 during the shifting operation described above. The axis of ordinates of the upper graph indicates the actual position Psc of the shift arm 11 in the shifting direction, the axis of ordinates of the lower graph indicates the actual position Psl of the shift arm 11 in the selecting direction, and the axes of abscissas provide common time axes t. At $t_{60}$, the shifting operation is begun. The target value Psl_cmd34 of the 3rd/4th gear select position has been shifted from the true target value Psl_cmd34*, so that the shift arm 11 and the shift piece 21a start to interfere with each other at $t_{61}$.

The chamfered portion causes the shift arm 11 to be slightly shifted in the selecting direction, but to stop moving in the selecting direction at $t_{62}$ when Fsc1 and Fsl1 are balanced and also stop moving in the shifting direction. This interrupts the shifting operation, preventing the shift arm 11 from reaching the target value Psc_cmd3 of the 3rd speed shift position.

At this time, the shift controller 50 increases the control value Vsc of the voltage applied to the shift motor 13 to move the shift arm 11 to the target value Psc_cmd3 of the 3rd speed shift position. The selection controller 51 increases the control value Vsl of the voltage applied to the selection motor 12 to move the shift arm 11 to the target value Psl_cmd34 of the 3rd/4th speed selection position. This causes an excessive voltage to be applied to the shift motor 13 and the selection motor 12 with a resultant temperature increase in the shift motor 13 and the selection motor 12, possibly leading to deteriorated operationality in the next speed changing operation due to reduced motor torque.

The selection controller 51 uses different switching function setting parameters VPOLE_sl in the above equation (25) for the selecting operation and the shifting operation, respectively, so as to change the disturbance suppressing capability level. The graphs in FIG. 14 show response specifying characteristics of the sliding mode controller 55 of the selection controller 51, which are observed when VPOLE_sl is set to −0.5, −0.8, −0.99, and −1.0, respectively, with a step disturbance d being applied under a condition wherein the switching function σ_sl=0 in the above equation (25) and the difference E_sl=0 in the above equation (24). The axes of ordinates indicate the difference E_sl, the switching function σ_sl, and disturbance d, respectively, from the top, while the axes of abscissas all indicate time k.

As is obvious from FIG. 14, as an absolute value of VPOLE_sl is set to be smaller, the influences exerted on the difference E_sl by the disturbance d is reduced. Conversely, as an absolute value of VPOLE_sl is increased toward 1, the difference E_sl permitted by the sliding mode controller 55 increases. At this time, the behavior of the switching function σ_sl remains the same regardless of the value of VPOLE_sl, so that it can be seen that the level of capability of restraining the disturbance d can be specified by setting the value of VPOLE_sl.

The VPOLE_sl calculator 56 of the selection controller 51 calculates different values of VPOLE_sl for the shifting operation and a non-shifting operation, i.e., the selecting operation, as shown in the following equation (29).

$$\text{VPOLE\_sl} = \begin{cases} \text{VPOLE\_sl\_l} \ (=-0.95) \ \dots \ \text{Non-shifting mode} \\ \text{VPOLE\_sl\_h} \ (=-0.7) \ \dots \ \text{Shifting mode} \end{cases} \quad (29)$$

where the values are set to, for example, VPOLE_sl_l=−0.95, VPOLE_sl_h=−0.7 so that |VPOLE_sl_l|>|VPOLE_sl_h|.

The selection controller 51 determines that the shifting operation is being performed if the relationships expressed by the following two equations (30) and (31) hold.

$$|Psc\_cmd| > Psc\_cmd\_vp(0.3 \text{ mm}) \quad (30)$$

where Psc_cmd: Target value in the shifting direction; and Psc_cmd_vp: Preset reference value (e.g., 0.3 mm) of the amount of a displacement from a neutral position (Psc_cmd=0).

$$|\Delta Psl| < dpsl\_vp(\approx 0.1 \text{ mm/step}) \quad (31)$$

where ΔPsl: Amount of displacement in the selecting direction from the preceding control cycle; and dpsl_vp: Preset reference value (e.g., 0.1 mm/step) of a displacement amount in a control cycle.

FIG. 15A shows the displacement of the shift arm 11 when the disturbance suppressing capability level is set to be lower than that used for the selecting operation according to the above equation (29), VPOLE_sl in the shifting operation being set as VPOLE_sl_l, and the shift arm 11 is shifted to the target value Psc_cmd3 of the 3rd speed shift position, as in the case shown in FIG. 13A.

Referring to FIG. 15A, the disturbance suppressing capability level in the sliding mode controller 55 of the selection controller 51 has been set low, so that the interference between the shift arm 11 and the shift piece 21a causes the shift arm 11 to be shifted in the selecting direction from the target position Psl_cmd34 of the 3rd/4th gear select position. When the difference E_sl from the Psl_cmd34 is produced, the voltage Vsl applied to the selection motor 12 is reduced to cancel the difference E_sl.

Therefore, the force Fsl in the selecting direction produced by the drive of the selection motor 12 is reduced, and the component Fsc1 in the direction of the tangent α of the force Fsc in the shifting direction that is generated by the drive of the shift motor 13 becomes larger than the component Fsl1 of Fsl, which is in the direction of the tangent α. This causes a force Ft in the direction of the tangent α to be generated. The force Ft moves the shift arm 11 in the direction of the tangent α, thus displacing the position of the shift arm 11 in the selecting direction from Psl_cmd to Psl_cmd*. This makes it possible to prevent the shift arm 11 and the shift piece 21a from interfering with each other, permitting the shift arm 11 to move in the shifting direction.

The graphs in FIG. 15B illustrate a displacement of the shift arm 11 in FIG. 15A explained above. The axes of ordinates indicate the actual position Psc of the shift arm 11 in the shifting direction, the actual position Psl thereof in the selecting direction, and the switching function setting parameter VPOLE_sl from the top. The axes of abscissas all indicate time t.

When the shifting operation is begun at $t_{71}$, the setting of VPOLE_sl in the sliding mode controller 55 is switched from VPOLE_sl_h to VPOLE_sl_l by the VPOLE_sl calculator 56 of the selection controller 51, so that the disturbance suppressing capability level of the sliding mode controller 55 is lowered.

When the shift arm 11 and the shift piece 21a interfere with each other at $t_{72}$, the shift arm 11 shifts in the selecting direction from the 3rd/4th gear target position Psl_cms34. At $t_{73}$, the position of the shift arm 11 in the selecting direction reaches the true 3rd/4th gear target position Psl_cmd34*. Thus, shifting the shift arm 11 in the selecting direction allows the shifting arm 11 to move in the shifting direction from the neutral position to the 3rd speed shift target position Psc_cmd3 by clearing the interference by the shift piece 21a.

Referring now to FIG. 16A and FIG. 16B, the shift controller 50 implements the aforementioned four modes, namely, Mode1 through Mode4, to establish each speed in the shifting operation. Further, the shift controller 50 changes the switching function setting parameter VPOLE_sc according to the above equation (10) in each mode. Thus, changing the switching function setting parameter VPOLE_sc makes it possible to change the disturbance suppressing capability level of the shift controller 50, as in the case of the aforesaid selection controller 51.

FIG. 16A shows a graph in which the axis of ordinates indicates the actual position Psc and the target position Psc_cmd of the shift arm 11 in the shifting direction, and the axis of abscissas indicates time t. FIG. 16B shows a graph in which the axis of ordinates indicates the switching function setting parameter VPOLE_sc, and the axis of abscissas indicates time t, which also applies to the graph of FIG. 16A.

(1) Mode1 ($t_{80}$ through $t_{82}$: Target Value Follow-up & Compliance Mode)

The VPOLE_sc calculator 54 of the shift controller 50 shown in FIG. 4 sets and holds VPOLE_sc to VPOLE_sc1 (=−0.8) until the actual position Psc of the shift arm 11 shown in FIG. 2A reaches the standby position Psc_def of the synchronizer ring 23 (Psc<Psc_def) after the shifting operation is begun from the neutral position. This enhances the disturbance suppressing capability of the shift controller 50, resulting in enhanced capability of the shift arm 11 to follow the target position Psc_cmd.

At $t_{81}$ when the actual position Psc of the shift arm 11 reaches the standby position Psc_def of the synchronizer ring 23, the VPOLE_sc calculator 54 sets VPOLE_sc to VPOLE_sc2 (=−0.98) so as to lower the disturbance suppressing capability level of the shift controller 50. This provides a shock absorbing effect when the coupling sleeve 22 and the synchronizer ring 23 come into contact, making it possible to restrain the occurrence of percussive noises or restrain the coupling sleeve 22 from being forcibly pushed into the synchronizer ring 23.

(2) Mode2 ($t_{82}$ through $t_{83}$: Rotational Synchronization Control Mode)

The shift controller 50 sets the target value Psc_cmd to Psc_sc, and VPOLE_sc to VPOLE_sc2 (=−0.85), and then applies an appropriate pressing force to the synchronizer ring 23 after conditions Psc_def≦Psc≦Psc_scf and ΔPsc<ΔPsc_sc (ΔPsc_sc: Determination value of the contact between the coupling sleeve 22 and the synchronizer ring 23) are satisfied. Thus, the shift controller 50 synchronizes the rotational speeds of the coupling sleeve 22 and the third forward gear 7c on the input side.

(3) Mode3 ($t_{83}$ to $t_{84}$: Static Mode)

At $t_{83}$ when a condition of Psc_scf<Psc is satisfied, the shift controller 50 sets the target value Psc_cmd to a shift completion target value Psc_end. Furthermore, in order to prevent Psc from overshooting Psc_cmd (if an overshoot happens, a noise from a collision against a stopper member (not shown) is produced), the shift controller 50 resets the switching function integral value SUM_σsc, and sets VPOLE_sc to VPOLE_sc3 (=−0.7) to increase the disturbance suppressing capability level. This causes the coupling sleeve 22 to pass by the synchronizer ring 23 and engage the third forward gear 7c on the input side.

(4) Mode4 ($t_{84}$ and after: Hold Mode)

After completion of the shifting operation and during the selecting operation, the shift controller 50 sets VPOLE_sc to VPOLE_sc4 (=−0.9) to lower the level of the disturbance restraining performance in the shift controller 50 to reduce electric power supplied to the shift motor 13 so as to save electric power. As illustrated in FIG. 17A, if the selecting operation is performed by moving the shift arm 11 from the 5th/6th gear select position to the 1st/2nd gear select position with a positional shift E_Psc present between the shift piece 21b and the shift piece 21c, then the chamfered portions of the shift arm 11 and the shift piece 21b come in contact.

At this time, if the disturbance suppressing capability of the shift controller 50 is maintained at a high level, then a component Fsl' in the tangential direction of a chamfered portion of the force Fsl in the selecting direction produced by the drive of the selection motor 12 interferes with a component Fsc' in the tangential direction of a chamfered portion of the force Fsc in the shifting direction produced by the drive of the shift motor 13, causing the shifting operation of the shift arm 11 to be interrupted. Furthermore, the control for positioning to the target position by the shift controller 50 and the selection controller 51 increases the voltage applied to the selection motor 12 and the shift motor 13. This many cause an abnormal rise in the temperature of the selection motor 12 and the shift motor 13, and the speed change operationality in the next speed change may be deteriorated due to reduced motor torque.

In the selecting operation, therefore, VPOLE_sc is set to VPOLE_sc4 (=−0.9) to lower the level of disturbance suppressing capability of the shift controller 50 so as to decrease the force Fsc in the shifting direction, as shown in FIG. 17B. With this arrangement, the shift arm 11 easily shifts in the shifting direction, as indicated by a path y in FIG. 17B, so that the shift arm 11 can be promptly moved to the 1st/2nd gear select position, avoiding the interference with the shift piece 21b.

Referring now to the flowcharts shown in FIG. 18 through FIG. 25 and FIG. 27, the procedure for carrying out the control over the transmission 80 by the controller 1 will be explained.

FIG. 18 shows a main flowchart of the control unit 1. When the driver of the vehicle operates the accelerator pedal 95 (refer FIG. 1) or the brake pedal 99 in STEP1, the control unit 1 determines, depending on which is operated, a driving force index Udrv for determining the driving force to be applied to the drive wheels 94 according to the following equation (32).

$$Udrv = \begin{cases} AP & \text{(When the accelerator pedal is depressed)} \\ Kbk \times BK & \text{(When the brake pedal is depressed)} \end{cases} \quad (32)$$

where Udrv: Driving force index; AP: Degree of opening of the accelerator pedal; BK: Brake depressing force; and Kbk: Coefficient used to convert a brake depressing force (0 to maximum) into a degree of opening of the accelerator pedal (0 to −90 degrees).

Then, based on the driving force index Udrv, the control unit 1 determines in STEP2 whether to perform the speed changing operation of the transmission 80. If the control unit 1 determines to perform the speed changing operation, then it executes the transmission control whereby a target speed gear is decided and then the speed changing operation is performed. In the subsequent STEP3, the control unit 1 carries out the clutch control to control the slip rate of the clutch assembly 82 shown in FIG. 1.

Referring now to the flowcharts shown in FIG. 19 through FIG. 21, the procedure for carrying out the transmission control by the control unit 1 will be explained. The control unit 1 first checks in STEP10 of FIG. 19 whether the driver of the vehicle has issued a request for reverse. If the request for reverse has been issued, then the control unit 1 proceeds to STEP20 wherein to set the gear selection target value NGEAR_cmd to −1, which denotes reverse, and then proceeds to STEP12.

If it is determined in STEP10 that no request for reverse has been issued, then the control unit 1 proceeds to STEP11 to apply the driving force index Udrv and the vehicle speed VP of the vehicle to the Udrv, VP/NGEAR_cmd MAP shown in FIG. 19 so as to determine the gear selection target value NGEAR_cmd. Table 2 below shows the relationship between the gear selection target value NGEAR_cmd and selected gear positions.

[Table 2]

Correspondence between gear select target value NGEAR_cmd and gear select position

| NGEAR_cmd | −1 | 1 | 2 | 3 | 4 | 5 | 6 | 0 |
|---|---|---|---|---|---|---|---|---|
| Gear select position | Reverse | 1st | 2nd | 3rd | 4th | 5th | 6th | Neutral |

In the subsequent STEP12, the control unit 1 determines whether a current gear select position NGEAR of the transmission 80 coincides with a gear selection target value NGEAR_cmd. If it is determined that the gear select position NGEAR coincides with the gear selection target value NGEAR_cmd, then the control unit 1 proceeds to STEP15 to terminate the transmission control without carrying out the speed changing operation on the transmission 80.

If it is determined in STEP12 that the gear select position NGEAR of the transmission 80 does not coincide with the gear selection target value NGEAR_cmd, then the control unit 1 proceeds to STEP13 wherein the control unit 1 starts a speed changing operation reference timer for determining the timing of each processing in the speed changing operation to be performed in the next STEP14. Thus, the control unit 1 executes the speed changing operation in STEP14 and then proceeds to STEP13 to terminate the transmission control.

The speed changing operation in STEP14 is performed by three steps, namely, a clutch OFF step in which the clutch assembly 82 shown in FIG. 1 is set to a clutch OFF state to enable the shifting/selecting operation of the transmission 80, a gear position changing step in which the shifting/selecting operation of the transmission 80 is performed to change the gear selection position NGEAR to the gear selection target value NGEAR_cmd in the clutch OFF state, and a clutch ON step in which the clutch assembly 82 is set back to the clutch ON state after the gear position changing step is finished.

To grasp the timings from the moment the speed changing operation reference timer is started in STEP13 to the moment each step is completed, clutch OFF completion time TM_CLOFF, gear position change completion time TM_SCHG, and clutch ON completion time TM_CLON are preset (TM_CLOFF<TM_SCHG<TM_CLON).

The control unit 1 starts the speed changing operation reference timer in STEP13 and also starts the clutch OFF processing and turns the clutch assembly 82 off at the same time. When counting time tm_shift of the speed changing operation reference timer exceeds the clutch OFF completion time TM_CLOFF, the gear position changing step is begun. When the counting time tm_shift of the speed changing operation reference timer reaches the gear position change completion time TM_SCHG, the control unit 1 beings the clutch ON step to turn the clutch assembly 82 on.

The flowcharts shown in FIG. 20 and FIG. 21 illustrate the procedure for implementing the speed changing operation of the transmission 80 carried out by the control unit 1 after the clutch OFF processing is begun. The control unit 1 first determines in STEP30 of FIG. 20 whether a current gear selection position NGEAR of the transmission 80 coincides with the gear selection target value NGEAR_cmd.

If it is determined that the gear selection position NGEAR coincides with the gear selection target value NGEAR_cmd and that the speed changing operation is completed, then the control unit 1 proceeds to STEP45 to clear the clocking time tm_shift on a speed changing operation reference timer. In the next STEP46, the control unit 1 resets a gear disengagement completion flag F_SCN (F_SCN=0) set upon completion of gear disengagement processing in the transmission 80, and resets a select completion flag F_SLF (F_SLF=0) set upon completion of the selecting operation in the transmission 80.

The control unit 1 then proceeds to STEP61 wherein the control unit 1 maintains a current gear selection position by holding the target position Psc_cmd of the shift arm 11 in the shifting direction by the shift controller 50 and the target position Psl_cmd of the shift arm 11 in the selecting direction by the selection controller 51 at current values. The control unit 1 then proceeds to STEP33 of FIG. 21.

At this time, the VPOLE_sc calculator 54 of the shift controller 50 sets the response specifying parameter VPOLE_sc in the sliding mode controller 53 of the shift controller 50 to VPOLE_sc4 (=−0.9). This lowers the level of disturbance suppressing capability of the shift controller 50, thus saving electric power of the shift motor 13.

Furthermore, the VPOLE_sl calculator 56 of the selection controller 51 sets the response specifying parameter VPOLE_sl in the sliding mode controller 55 of the selection controller 51 to VPOLE_sl_1 (=−0.95). This lowers the level of disturbance suppressing capability of the shift controller 50, thus saving electric power in the selection motor 12.

If, on the other hand, it is determined in STEP30 that a current gear selection position NGEAR of the transmission 80 does not coincide with the gear selection target value NGEAR_cmd and that the speed changing operation of the transmission 80 is in process, then the control unit 1 proceeds to STEP31.

In STEP31, the control unit 1 determines whether the clocking time tm_shift on the speed changing operation reference timer has exceeded a clutch OFF time TM_CLOFF. If it is determined that the clocking time tm_shift on the speed changing operation reference timer (hereinafter referred to simply as "the timer") has not exceeded the clutch OFF completion time TM_CLOFF and the clutch OFF step has not been completed, then the control unit 1 proceeds to STEP32 to carry out the same processing as that in STEP61 to maintain a current gear selection position.

If it is determined in STEP31 that the clocking time tm_shift on the timer has exceeded the clutch OFF completion time TM_CLOFF and the clutch OFF step has been completed, then the control unit 1 proceeds to STEP50 wherein the control unit 1 determines whether the clocking time tm_shift on the timer has exceeded a gear position change completion time TM_SCHG.

In STEP50, if it is determined that the clocking time tm_shift on the timer has not exceeded the gear position change completion time TM_SCHG and the gear position change step is being implemented, then the control unit 1 proceeds to STEP51 to perform the shifting/selecting operation, and then proceeds to STEP33 of FIG. 21.

If it is determined in STEP50 that the clocking time tm_shift on the timer has exceeded the gear position change completion time TM_SCHG and the gear position change step has been completed, then the control unit 1 proceeds to STEP60 wherein the control unit 1 determines whether the clocking time tm_shift on the timer has exceeded a clutch ON completion time TM_CLON.

In STEP60, if it is determined that the clocking time tm_shift on the timer has not exceeded the clutch ON completion time TM_CLON and the clutch ON step is being implemented, then the control unit 1 performs the processing in the aforesaid STEP61, and then proceeds to STEP33 of FIG. 21.

If it is determined in STEP60 that the clocking time tm_shift on the timer has exceeded the clutch ON completion time TM_CLON (TM_CLON<tm_shift) and the clutch ON step has been completed, then the control unit 1 proceeds to STEP70 wherein the control unit 1 sets the current gear selection position NGEAR to the gear selection target value NGEAR_cmd. The control unit 1 then proceeds to STEP61 to implement the aforesaid processing of STEP61, and then proceeds to STEP33 of FIG. 21.

Processing of STEP33 through STEP37 and STEP80 shown in FIG. 21 is carried out by the sliding mode controller 53 of the shift controller 50. In STEP33, the sliding mode controller 53 calculates E_sc(k) according to the above equation (3) and also calculates σ_sc(k) according to the above equation (4).

If it is found in the subsequent STEP34 that a move-to-Mode 3 flag F_Mode2 to 3, which is set when moving from Mode2 to Mode3, has been set (F_Mode2 to 3=1), then the control unit 1 proceeds to STEP35 to reset the switching function integral value SUM_asc(k) calculated according to the above equation (5)(SUM_σsc=0). If it is found in STEP34 that the move-to-Mode3 flag F_Mode2 to 3 has been reset (F_Mode2 to 3=0), then the control unit 1 proceeds to STEP80 to update the switching function integral value SUM_asc(k) according to the above equation (5), and then proceeds to STEP36.

The sliding mode controller 53 calculates the equivalent control input Ueq_sc(k), the reaching law input Urch_sc(k), and the adaptation law input Uadp_sc(k) in STEP36 according to the above equations (6) to (8), and further calculates a control input value Vsc(k) of the voltage to be applied to the shift motor 13 according to the above equation (9) in STEP37 so as to control the shift motor 13.

In the subsequent STEP38 through STEP40, processing is carried out by the sliding mode controller 55 and the partial parameter identifier 57 of the selection controller 51. In STEP38, the sliding mode controller 55 calculates E_sl(k) according to the above equation (24), and further calculates σ_sl(k) according to the above equation (25).

In the subsequent STEP39, the partial parameter identifier 57 carries out identification processing according to the above equations (18) through (22) to calculate the model parameters b1_sl(k), b2_sl(k), and c1_sl(k). The sliding mode controller 55 calculates the reaching law input Urch_sl (k) according to the above equation (26), and the equivalent control input Ueq_sl(k) according to the above equation (27). Then, the sliding mode controller 55 calculates, in the subsequent STEP40, the control input Vsl(k) of the voltage to be applied to the selection motor 12 according to the above equation (28). In the next STEP41, the control unit 1 terminates the speed changing operation.

FIG. 22 shows a flowchart of the shifting/selecting operation in STEP51 of FIG. 20. In STEP90, if it is determined that the gear disengagement completion flag F_SCN, which is set upon completion of gear disengagement of the transmission 80, has been reset (F_SCN=0) and the gear disengagement is in process, then the control unit 1 proceeds to STEP91.

Processing in STEP91 and STEP92 is carried out by the target position calculator 52 shown in FIG. 4. The target position calculator 52 holds the target position Psl_cmd of the shift arm 11 in the selecting direction at a current position in STEP91, and sets the target position Psc_cmd of the shift arm 11 in the shifting direction to zero (neutral position) in STEP92. Processing in STEP93 is carried out by the VPOLE_sc calculator 54 shown in FIG. 4 and the VPOLE_sl calculator 56. The VPOLE_sl calculator 56 sets VPOLE_sl to VPOLE_sl_l (−0.95), and the VPOLE_sc calculator 54 sets VPOLE_sc to VPOLE_scll (=−0.8).

With this arrangement, the level of disturbance suppressing capability of the selection controller 51 is lowered, expanding the permissible range of the shift of the shift arm 11 in the selecting direction. This makes it possible to minimize the influences of interference between the shift arm 11 and a shift piece 21, so that the shift arm 11 can be smoothly moved in the shifting direction.

In the subsequent STEP94, if the position (in an absolute value) of the shift arm 11 in the shifting direction is below a preset neutral determination value Psc_N (e.g., 0.15 mm), then it is determined that the gear disengagement processing is finished, and the control unit 1 proceeds to STEP95 to set the gear disengagement completion flag F_SCN (F_SCN=1) before it proceeds to STEP96 to terminate the shifting/selecting operation.

Meanwhile, if it is determined in STEP90 that the gear disengagement completion flag F_SCN has been set (F_SCN=1), indicating the end of the gear disengagement processing, then the control unit 1 proceeds to STEP100. Processing steps in STEP100 through STEP103 and STEP110 are implemented by the target position calculator 52. The target position calculator 52 determines in STEP100 whether a selection completion flag F_SLF has been set.

If it is determined in STEP100 that the selection completion flag F_SLF has been reset (F_SLF=0), meaning that the selecting operation is in process, then the target position calculator 52 proceeds to STEP101 to search a NGEAR_cmd/Psl_cmd_table MAP shown in FIG. 22 to acquire a set value Psl_cmd_table of each gear in the selecting direction that corresponds to NGEAR_cmd.

In the subsequent STEP103, the target position calculator 52 holds the target value Psc_cmd of the shift arm 11 in the shifting direction at a current value, and sets Psc_cmd_tmp specifying an increase width of a target value in the shifting direction to zero. In the next STEP104, processing is carried out by a VPOLE_sc calculator 54 and the VPOLE_sl calculator 56. The VPOLE_sl calculator 56 sets VPOLE_sl to VPOLE_sl_h (=−0.7), and the VPOLE_sc calculator 54 sets VPOLE_sc to VPOLE_sc4 (=−0.9).

Thus, the disturbance suppressing capability of the shift controller 50 is lowered, and the shift arm 11 easily shifts in the shifting direction during the selecting operation, allowing the selecting operation to be smoothly accomplished even if the shift arm 11 and a shift piece 21 interfere with each other, as described above with reference to FIG. 17B.

If an absolute value |Psl−Psl_cmd| of a difference between the current position and a target position of the shift arm 11 in the selecting direction reduces below a selection completion determination value E_Pslf (e.g., 0.15 mm) in STEP105, and if a moving speed ΔPsl of the shift arm 11 in the selecting direction reduces below a selection speed convergence determination value D_Pslf (e.g., 0.1 mm/step) in STEP106, then the control unit 1 determines that the selecting operation is completed and proceeds to STEP107.

The control unit 1 then sets the selection completion flag F_SLF (F_SLF=1) and proceeds to STEP96 to terminate the shifting/selecting operation.

Meanwhile, if it is determined in STEP100 that the selection completion flag F_SLF has been set, indicating the end of the selecting operation, then the control unit 1 proceeds to STEP110. The processing in STEP110 and STEP111 is implemented by the target position calculator 52. The target position calculator 52 holds the target position Psl_cmd of the shift arm 11 in the shifting direction at a current value in STEP110, and then calculates a rotational synchronization target value, which will be discussed hereinafter, in STEP111.

Processing in the next STEP112 is carried out by a VPOLE_sl calculator 56. The VPOLE_sl calculator 56 sets VPOLE_sl to VPOLE_sl_l (=−0.95). Thus, the disturbance suppressing capability of the selection controller 51 is lowered, and the shifting operation of the shift arm 11 can be smoothly accomplished even if the shift arm 11 and a shift piece 21 interfere with each other, as described above with reference to FIG. 15. The control unit 1 then proceeds from STEP112 to STEP96 to terminate the shifting/selecting operation.

FIG. 23 is a flowchart of the calculation of a rotational synchronization target value in STEP111 of FIG. 22. The calculation of the rotational synchronization target value is carried out mainly by the target position calculator 52.

In STEP120, the target position calculator 52 searches an NGEAR_cmd/Psc_def,_scf,_end,_table MAP shown in FIG. 23 to acquire a standby position Psc_def of a synchronizer ring in each of synchronizers 2a to 2c and each of the reverse gear trains 83, 85, and 86 that correspond to the gear selection target value NGEAR_cmd, a position Psc_scf where the rotational synchronization begins between the coupling sleeve and synchronized gears (the 1st forward gear 9a on the output side, the 2nd forward gear 9b on the output side, the 3rd forward gear 7c on the input side, the 4th forward gear 7d on the input side, the 5th forward gear 7e on the input side, the 6th forward gear 7f on the input side, the 2nd reverse gear 83, and the 3rd reverse gear 86) through the intermediary of the synchronizer rings, a position Psc_sc where the rotational synchronization ends, and a position Psc_end where the shifting operation ends.

In the subsequent STEP121, the target position calculator 52 acquires a displacement speed D_Psc_cmd_table of the shifting operation based on the gear selection target value NGEAR_cmd. Shift shocks at a low gear and the occurrence of noises of contact between a synchronizer ring and the coupling sleeve are restrained by changing the displacement speed D_Psc_cmd_table according to a selected speed.

In the next STEP122, the target position calculator 52 sets Psc_def_table, Psc_scf_table, Psc_sc_table, Psc_end_table, and D_Psc_cmd_table acquired by the aforesaid map search to corresponding target values Psc_def, Psc_scf, Psc_sc, Psc_end, and D_Psc_cmd, respectively. In the following STEP123, a halfway target position Psc_cmd_tmp of the shift arm 11 in the shifting operation is set.

After STEP124 of FIG. 24, processing of Mode1 through Mode4 described above is carried out. If it is determined in STEP124 that the position Psc of the shift arm 11 in the shifting direction has not exceeded Psc_scf and the rotational synchronization of the coupling sleeve and a synchronizer ring is not completed, then the control unit 1 proceeds to STEP125.

In STEP125, the control unit 1 sets a Mode 1•2 flag F_mode12 indicating that the processing of Mode1 or Mode2 is being implemented (F_mode12=1). In the next STEP126, if it is determined that the position Psc of the shift arm 11 in the shifting direction has not exceeded Psc_def, that is, if the shift arm 11 has not exceeded a standby position of a synchronizer ring, then the control unit 1 proceeds to STEP127.

In STEP127, the processing of Mode1 is implemented. The VPOLE_sc calculator 54 of the shift controller 50 sets VPOLE_sc to VPOLE_sc_11 (=−0.8). This increases the level of disturbance suppressing capability of the shift controller 50, leading to improved capability of following the target position Psc_cmd.

If it is determined in STEP126 that the position Psc of the shift arm 11 in the shifting direction has exceeded Psc_def and the shift arm 11 has reached the standby position of the synchronizer ring, then the control unit 1 proceeds to STEP160 wherein it determines whether a change amount ΔPsc of the position of the shift arm 11 in the shifting direction has exceeded a determination value ΔPsc_sc of contact between the coupling sleeve and the synchronizer ring.

If it is determined that ΔPsc is still below ΔPsc_sc, indicating that the coupling sleeve and the synchronizer ring are not yet in contact, then the control unit 1 proceeds to STEP161. If it is determined that ΔPsc has exceeded ΔPsc_sc, indicating that the coupling sleeve and the synchronizer ring are in contact, then the control unit 1 proceeds to STEP170.

In STEP161, processing of Mode1 is carried out. The VPOLE_sc calculator 54 sets VPOLE_sc to VPOLE_sc12 (=−0.98). This lowers the level of disturbance suppressing capability of the shift controller 50, making it possible to reduce an impact when the coupling sleeve and the synchronizer ring comes in contact.

In STEP170, processing of Mode2 is carried out. The VPOLE_sc calculator 54 sets VPOLE_sc to VPOLE_sc2 (=−0.85). This increases the level of disturbance suppressing capability of the shift controller 50, making it possible to apply an appropriate pressing force to the synchronizer ring so as to synchronize the rotational speeds of the coupling sleeve and a synchronized gear.

In STEP171, the target position calculator 52 sets Psc_sc to the target position Psc_cmd of the shift arm 11 in the shifting direction, and proceeds to STEP130 wherein the processing for calculation of rotational synchronization target value is terminated.

Meanwhile, if it is determined in STEP124 that the position Psc of the shift arm 11 in the shifting direction has exceeded Psc_scf, that is, if the synchronization of the rotational speeds of the coupling sleeve and the synchronized gear is completed, then the control unit 1 proceeds to STEP140. The control unit 1 determines in STEP140 whether the Mode 1•2 flag F_mode12 has been set.

If it is determined in STEP140 that the Mode 1•2 flag F_mode12 has been set (F_mode12=1), that is, if the Mode1 or Mode2 is being implemented, then the control unit 1 proceeds to STEP150 wherein it sets the shift-to-mode3 flag F_mode2 to 3 (F_mode2 to 3=1) and resets the Mode 1•2 flag F_mode 1•2 (F_mode12=0). The control unit 1 then proceeds to STEP142. If it is determined in STEP140 that the Mode 1•2 flag has been reset (F_mode12=0), that is, if Mode2 has already been finished, then the control unit 1 proceeds to STEP141 to reset the shift-to-mode3 flag F_mode2 to 3 (F_mode2 to 3=0) before proceeding to STEP142.

In STEP142, the VPOLE_sc calculator 54 of the shift controller 50 sets VPOLE_sc to VPOLE_sc3 (=−0.7). In the next STEP143, the target position calculator 52 sets the target value Psc_cmd of the shift arm 11 in the shifting direction to Psc_end. This increases the level of disturbance suppressing capability of the shift controller 50 to prevent the shift arm 11 from overrunning a shift completion position Psc_end. The control unit 1 then proceeds from STEP143 to STEP130 to terminate the processing for calculating a rotational synchronization target value.

FIG. 25 shows a flowchart of the clutch control in STEP3 of FIG. 18. The control unit 1 first determines in STEP190 whether the current gear selection position NGEAR agrees with a gear selection target value NGEAR_cmd.

If it is determined in STEP190 that the current gear selection position NGEAR does not agree with the gear selection target value NGEAR_cmd, that is, if the transmission 80 is in the process of a speed change or during the shifting/selecting operation, then the control unit 1 proceeds to STEP191 to determine whether the clocking time tm_shift of the timer has exceeded the clutch OFF completion time TM_CLOFF.

If the clocking time tm_shift of the timer is below the clutch OFF completion time TM_CLOFF and the clutch assembly 82 is being turned off, then the control unit 1 proceeds from STEP191 to STEP192 wherein the control unit 1 sets a clutch slip rate target value SR_cmd to 100%. Next, the control unit 1 proceeds to STEP193 to carry out the slip rate control, and then proceeds to STEP194 to terminate the clutch control.

If it is determined in STEP191 that the clocking time tm_shift on the timer exceeds the clutch OFF completion time TM_CLOFF, i.e., if the clutch OFF step has been completed, then the control unit 1 proceeds to STEP210 to determine whether the clocking time tm_shift on the timer exceeds a speed change time TM_SCHG. If it is determined in STEP210 that the clocking time tm_shift on the timer has exceeded the speed change time TM_SCHG, that is, if it is determined that the shifting/selecting operation of the transmission 80 has been finished, then the control unit 1 proceeds to STEP220 to set the clutch slip rate SR_cmd to 0%. The control unit 1 then proceeds to STEP193 to carry out the slip rate control, and proceeds to STEP194 to terminate the clutch control.

If it is determined in STEP190 that the current gear selection position NGEAR agrees with the gear selection target value NGEAR_cmd, indicating that the speed changing operation on the transmission 80 has been completed, then the control unit 1 proceeds from STEP190 to STEP200 to acquire a travel target slip rate SR_cmd_dr by applying a driving force index Udrv and a vehicle speed VP to the Udrv, VP/SR_cmd_dr MAP shown in FIG. 25.

In the subsequent STEP201, the control unit 1 sets the travel target slip rate SR_cmd_dr at the target slip rate SR_cmd, and then proceeds to STEP193 to carry out the slip rate control. The control unit 1 then proceeds to STEP194 to terminate the clutch control.

The control unit 1 has the construction shown in FIG. 26 to carry out the slip rate control. Referring to FIG. 26, a slip rate controller 60 controls a clutch mechanism 61 composed of a clutch actuator 16 shown in FIG. 1 and the clutch assembly 82. The slip rate controller 60 determines a clutch stroke Pcl of the clutch assembly 82, which is changed by the clutch actuator 16, such that a clutch rotational speed NC of the clutch mechanism 61 agrees with a clutch rotational speed target value NC_cmd.

The slip rate SR between clutch discs (not shown) in the clutch assembly 82 changes according to the clutch stroke Pcl, and the driving force transmitted from the engine 81 shown in FIG. 1 to the input shaft 5 through the intermediary of the clutch assembly 82 increases or decreases accordingly. Hence, the clutch rotational speed NC can be controlled by changing the clutch stroke Pcl.

The slip rate controller 60 includes a target value filter 62 that performs filtering computation on the clutch rotational speed target value NC_cmd to calculate a filtering target value NC_cmd_f, and a response specifying control unit 63 that determines a clutch stroke Pcl, which is a control input value for the clutch mechanism 61, by using the response specifying control.

The response specifying control unit 63 models the clutch mechanism 61 according to equation (33) given below and includes an equivalent control input calculator 67 for calculating an equivalent control input Ueq_sr, a subtracter 64 for calculating a difference Enc between the filtering target value NC_cmd_f and the clutch rotational speed NC, a switching function value calculator 65 for calculating a value of a switching function σ_sr, a reaching law input calculator 66 for calculating a reaching law input Urch_sr, and an adder 68 for calculating the clutch stroke Pcl by adding the equivalent control input Ueq_sr and the reaching law input Urch_sr.

$$NC(k+1) = a1\_sr(k) \cdot NC(k) + b1\_sr(k) \cdot Pcl(k) + c1\_sr(k) \quad (33)$$

where $a1\_sr(k)$, $b1\_sr(k)$, and $c1\_sr(k)$: Model parameters in a k-th control cycle.

A target value filter 62 carries out filtering computation according to the following equation (34) using the clutch rotational speed target value NC_cmd so as to calculate the filtering target value NC_cmd_f.

$$NC\_cmd\_f(k) = POLE\_F\_sr \cdot NC\_cmd\_f(k-1) + (1+POLE\_F\_sr) \cdot NC\_cmd(k) \quad (34)$$

where k: Control cycle number; NC_cmd_f(k): Filtering target value in a k-th control cycle; and POLE_F_sr: Target value filter coefficient.

The above equation (34) applies to a first-order lag filer. The filtering target value NC_cmd_f takes a value that converges, with a response delay, to the clutch rotational speed target value NC_cmd after a change when the change takes place in the clutch rotational speed target value NC_cmd. The degree of the response delay of the filtering target value NC_cmd_f relative to the clutch rotational speed target value NC_cmd changes with a set value of the target value filter coefficient POLE_F_sr. If the clutch rotational speed target value NC_cmd remains constant, then the filtering target value NC_cmd_f will be equal to the clutch rotational speed target value NC_cmd.

The switching function value calculator 65 calculates the switching function value σ_sr according to the following equation (36) from a difference Enc_sr calculated by the subtracter 64 according to the following equation (35).

$$Enc\_sr(k) = NC(k) - NC\_cmd\_f(k) \quad (35)$$

$$\sigma\_sr(k) = Enc\_sr(k) + POLE\_sr \cdot Enc\_sr(k-1) \quad (36)$$

where σ_sr(k): Switching function value in a k-th control cycle; and POLE_sr: Switching function setting parameter (−1<POLE_sr<0).

The equivalent control input calculator 64 calculates an equivalent control input Ueq_sr according to an equation (37) given below. Equation (37) calculates the clutch stroke Pcl as an equivalent control input Ueq_sr(k) by applying σ_sr(k+1)=σ_sr(k) and the above equations (33), (34), and (35).

$$Ueq\_sr(k) = \quad (37)$$
$$\frac{1}{b1\_sr(k)}\{(1 - a1\_sr(k) + POLE\_sr) \cdot NC(k) + POLE\_sr \cdot NC(k-1) -$$
$$c1\_sk(k) + NC\_cmd\_f(k+1) +$$
$$(POLE\_sr - 1) \cdot NC\_cmd\_f(k) - POLE\_sr \cdot NC\_cmd\_f(k-1)\}$$

where POLE_sr: Switching function setting parameter (−1<POLE_sr<0); and $a1\_sr(k)$, $b1\_sr(k)$, $c1\_sr(k)$: Model parameters in a k-th control cycle.

A reaching law input calculator 66 calculates the reaching law input Urch_sr(k) according to an equation (38) given below. A reaching law input Urch_sr(k) is an input for placing a difference state amount (Enc_sr(k), Enc_sr(k−1)) on a switching straight line having the switching function σ_sr set as 0 (σsr(k)=0).

$$Urch\_sr(k) = -\frac{Krch\_sr}{b1\_sr(k)} \cdot \sigma\_sr(k) \quad (38)$$

where Urch_sr(k): Reaching law input in a k-th control cycle; and Krch_sr: Feedback gain.

An adder 68 calculates the clutch stroke Pcl, which is a control input supplied to the clutch mechanism 61, according to the following equation (39).

$$Pcl(k) = Ueq\_sr(k) + Urch\_sr(k) \quad (39)$$

As shown in an equation (40) given below, an absolute value of the switching function setting parameter POLE_sr (a computing coefficient that determines the convergent speed of a difference between the filtering target value NC_cmd_f and the actual clutch rotational speed NC) is set to be smaller than an absolute value of the target filter coefficient POLE_F_sr (a computing coefficient that determines the speed at which the filtering target value NC_cmd_f converges to the clutch rotational speed target value NC_cmd in the filtering computation).

$$-1 < POLE\_F\_sr < POLE\_sr < 0 \quad (40)$$

Thus, a follow-up speed of the clutch rotational speed NC when the clutch rotational speed target value NC_cmd changes can be specified with relatively controlled influences of the switching function setting parameter POLE_sr. This makes it possible to further accurately specify a follow-up speed of the clutch rotational speed NC in response to a change in the clutch rotational speed target value NC_cmd by setting the target filter coefficient POLE_F_sr.

If the clutch rotational speed target value NC_cmd remains constant, then the filtering target value NC_cmd_f and the clutch rotational speed target value NC_cmd will be equal. Under the condition, if a disturbance causes the clutch rotational speed NC to change, then the convergent behavior for a difference (NC−NC_cmd) between the clutch rotational speed NC and the clutch rotational speed target value NC_cmd can be set by the switching function setting parameter POLE_sr in the above equation (36).

Therefore, the slip rate controller 60 makes it possible to independently specify the follow-up speed of the actual clutch rotational speed NC relative to the clutch rotational speed target value NC_cmd by setting the target filter coefficient POLE_F_sr in the above equation (34) when the clutch rotational speed target value NC_cmd changes. Moreover, the convergent speed of a difference between the clutch rotational speed target value NC_cmd and the actual clutch rotational speed NC can be independently set by setting the switching function setting parameter POLE_sr in the above equation (36).

An identifier 69 carries out processing for correcting the model parameters (a1_sr, b1_sr, and c1_sr) of the clutch mechanism 61 for each control cycle of the slip rate controller 60 so as to suppress influences of modeling errors from the above equation (33).

The identifier 69 calculates the model parameters (a1_sr, b1_sr, and c1_sr) of the above equation (33) according to equations (41) to (49) given below. The above equation (33) can be represented in terms of the following equation (43) using a vector $\zeta\_sr$ defined by the following equation (41) and a vector $\theta\_sr$ defined by the following equation (42).

$$\zeta\_sr^T(k) = [NC(k-1) Pcl(k-1) 1] \quad (41)$$

$$\theta\_sr^T(k) = [a1\_sr(k) b1\_sr(k) c1\_sr(k)] \quad (42)$$

$$NC\_hat(k) = \theta\_sr^T(k-1) \cdot \zeta\_sr(k) \quad (43)$$

where NC_hat(k): Estimated value of clutch rotational speed in a k-th control cycle.

The identifier 69 first calculates, according to an equation (44) given below, a difference e_id_sr between a clutch rotational speed estimated value NC_hat obtained by the above equation (43) and the actual clutch rotational speed NC as the value representing a modeling error in the above equation (33). Hereinafter, the difference e_id_sr will be referred to as an identification error e_id_sr.

$$e\_id\_sr(k) = NC(k) - NC\_hat(k) \quad (44)$$

where e_id(k): Difference between a clutch rotational speed estimated value NC_hat(k) and an actual clutch rotational speed NC(k) in a k-th control cycle.

Then, the identifier 69 calculates P_sr, which denotes a tertiary square matrix, according to a recurrence formula of the following equation (45), and then calculates a tertiary vector KP_sr, which is a gain coefficient vector specifying the degree of change based on the identification error e_id_sr, according to the following equation (46).

$$P\_sr(k+1) = \frac{1}{\lambda_1\_sr}\left\{I - \frac{\lambda_2\_sr \cdot P\_sr(k) \cdot \zeta\_sr(k) \cdot \zeta\_sr^T(k)}{\lambda_1\_sr + \lambda_2\_sr \cdot \zeta\_sr^T(k) \cdot P\_sr(k) \cdot \zeta\_sr(k)}\right\} \cdot P\_sr(k) \quad (45)$$

where I: Unit matrix; and $\lambda\_sr_1$, $\lambda\_sr_2$: Identification weighting parameters.

$$KP\_sr(k) = \frac{P\_sr(k) \cdot \zeta\_sr(k)}{1 + \zeta\_sr^T(k) \cdot P\_sr(k) \cdot \zeta\_sr(k)} \quad (46)$$

The identifier 69 calculates a parameter correction value $d\theta\_sr$ according to an equation (48) given below, using a predetermined reference parameter $\theta base\_sr$ defined by an equation (47) given below, the value of KP_sr calculated according to the above equation (46), and the value of e_id_sr calculated according to the above equation (44).

$$\theta base\_sr^T(k) = [a1base\_sr\ b1base\_sr\ 0] \quad (47)$$

$$d\theta\_sr(k-1) \cdot d\theta\_sr(k-1) + KP\_sr(k) \cdot e\_id\_sr(k) \quad (48)$$

Then, the identifier 69 uses the following equation (49) to calculate a new model parameter $\theta\_sr^T(k)=[a1\_sr(k)\ b1\_sr(k)\ c1\_sr(k)]$.

$$\theta\_sr(k) = \theta base\_sr(k) + d\theta\_sr(k) \quad (49)$$

FIG. 27 shows the flowchart of the slip rate control conducted in STEP193 of FIG. 25. The control unit 1 first calculates the clutch rotational speed target value NC_cmd according to the following equation (50) in STEP230.

$$NC\_cmd(k) = \frac{NE(k) \cdot (100 - SR\_cmd)}{100} \quad (50)$$

where NC_cmd(k): Clutch rotational speed target value in a k-th control cycle; NE(k): Engine speed in a k-th control cycle; and SR_cmd: Target slip rate.

In subsequent STEP231 through STEP234, and STEP240, processing is implemented by the identifier 69 to identify the model parameters a1_sr, b1_sr, and c1_sr of the clutch mechanism 61. In STEP231, the identifier 69 applies the clutch rotational speed NC to the NC/a1base_sr MAP shown in FIG. 27 to acquire a reference parameter a1base_sr(k) and also applies the clutch position Pcl to the Pcl/b1base_sr MAP given in the figure to acquire a reference parameter b1base_sr(k).

If it is determined in the next STEP232 that the clutch stroke Pcl has not exceeded a clutch OFF position Pcloff, which means that the clutch assembly 82 is not in the OFF state, then the identifier 69 proceeds to STEP233 to calculate a correction value $d\theta\_sr(k)$ of a model parameter according to the above equation (48) before it proceeds to STEP234.

If it is determined in STEP232 that the clutch stroke Pcl has exceeded the clutch OFF position Pcloff, which means that the clutch assembly 82 is in the OFF state, then the identifier 69 proceeds to STEP240 without updating the correction value $d\theta\_sr$ of the model parameter. This arrangement makes it possible to prevent the correction value $d\theta\_sr$ of the model parameter from increasing if the clutch rotational speed NC in the clutch OFF state does not reach zero (the target clutch rotational speed NC_cmd based on the target slip rate 100%) while the speed changing operation is being performed.

In the subsequent STEP234, the identifier 69 calculates model parameter identification values (a1_sr(k), b1_sr(k), and c1_sr(k)) according to the above equation (49). In STEP235, the slip rate controller 60 operates the subtracter 64, the switching function value calculator 65, the reaching law input calculator 66, the equivalent control input calculator 67, and the adder 68 to carry out computation according to the above equations (34) to (39) so as to determine the clutch stroke control input value Pcl(k) supplied to the clutch mechanism 61. The identifier 69 then proceeds to STEP236 to terminate the processing of the slip rate control.

In the present embodiment, among the model parameters a1_sl, a2_sl, b1_sl, b2_sl, and c1_sl in the above equation (1), b1_sl, b2_sl, and c1_sl have been selected as the identification model parameters, while a1_sl and a2_sl have been selected as the non-identification model parameters. The selection of the identification model parameters, however, is not limited to the above. Other identification model parameters that are closely related to changes in the dynamic characteristic of the selector may be selected according to the specifications of a transmission.

In the present embodiment, the shift controller 50 and the selection controller 51 have adopted the sliding mode control as the response specifying control in the present invention. Alternatively, however, other types of response specifying control, such as back-stepping control, may be used. Furthermore, a control method other than the response specifying control may be used.

Furthermore, in the present embodiment, the sliding mode controller 53 incorporated in the shift controller 50 and the sliding mode controller 55 incorporated in the selection controller 51 are both constructed of controllers having two degrees of freedom. However, the advantages of the present invention can be obtained even when only one of the two sliding mode controllers is constructed of a controller having two degrees of freedom.

What is claimed is:

1. A transmission control system comprising:
    positioning control means for positioning a shift arm at a predetermined target position by controlling the operation of an actuator connected to the shift arm which is provided in a transmission to perform a selecting operation and a shifting operation and which is selectively engaged with a shift piece secured to each of a plurality of speed shift forks by the selecting operation to displace one of the shift forks corresponding to the selectively engaged shift piece from a neutral position so as to establish a predetermined speed by the shifting operation,
    wherein the position control means specifies a position of the shift arm to the target position based on a first parameter (VPOLE f sc, VPOLE f Sl) for setting a follow-up characteristic of an actual position of the shift arm to follow the target position and a second parameter (VPOLE sc, VPOLE f sc) for setting a disturbance suppressing characteristic, and
    wherein the positioning control means is a controller having two degrees of freedom that is capable of independently specifying the first parameter and the second parameter, and is capable of specifying the second parameter based on the actual position or the target position of the shift arm.

2. The transmission control system according to claim 1, wherein the follow-up characteristic of the actual position of the shift arm to follow the target position in the positioning control means is based on an overdamping response.

3. The transmission control system according to claim 1, wherein the actuator is a selection actuator for moving the shift arm in a selecting direction, and the positioning control means controls the operation of the selection actuator to position the shift arm at the target position set on the basis of each speed.

4. The transmission control system according to claim 1, wherein the position control means is a controller having two degrees of freedom that is capable of independently specifying the first parameter and the second parameter on each of a shifting direction and a selecting direction, and is capable of specifying the second parameter based on the actual position or the target position of the shift arm.

5. The transmission control system according to claim 1, wherein the positioning control means carries out positioning of the shift arm by using response specifying control.

6. The transmission control system according to claim 5, further comprising:
    computing coefficient changing means for changing a computing coefficient of a switching function that determines the disturbance suppressing characteristic in the response specifying control according to the actual position or the target position of the shift arm in the processing for positioning the shift arm by the positioning control means.

7. A transmission control system according to claim 1, wherein
    the shift fork is connected to a first engaging member connected to an input shaft or an output shaft of the transmission;
    the actuator is a shift actuator that moves the shift arm so as to move the first engaging member in the shifting direction through the intermediary of the shift fork engaged with the shift arm; and
    the positioning control means controls the operation of the shift actuator to move the first engaging member in the shifting direction so as to engage the first engaging member with a second engaging member connected to the input shaft or the output shaft, whichever has not been connected to the first engaging member, thereby establishing a speed in a shifting operation.

8. The transmission control system according to claim 7, further comprising:
    a synchronizing member that is provided between the first engaging member and the second engaging member such that it may be rotated relative to the first engaging member and the second engaging member and movable in the shifting direction, and comes in contact with the first engaging member and the second engaging member to synchronize the rotational speeds of the first engaging member and the second engaging member by a frictional force in the shifting operation,
    wherein the positioning control means changes the target position of the shift arm in the shifting direction at a predetermined timing to engage the first engaging member and the second engaging member in the shifting operation.

* * * * *